(12) United States Patent
Aradhye et al.

(10) Patent No.: US 8,429,103 B1
(45) Date of Patent: Apr. 23, 2013

(54) NATIVE MACHINE LEARNING SERVICE FOR USER ADAPTATION ON A MOBILE PLATFORM

(75) Inventors: Hrishikesh Aradhye, Santa Clara, CA (US); Wei Hua, Palo Alto, CA (US); Ruei-sung Lin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/565,508

(22) Filed: Aug. 2, 2012

Related U.S. Application Data

(60) Provisional application No. 61/663,381, filed on Jun. 22, 2012.

(51) Int. Cl.
*G06F 15/18* (2006.01)
*G09B 19/00* (2006.01)

(52) U.S. Cl.
USPC .......................................................... 706/12

(58) Field of Classification Search .................... 706/11, 706/12, 60
See application file for complete search history.

(56) References Cited

U.S. PATENT DOCUMENTS

| | | |
|---|---|---|
| 5,974,457 A | 10/1999 | Waclawsky et al. |
| 6,233,448 B1 | 5/2001 | Alperovich et al. |
| 6,353,814 B1 | 3/2002 | Weng |
| 6,356,885 B2 | 3/2002 | Ross et al. |
| 6,701,144 B2 | 3/2004 | Kirbas et al. |
| 6,813,501 B2 | 11/2004 | Kinnunen et al. |
| 7,076,255 B2 | 7/2006 | Parupudi et al. |
| 7,171,360 B2 | 1/2007 | Huang et al. |
| 7,286,834 B2 | 10/2007 | Walter |
| 7,725,419 B2 * | 5/2010 | Lee et al. ........................ 706/60 |
| 7,904,399 B2 | 3/2011 | Subramaniam et al. |
| 7,991,715 B2 | 8/2011 | Schiff et al. |
| 8,085,982 B1 | 12/2011 | Kim et al. |
| 8,095,408 B2 | 1/2012 | Schigel et al. |
| 8,139,900 B2 | 3/2012 | Gokturk et al. |

(Continued)

FOREIGN PATENT DOCUMENTS

| | | |
|---|---|---|
| EP | 2 048 656 B1 | 2/2010 |
| WO | 2012/006580 A1 | 1/2012 |

OTHER PUBLICATIONS

Anonymous, "What is Incremental Learning and Why is it Useful?", Mar. 12, 2009, Baidu.com.
Amazon Web Services, "Cloud 1305—Machine Learning on Demand", Jan. 1, 2012, Amazon Web Services LLC.

(Continued)

*Primary Examiner* — Jeffrey A Gaffin
*Assistant Examiner* — Ola Olude Afolabi
(74) *Attorney, Agent, or Firm* — McDonnell Boehnen Hulbert & Berghoff LLP

(57) ABSTRACT

Disclosed are apparatus and methods for providing machine-learning services. A machine-learning service executing on a mobile platform can receive data related to a plurality of features. In some cases, the received data can include data related to features received from an application and data related to features received from the mobile platform. The machine-learning service can determine at least one feature based on the received data. The machine-learning service can generate an output by performing a machine-learning operation on the at least one feature. The machine-learning operation can be selected from among an operation of ranking the at least one feature, an operation of classifying the at least one feature, an operation of predicting the at least one feature, and an operation of clustering the at least one feature. The machine-learning service can send the output.

30 Claims, 29 Drawing Sheets

U.S. PATENT DOCUMENTS

| | | | |
|---|---|---|---|
| 8,199,979 | B2 | 6/2012 | Steinberg et al. |
| 2003/0118015 | A1 | 6/2003 | Gunnarsson et al. |
| 2003/0167167 | A1 | 9/2003 | Gong |
| 2007/0032225 | A1 | 2/2007 | Konicek et al. |
| 2008/0194270 | A1 | 8/2008 | Greenberg |
| 2009/0163183 | A1 | 6/2009 | O'Donoghue et al. |
| 2009/0224867 | A1 | 9/2009 | O'Shaughnessy et al. |
| 2009/0298511 | A1 | 12/2009 | Paulson |
| 2010/0138416 | A1 | 6/2010 | Bellotti |
| 2010/0153313 | A1* | 6/2010 | Baldwin et al. ............ 706/11 |
| 2010/0278396 | A1 | 11/2010 | Mitsuhashi et al. |
| 2011/0026853 | A1 | 2/2011 | Gokturk et al. |
| 2011/0070863 | A1 | 3/2011 | Ma et al. |
| 2011/0125783 | A1 | 5/2011 | Whale et al. |
| 2011/0161276 | A1 | 6/2011 | Krumm et al. |
| 2011/0184730 | A1 | 7/2011 | Lebeau et al. |
| 2011/0264528 | A1 | 10/2011 | Whale |
| 2011/0314367 | A1 | 12/2011 | Chang et al. |
| 2012/0011119 | A1 | 1/2012 | Baheti et al. |
| 2012/0269436 | A1 | 10/2012 | Mensink et al. |
| 2012/0308124 | A1 | 12/2012 | Belhumeur et al. |

OTHER PUBLICATIONS

CCNA Training, "Wireless Tutorial", Aug. 12, 2011, CCNA Training.

S. Dasgupta, "CSE 291: Topics in Unsupervised Learning—Lectures and Readings", Spring 2008, University of California San Diego, Computer Science and Engineering Department.

I. Fried, "Coming Soon: Phones That Learn to Rest When You Do", Feb. 29, 2012, AllThingsD.com, Dow Jones & Company Inc.

J. H. Gennari et al., "Models of Incremental Concept Formation", Journal of Artificial Intelligence, Sep. 1989, pp. 11-61, vol. 40, Issue 1-3, Elsevier Science Publishers Ltd. Essex, United Kingdom.

Google Inc., "Google Prediction API—Developer's Guide", Jun. 26, 2012, Google Inc.

Google Inc., "Public Class Notification—Android Developers", Mar. 22, 2012, Version Android 4.0 r1, Google Inc.

J. Luo, "Incremental Learning for Adaptive Visual Place Recognition in Dynamic Indoor Environments", Oct. 2006, Master's Thesis, School of Computer Science and Communication, Royal Institute of Technology, SE-100 44 Stockholm, Sweden.

A. Markitanis, "Learning Mobile User Behaviours", Jun. 21, 2011, Master's Individual Project, Imperial College London, Department of Computing, South Kensington Campus, London SW7 2AZ United Kingdom.

D. McFadden, "Chapter 5. Systems of Regression Equations—Lecture Notes for Economics 240B", Jan. 1, 1999, Department of Economics, University of California, Berkeley, Evans Hall, Berkeley, CA.

Piotr et. al, "Detecting Unknown Class in a Bayes Classifier", Mar. 9-10, 2010, stackoverflow.com Web Site, Stack Exchange Inc.

W. Shen, "Efficient Incremental Induction of Decision Lists—Can Incremental Learning Outperform Non-Incremental Learning?", Jan. 1996, USC/Information Sciences Institute Report No. ISI/RR-96-433, Information Sciences Institute, University of Southern California, Marina Del Rey, CA.

A. Styopkin, "Automatic Photo Server for Windows—One-click Photo Sorting Software", Jan. 1, 2010, Styopkin Software.

G. Widmer et al., "Learning Flexible Concepts from Streams of Examples: FLORA2:", Aug. 3-7, 1992, pp. 463-467, Proceedings of the 10th European Conference on Artificial intelligence (ECAI '92), Vienna, Austria, pub. by John Wiley & Sons, Inc., New York, NY.

Wikipedia, "Learning to Rank", Feb. 16, 2012, Wikimedia Foundation.

Wikipedia, "Linear Regression", Apr. 4, 2012, Wikimedia Foundation.

Xiam Technologies Limited, "Qualcomm Announces ConsiaTM Software Solution for Highly Optimized Device Operation", Feb. 28, 2012, Xiam Technologies Limited.

Xiam Technologies Limited, "Solutions", Mar. 20, 2012, Xiam Technologies Limited.

Beach, A. et al., "Fusing Mobile, Sensor, and Social Data to Fully Enable Context-Aware Computing", Hotmobile 2010 Proceedings of the Eleventh Workshop on Mobile Computing Systems & Applications, Feb. 22-23, 2010, Annapolis, Maryland, pp. 60-65, ACM, New York, New York.

Bellavista, P. et al., "Context-aware middleware for resource management in the wireless Internet," IEEE Transactions on Software Engineering, 2003, vol. 29, No. 12, pp. 1086-1099.

Davidyuk, O. et al., "Context-Aware Middleware for Mobile Multimedia Applications," 3rd International Conference on Mobile and Ubiquitous Multimedia (MUM2004), Oct. 27-29, 2004, pp. 213-220, College Park, Maryland, USA.

Devantie et al., "Smart Playlist: a Context-aware System",submitted for Pervasive Computing Course, Fall 2010, IT University of Copenhagen, Dec. 15, 2010, pp. 1-10.

Hailpern, Joshua et al.. "On improving application utility prediction.", Proceedings of the 28th ACM Conference on Human Factors in Computing Systems (CHI 2010), Work-in-Progress (Spotlight on Posters Days 1 &2), Apr. 12-13, 2010, pp. 3421-3426. ACM, Atlanta, GA.

Herborn, S. et al., "Predictive context aware mobility handling," International Conference on Telecommunications 2008, Jun. 16-19, 2008, pp. 1-6, IEEE.

Jones et al., "Context-Aware Retrieval for Ubiquitous Computing Environments", Mobile and Ubiquitous Info. Access Workshop 2003, Udine, Italy, Sep. 8, 2004, LNCS 2954, pp. 227-243, Springer-Verlag, Berlin Heidelberg Germany.

Khalil, A. et al., "Improving cell phone awareness by using calendar information," Proceedings of Interact 05, Sep., 2005, LNCS 3585, p. 588-600, Springer-Verlag, Berlin Heidelberg Germany.

Miraoui, M. et al., "Context Modeling and Context-Aware Service Adaptation for Pervasive Computing Systems", International Journal of Computer and Information Science and Engineering, Summer 2008, vol. 2, Issue 3, pp. 148-157.

Mizra, Mariyam et al., "A machine learning approach to TCP throughput prediction," SIGMETRICS '07 Proceedings of the 2007 ACM SIGMETRICS International Conference on Measurement and Modeling of Computer Systems, Jun. 12-16 2007, pp. 97-108.

Nagel, K.S. et al. "Predictors of Availability in Home Life Context-Mediated Communication", ACM Conference on Computer Supported Cooperative Work (CSWC'04), Nov. 6-10, 2004, Chicago, IL, pp. 497-506, vol. 6, Issue 3, Association of Computing Machinery.

Van Halteren et al., "Mobile Service Platform: A Middleware for Nomadic Mobile Service Provisioning," IEEE International Conference on Wireless and Mobile Computing, Networking and Communications (WiMob'2006), Jun. 19-21, 2006, pp. 292-299.

Qin, C. et al., "Tagsense: a smartphone-based approach to automatic image tagging," Proceedings of the 9th International Conference on Mobile Systems, Applications and Services (MobiSys 2011), Jun. 28-Jul. 1, 2011, Bethesda, MD, USA.

Roy, N., "A Context-Aware Learning, Prediction, and Mediation Framework for Resource Management in Smart Pervasive Environments", Jul. 18, 2008, Ph.D. Thesis, Computer Science and Engineering Department, University of Texas at Arlington.

Shankar, P. et al., "CARS: Context-Aware Rate Selection for Vehicular Networks", Proceedings of the 16th IEEE International Conference on Network Protocols (ICNP), Orlando, FL, Oct. 19-22, 2008, pp. 1-12, IEEE.

Wang, J. et al., "Music Recommender system for Wi-Fi Walkman", Sep. 3, 2003, Technical Report ICT-2003-01, Faculty of Electrical Engineering, Mathematics, and Computer Science, Delft University of Technology, Delft, NL.

Ziebart et al., "Learning automation policies for pervasive computing environments." Proceedings of the Second International Conference on Autonomic Computing, ICAC 2005, Jun. 13-16, 2005, pp. 193-203, IEEE, Seattle, WA.

Pawar et al., "Context-Aware Middleware Support for the Nomadic Mobile Services on Multi-homed Handheld Mobile Devices," 12th IEEE International Symposium on Computers and Communications, Jul. 1-4, 2007, pp. 341-348.

E. Altman, "Capacity of Multi-Service Cellular Networks with Transmission-Rate Control: A Queueing Analysis", Proceedings of the 8th Annual International Conference on Mobile Computing and Networking (MobiCom '02), Sep. 23, 2002, pp. 205-214, ACM, Atlanta, GA.

J. Guo et al., "Estimate the Call Duration Distribution Parameters in GSM System Based on K-L Divergence Method", International Conference on Wireless Communications, Networking, and Mobile Computing (WiCom 2007), Sep. 21, 2007, pp. 2988-2991, IEEE.

A. Hac et al., "Resource Allocation Scheme for QoS Provisioning in Microcellular Networks Carrying Multimedia Traffic", International Journal of Network Management, Sep. 2001, pp. 277-307, vol. 11, issue 5, John Wiley & Sons, Ltd., New York, NY.

* cited by examiner

| Usage Log 1700 ||||
|---|---|---|---|---|
| TS | Start | Loc. | Loc Label | TS Label |
| 8 | 0808 | 1 | Home | Medium |
| 3 | 1000 | 2 | Work | Short |
| 2 | 1204 | 2 | Work | Short |
| 7 | 1335 | 2 | Work | Medium |
| 3 | 1535 | 3 | Random1 | Short |
| 17 | 1759 | 4 | Groceries | Long |
| 1 | 2003 | 1 | Home | Short |
| 4 | 2104 | 1 | Home | Short |
| 45 | 2205 | 1 | Home | Long |
| 6 | 812 | 1 | Home | Medium |
| 3 | 1212 | 2 | Work | Short |
| 2 | 1222 | 5 | Lunch Rest. | Short |
| 21 | 1754 | 4 | Groceries | Long |
| 25 | 2203 | 1 | Home | Long |
| 5 | 747 | 1 | Home | Short |
| 3 | 1201 | 2 | Work | Short |
| 2 | 1338 | 2 | Work | Short |
| 19 | 1845 | 4 | Groceries | Long |
| 10 | 1930 | 1 | Home | Medium |
| 5 | 2204 | 1 | Home | Short |
| 10 | 759 | 1 | Home | Medium |
| 1 | 945 | 2 | Work | Short |
| 5 | 1003 | 2 | Work | Short |
| 5 | 1158 | 5 | Lunch Rest. | Short |
| 6 | 1603 | 2 | Work | Medium |
| 15 | 1824 | 4 | Groceries | Long |
| 6 | 1930 | 1 | Home | Medium |
| 1 | 2003 | 6 | Movie | Short |
| 23 | 2240 | 1 | Home | Long |
| 10 | 754 | 1 | Home | Medium |
| 5 | 805 | 1 | Home | Short |
| 2 | 811 | 1 | Home | Short |
| 2 | 1134 | 2 | Work | Short |
| 3 | 1137 | 2 | Work | Short |
| 10 | 1205 | 1 | Home | Medium |
| 2 | 1445 | 2 | Work | Short |
| 4 | 1803 | 7 | Random2 | Short |

FIG. 17A

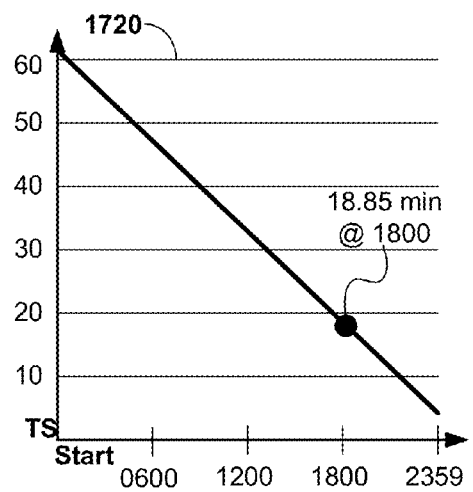

Usage Log 1710
Data for Location = 4

| TS | Start | Mins |
|---|---|---|
| 17 | 1759 | 1079 |
| 22 | 1754 | 1074 |
| 19 | 1845 | 1125 |
| 15 | 1824 | 1104 |

FIG. 17B

Predicted Duration (D) v. Time of Day (TOD) Graph for Location = 4

FIG. 17C

NATIVE MACHINE LEARNING SERVICE FOR USER ADAPTATION ON A MOBILE PLATFORM

CROSS REFERENCE TO RELATED APPLICATIONS

This application claims priority to U.S. Patent App. No. 61/663,381, entitled "Native Machine Learning Service for User Adaptation on a Mobile Platform", filed Jun. 22, 2012, the contents of which are fully incorporated by reference herein for all purposes.

BACKGROUND

Unless otherwise indicated herein, the materials described in this section are not prior art to the claims in this application and are not admitted to be prior art by inclusion in this section.

Mobile devices are ubiquitous in modern communication networks. Many of these mobile devices are "smart phones", capable of running one or more applications while acting as a communication device. The applications and/or the smart phone itself can have a number of settings subject to user control, such as volume settings, network addresses/names, contact data, and calendar information.

A smart phone user can change some or all of these settings based on their context, such as location and activity. For example, the user can turn down a ringing volume and/or mute a ringer, prior to watching a movie at a movie theater. After the movie theater completes, the user can the turn up the ringing volume and/or un-mute the ringer.

SUMMARY

In one aspect, a method is provided. A machine-learning service executing on a mobile platform receives data related to a plurality of features. The machine-learning service determines at least one feature in the plurality of features based on the received data. The machine-learning service generates an output by performing a machine-learning operation on the at least one feature of the plurality of features. The machine-learning operation is selected from among: an operation of ranking the at least one feature, an operation of classifying the at least one feature, an operation of predicting the at least one feature, and an operation of clustering the at least one feature. The machine-learning service sends the output.

In another aspect, a method is provided. A machine-learning service executing on a mobile platform receives feature-related data related to a plurality of features. The feature-related data includes data related to a first plurality of features received from an application executing on the mobile platform and data related to a second plurality of features received from the mobile platform. The first plurality of features and the second plurality of features differ. The machine-learning service determines at least one feature among the first plurality of features and the second plurality of feature based on the feature-related data. The machine-learning service generates an output by performing a machine-learning operation on the at least one feature. The machine-learning service sends the output to the application.

In even another aspect, an article of manufacture is provided. The article of manufacture includes a non-transitory computer-readable storage medium having instructions stored thereon that, when executed on by a processor, cause the processor to perform functions. The functions include: (a) receiving data related to a plurality of features, (b) determining at least one feature in the plurality of features based on the received data, (c) generating an output by performing a machine-learning operation on the at least one feature of the plurality of features, where the machine-learning operation is selected from among: an operation of ranking the at least one feature, an operation of classifying the at least one feature, an operation of predicting the at least one feature, and an operation of clustering the at least one feature, and (d) sending the output.

In yet another aspect, a mobile platform is provided. The mobile platform includes a processor and a non-transitory computer-readable storage medium, configured to store instructions that, when executed by the processor, cause the mobile platform to perform functions. The functions include: (a) receiving data related to a plurality of features, (b) determining at least one feature in the plurality of features based on the received data, (c) generating an output by performing a machine-learning operation on the at least one feature of the plurality of features, where the machine-learning operation is selected from among: an operation of ranking the at least one feature, an operation of classifying the at least one feature, an operation of predicting the at least one feature, and an operation of clustering the at least one feature, and (d) sending the output.

In a second aspect, a method is provided. A context-identification system executing on a mobile platform receives data comprising: context-related data associated with the mobile platform and application-related data received from the mobile platform. The context-identification system identifies at least one context using the context-related data associated with the mobile platform and/or the application-related data received from the mobile platform. Based on at least one context identified, the context-identification system predicts a communicative action associated with the mobile platform by performing a machine-learning operation on the received data. An instruction is received to execute the communicative action associated with the mobile platform.

In another aspect, an article of manufacture is provided. The article of manufacture includes a non-transitory computer-readable storage medium having instructions stored thereon that, when executed on by a processor, cause the processor to perform functions. The functions include: (a) receiving data at a context-identification system executing on a mobile platform, where the received data includes context-related data associated with the mobile platform and application-related data received from the mobile platform, (b) identifying a context using the context-related data associated with the mobile platform and/or the application-related data received from the mobile platform, (c) based on at least one context identified, predicting a communicative action associated with the mobile platform by performing a machine-learning operation on the data received; and (d) receiving an instruction to execute the communicative action associated with the mobile platform.

In yet another aspect, a mobile platform is provided. The mobile platform includes a processor and a non-transitory computer-readable storage medium, configured to store instructions that, when executed by the processor, cause the mobile platform to perform functions. (a) receiving data at a context-identification system executing on a mobile platform, where the received data includes context-related data associated with the mobile platform and application-related data received from the mobile platform, (b) identifying a context using the context-related data associated with the mobile platform and/or the application-related data received from the mobile platform, (c) based on at least one context identified, predicting a communicative action associated with the mobile platform by performing a machine-learning operation on the data received; and (d) receiving an instruction to execute the communicative action associated with the mobile platform.

In a third aspect, a method is provided. A machine-learning service executing on a mobile platform receives feature-related data. The feature-related data includes image-related data related to one or more images received from an application executing on the mobile platform and platform-related data received from the mobile platform. The image-related data and the platform-related data differ. The machine-learning service generates a title related to the one or more images by performing a machine-learning operation on the feature-related data. The machine-learning service sends the title related to the one or more images to the application.

In another aspect, an article of manufacture is provided. The article of manufacture includes a non-transitory computer-readable storage medium having instructions stored thereon that, when executed on by a processor, cause the processor to perform functions. The functions include: (i) receiving feature-related data that includes image-related data related to one or more images and platform-related data, where the image-related data and the platform-related data differ, (ii) generating a title related to the one or more images by performing a machine-learning operation on the feature-related data, and (iii) sending the title related to the one or more images.

In yet another aspect, a mobile platform is provided. The mobile platform includes a processor and a non-transitory computer-readable storage medium, configured to store instructions that, when executed by the processor, cause the mobile platform to perform functions. The functions include: (i) receiving feature-related data that includes image-related data related to one or more images and platform-related data, where the image-related data and the platform-related data differ, (ii) generating a title related to the one or more images by performing a machine-learning operation on the feature-related data, and (iii) sending the title related to the one or more images.

In a fourth aspect, a method is provided. A machine-learning service executing on a mobile platform receives feature-related data. The feature-related data includes communications-related data related to one or more searches for establishing electronic communications received from an application executing on the mobile platform and platform-related data received from the mobile platform. The communications-related data and the platform-related data differ. The machine-learning service determines whether the machine-learning service is trained to perform machine-learning operations related to predicting outcomes of searches for establishing electronic communications. In response to determining that the machine-learning service is trained: (a) the machine-learning service receives a request for a predicted outcome of a search for establishing an electronic communication, (b) the machine-learning service generates the predicted outcome by performing a machine-learning operation on the feature-related data, and (c) the predicted outcome is sent to the application.

In another aspect, an article of manufacture is provided. The article of manufacture includes a non-transitory computer-readable storage medium having instructions stored thereon that, when executed on by a processor, cause the processor to perform functions. The functions include: (a) receiving feature-related data at a machine-learning service, where the feature-related data includes communications-related data related to one or more searches for establishing electronic communications and platform-related data received from the mobile platform, and where the communications-related data and the platform-related data differ, (b) determining whether the machine-learning service is trained to perform machine-learning operations related to predicting outcomes of searches for establishing electronic communications, (c) in response to determining that the machine-learning service is trained: (i) receiving, at the machine-learning service, a request for a predicted outcome of a search for establishing an electronic communication, (ii) generating the predicted outcome by the machine-learning service performing a machine-learning operation on the feature-related data, and (iii) sending the predicted outcome.

In yet another aspect, a mobile platform is provided. The mobile platform includes a processor and a non-transitory computer-readable storage medium, configured to store instructions that, when executed by the processor, cause the mobile platform to perform functions. The functions include: (a) receiving feature-related data at a machine-learning service, where the feature-related data includes communications-related data related to one or more searches for establishing electronic communications and platform-related data, and where the communications-related data and the platform-related data differ, (b) determining whether or not outcomes of searches for establishing electronic communications can be predicted, (c) in response to determining that the outcomes of searches for establishing electronic communications can be predicted: (i) receiving a request for a predicted outcome of a search for establishing an electronic communication, (ii) generating the predicted outcome by performing a machine-learning operation on the feature-related data, and (iii) sending the predicted outcome.

In a fifth aspect, a method is provided. A machine-learning service executing on a mobile platform receives feature-related data. The feature-related data includes usage-related data about one or more time spans that the mobile platform is activated and platform-related data received from the mobile platform. The usage-related data and the platform-related data differ. The machine-learning service determines whether the machine-learning service is trained to perform machine-learning operations related to predicting a time span that the mobile platform will be activated. In response to determining that the machine-learning service is trained: (a) the machine-learning service receives a request for a predicted time span that the mobile platform will be activated, (b) the machine-learning service determines the predicted time span by performing a machine-learning operation on the feature-related data, and (c) the predicted time span is sent to the application.

In another aspect, an article of manufacture is provided. The article of manufacture includes a non-transitory computer-readable storage medium having instructions stored thereon that, when executed on by a processor, cause the processor to perform functions. The functions include: (a) receiving feature-related data at a machine-learning service, where the feature-related data includes usage-related data about one or more time spans and platform-related data received from the mobile platform, and where the usage-related data and the platform-related data differ, (b) determining whether the machine-learning service is trained to perform machine-learning operations related to predicting a time span, (c) in response to determining that the machine-learning service is trained: (i) receiving, at the machine-learning service, a request for a predicted time span, (ii) determining the predicted time span by the machine-learning service performing a machine-learning operation on the feature-related data, and (iii) sending the predicted time span.

In quite another aspect, a mobile platform is provided. The mobile platform includes a processor and a non-transitory computer-readable storage medium, configured to store instructions that, when executed by the processor, cause the mobile platform to perform functions. The functions include: (a) receiving feature-related data at a machine-learning service, where the feature-related data includes usage-related data about one or more time spans that the mobile platform is activated and platform-related data, and where the usage-related data and the platform-related data differ, (b) determining whether the machine-learning service is trained to perform machine-learning operations related to predicting a time span that the mobile platform will be activated, (c) in response to determining that the machine-learning service is trained: (i) receiving a request for a predicted time span that the mobile platform will be activated at the machine-learning service, (ii) determining the predicted time span by the machine-learning service performing a machine-learning operation on the feature-related data, and (iii) sending the predicted time span.

In a sixth aspect, a method is provided. A machine-learning service executing on a mobile platform receives feature-related data. The feature-related data includes volume-related data about one or more volume-related settings for the mobile platform and platform-related data received from the mobile platform. The volume-related data and the platform-related data differ. The machine-learning service determines whether the machine-learning service is trained to perform machine-learning operations related to predicting a change in the one or more volume-related settings for the mobile platform. In response to determining that the machine-learning service is trained: (a) the machine-learning service receives a request for predicting the change in the one or more volume-related settings, (b) the machine-learning service determining the predicted change in the one or more volume-related settings by performing a machine-learning operation on the feature-related data, and (c) sending the predicted change in the one or more volume-related settings.

In another aspect, an article of manufacture is provided. The article of manufacture includes a non-transitory computer-readable storage medium having instructions stored thereon that, when executed on by a processor, cause the processor to perform functions. The functions include: (a) receiving feature-related data at a machine-learning service executing on the processor, where the feature-related data includes volume-related data about one or more volume-related settings and platform-related data, and where the usage-related data and the platform-related data differ, (b) determining whether the machine-learning service is trained to perform machine-learning operations related to predicting a change in the one or more volume-related settings, (c) in response to determining that the machine-learning service is trained: (i) receiving, at the machine-learning service, a request for predicting the change in the one or more volume-related settings, (ii) determining the predicted change in the one or more volume-related settings by the machine-learning service performing a machine-learning operation on the feature-related data, and (iii) sending the predicted change in the one or more volume-related settings.

In yet another aspect, a mobile platform is provided. The mobile platform includes a processor and a non-transitory computer-readable storage medium, configured to store instructions that, when executed by the processor, cause the mobile platform to perform functions. The functions include: (a) receiving feature-related data at a machine-learning service executing on the processor, where the feature-related data includes volume-related data about one or more volume-related settings and platform-related data received from the mobile platform, and where the usage-related data and the platform-related data differ, (b) determining whether the machine-learning service is trained to perform machine-learning operations related to predicting a change in the one or more volume-related settings for the mobile platform, (c) in response to determining that the machine-learning service is trained: (i) receiving, at the machine-learning service, a request for predicting the change in the one or more volume-related settings, (ii) determining the predicted change in the one or more volume-related settings by the machine-learning service performing a machine-learning operation on the feature-related data, and (iii) sending the predicted change in the one or more volume-related settings.

BRIEF DESCRIPTION OF THE FIGURES

In the figures:

FIG. 17A shows a usage log of activations of a mobile platform, in accordance with an example embodiment.

FIG. 17B shows a usage log of activations of a mobile platform at a particular location, in accordance with an example embodiment.

FIG. 17C is a graph of a linear regression model based on the data in the usage log shown in FIG. 17B, in accordance with an example embodiment.

DETAILED DESCRIPTION

Overview

Figure 1A:
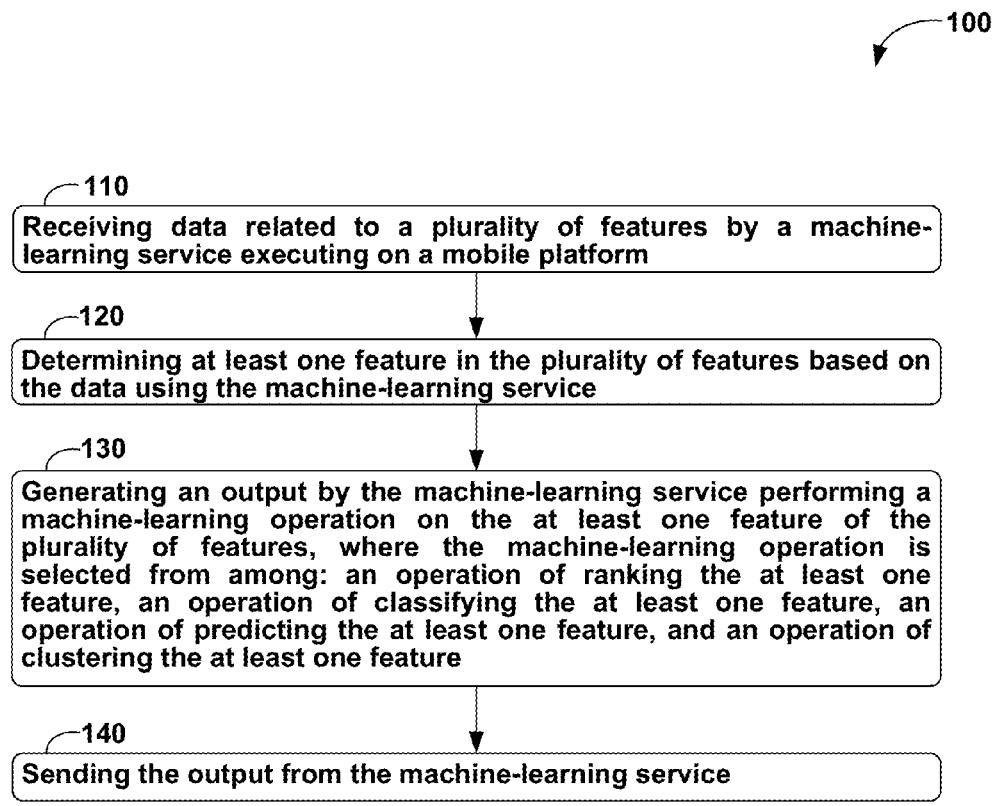
FIG. 1A is a flow chart of a method, in accordance with an example embodiment.

Most mobile platforms, such as mobile phones, do not adapt to the person(s) using the platform; rather, the person(s) adapt to use the mobile platform. Typically, customization of the mobile platform and the applications utilizing the mobile platform is often limited based on implementation decisions.

A "machine-learning service" or machine-learning and adaptation service can support automatic adaptation of preferences of person(s) using the mobile platform. The machine-learning service is software running on the mobile platform that provides the necessary functionality for software applications to learn from interactions of person(s) using the mobile platform.

The machine-learning service can communicate with software applications via an Application Program Interface (API). The API provides access to several commonly-used machine adaptation techniques. For example, the API can provide access to interfaces for ranking, clustering, classifying, and prediction techniques. Also, a software application can provide one or more inputs to the machine-learning service. For example, a software application controlling a volume setting of a speaker can provide volume setting values as an input to the machine-learning service.

The API can also utilize data that the software application does not and perhaps cannot access. For example, a volume-setting application may not have access to location data for the mobile platform. However, the volume-setting application could request the machine-learning service to predict the volume setting of the speaker based on location. The machine-learning service need only provide the predictions, not the locations, to the volume-setting application. As such, the machine-learning service can encapsulate the use of sensitive data.

The machine-learning service can include a data aggregation and representation engine (DARE) that constantly receives and stores input data, perhaps from multiple sources. The stored input data can be aggregated to discover features within the data; such as location labels based on actions and times; e.g. Home, Work, School, etc.

The machine adaptation techniques used by the machine-learning service can be implemented to work best within the processing, memory, and other resource constraints of a mobile platform. For example, the machine adaptation techniques can use incremental learning algorithms that require limited or no historical information for training, and thus may reduce the total amount of memory needed by the machine-learning-service.

In some embodiments, the machine-learning service can utilize network support functionality to access non-private and/or anonymized data aggregated across multiple mobile platforms. The aggregated data can be stored in one or more servers, or other devices other than the mobile platform, and downloaded as needed. For example, aggregated data can be used to train and/or set initial values for the machine adaptation techniques used by the machine-learning service.

Example uses of the machine-learning service can include:

Predicting a duration of a mobile session before the mobile session starts, based on location, time, calendar entries, prior behavior, etc.

Predicting a phone number to be dialed at the onset of utilizing a phone dialing application, based on location, time, calendar entries, prior behavior, etc.

Predicting speaker and/or mute settings for the mobile platform, based on location, time, calendar entries, prior behavior, etc.

Classifying locations based on their ability to use Wi-Fi and/or other communication networks.

Generating example photo names and photo album names for a camera application utilizing the mobile platform.

Many other examples are possible as well.

By providing application access to a number of machine adaptation techniques designed to operate on and learn about user behavior of a mobile platform, the machine-learning service can make mobile platforms easier to use, more efficient from a user's point of view, and save users time and effort in utilizing the variety of applications available on the mobile platform.

Example Operations

Turning to the figures, FIG. 1A is a flow chart of method 100, in accordance with an example embodiment. In some embodiments, part or all of method 100 can be executed using one or more mobile platforms; e.g., mobile platform 200, 502, 602, 802, 1202, 1502, 1852, 2002 and/or one or more computing devices; e.g., computing device 2200.

Method 100 begins at block 110, where a machine-learning service executing on a mobile platform can receive data related to a plurality of features. In some embodiments, the received data can include data aggregated from a plurality of mobile platforms.

At block 120, the machine-learning service can determine at least one feature in the plurality of features based on the received data.

At block 130, the machine-learning service can generate an output by the performing a machine-learning operation on the at least one feature of the plurality of features. The machine-learning operation can be selected from among: an operation of ranking the at least one feature, an operation of classifying the at least one feature, an operation of predicting the at least one feature, and an operation of clustering the at least one feature.

In some embodiments, generating the output by the machine-learning service can include selecting a machine-learning algorithm to perform the machine-learning operation. In particular embodiments, selecting the machine-learning algorithm to perform the machine-learning operation can include the machine-learning service selecting the machine-learning algorithm.

In some of the particular embodiments, selecting the machine-learning algorithm to perform the machine-learning operation can include receiving a selection related to the machine-learning algorithm from an application executing on the mobile platform, where the application differs from the machine-learning service. In specific of the particular embodiments, receiving a selection related to the machine-learning algorithm from the application can include receiving a selection related to the machine-learning algorithm from the application via an Application Programming Interface (API) of the machine-learning service.

At block 140, the machine-learning service can send the output. In some embodiments, the received data can include data related to a plurality of features related to communication signals and locations, where the mobile platform is located at a first location, and where the output includes an indication of whether to search for the communications signal at the first location.

In other embodiments, the received data can include data related to a plurality of features related to durations of communication sessions and the output can include a prediction of a duration of a new communication session. In still other embodiments, the received data can include data related to features of telephone calls originated by the mobile platform and the output can include a called party of a telephone call to be originated by the mobile platform. In even other embodiments, the received data can include data related to volume and mute settings of the mobile platform and the output can include a prediction of a volume setting and/or a mute setting of the mobile platform. In yet other embodiments, the received data can include data related to one or more images, and the output can include a name related to at least one image of the one or more images.

In some embodiments, method 100 can further include: (i) storing the at least one feature and the output for use by the machine-learning service, (ii) receiving second data related to a second plurality of features at the machine-learning service, (iii) determining at least a second feature in the second plurality of features based on the second data, (iv) generating a second output by the machine-learning service performing the machine-learning operation on the at least the second feature and the stored at least one feature and output, and (v) sending the second output from the machine-learning service.

Figure 1B:
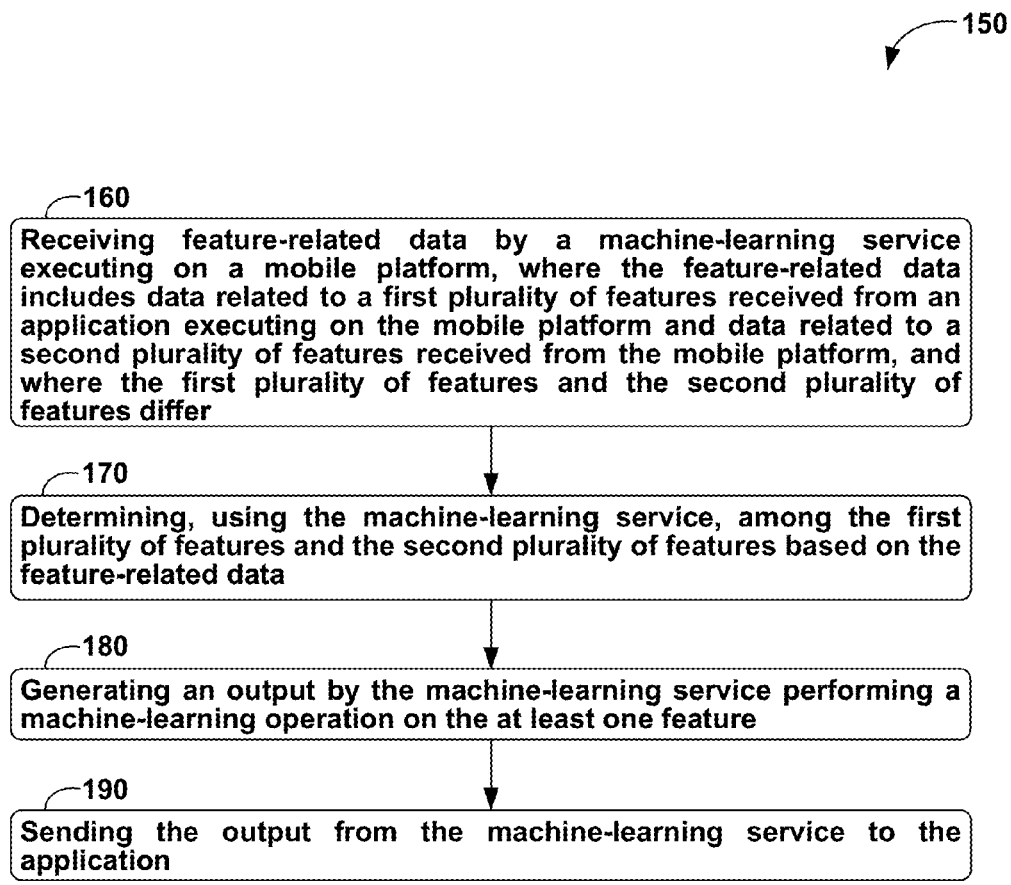
FIG. 1B is a flow chart of another method, in accordance with an example embodiment.

FIG. 1B is a flow chart of method 150, in accordance with an example embodiment. In some embodiments, part or all of method 150 can be executed using one or more mobile platforms; e.g., mobile platform 200, 502, 602, 802, 1202, 1502, 1852, 2002 and/or one or more computing devices; e.g., computing device 2200.

Method 150 begins at block 160, where a machine-learning service executing on a mobile platform can receive feature-related data. The feature-related data can include data related to a first plurality of features received from an application executing on the mobile platform and data related to a second plurality of features received from the mobile platform. The first plurality of features and the second plurality of features can differ.

In some embodiments, the first plurality of features can include a feature selected from among a time, a location, a duration, a signal strength, a power level, a party of a telephone call, an e-mail address, a contact, and a calendar entry. In other embodiments, the second plurality of features can include a feature selected from among an image-related feature and a speech-related feature.

At block 170, the machine-learning service can determine at least one feature from among the first plurality of features and the second plurality of features based on the feature-related data.

At block 180, the machine-learning service can generate an output by performing a machine-learning operation on the at least one feature of the plurality of features.

At block 190, the machine-learning service can send the output to the application.

Example Machine Learning and Adaptation Service

Figure 2:
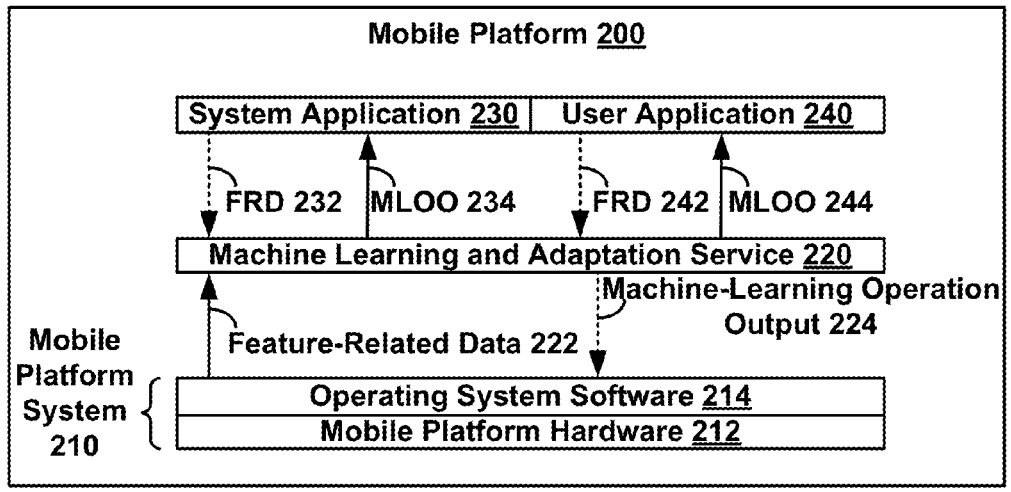
FIG. 2 is a block diagram of a mobile platform, in accordance with an example embodiment.

FIG. 2 is a block diagram of mobile platform 200, in accordance with an example embodiment. Mobile platform 200 includes mobile platform system 210, machine learning and adaptation service 220, system application(s) 230, and user application(s) 240.

FIG. 2 shows that mobile platform system 210 includes mobile platform hardware 212 and operating system software 214. Mobile platform hardware 212 can include hardware of a computing device, such as computing device 2200 described below. Operating system software 214 can include, but is not limited to software configured to utilize mobile platform hardware 212, provide user services such as user interfaces for the mobile platform, allocate resources, and schedule processes and/or threads. An example of operating system software 214 is the Android operating system developed by Google Inc. of Mountain View, Calif. Additional hardware and/or software can be used by mobile platform system 210 as well.

Application processes, such as system application 230 and user application 240, can execute using mobile platform system 210. System application 230 can be an application provided by a provider of part or all of mobile platform system 210. User application 240 can be an application provided by an entity other than a provider of part or all of mobile platform system 210

Machine learning and adaptation service 220 can be configured to provide the functionality of a machine-learning service. FIG. 2 shows that machine learning and adaptation service 220 can communicate with both mobile platform system 210 and applications 230, 240 via feature-related data (FRD) and machine-learning operation output (MLOO).

Feature-related data can be "built-in" or provided by mobile platform system 210; e.g., as feature-related data 222. Built-in feature related data can include, but are not limited to, times, dates, locations, settings for mobile platform hardware 212 (ringing volume, mute settings, ring tones, brightness levels, power/battery data, etc.), calling data (calling party, called party, dialed digits, calling state, etc.), power/battery data, communication network data (addresses, networks, login/password information, signal strengths, etc.), current application(s) being executed, and user preference information.

Machine learning and adaptation service 220 can determine one or more features from feature-related data 222. For example, suppose that feature-related data 222 includes the text of a Short Message Service (SMS) message stating "I'm outta here." Machine learning and adaptation service 220 can generate features represented as feature vectors. An example feature vector for SMS messages can be a <word, frequency> pair. Using the example SMS message text, a set of corresponding example feature vectors can be {<I'm, 1>, <outta, 1>, <here, 1>}. As another example, suppose text of an e-mail reads "Scott—Either we go now, or we go after John's talk", then a set of corresponding example feature vectors can be {<Scott—, 1>, <Either, 1>, <we, 2>, <go, 2>, <now, 1>, <or, 1>, <after, 1>, <John's, 1>, <talk, 1>}.

As another example, suppose a list of suggested labels W1, W2, W3 . . . Wn were provided to a user with a request to "click on" the one best representing the user's current location. The user clicked on label W4 to select W4 as the closest representation. Then, perhaps as part of a training exercise, the list of suggested labels can be provided as features to machine learning and adaptation service 220. An example feature can be a <higher ranked feature, lower ranked feature> feature vector, and as applied to the list of suggested labels, the following feature vectors can be determined <W4, W1>, <W4, W2>, <W4, W3>, <W4, W5> . . . <W4, Wn>. Many other examples of features, feature vectors, and feature-related data are possible as well.

In some embodiments, feature-related data can include commands to machine learning and adaptation service 220, such as a command to "train" or learn about input data and perform one or more machine learning operations on the learned input data. For example, machine learning and adaptation service 220 can receive a command to cluster a series of locations, which can be provided as latitude/longitude pairs, perhaps using cluster labels such as "Work", "Home", "School", and "Gym". Then, once trained, machine learning and adaptation service 220 can output one or more machine-learning operation outputs 224. Continuing the location example mentioned above, given an input latitude/longitude pair as part of feature-related data 222, the corresponding machine-learning operation output 224 can be a cluster label.

Machine learning and adaptation service 220 can also train with and utilize feature-related data provided by system application 230 as feature-related data 232 and/or feature-related data provided by user application 240 as feature-related data 242. Then, upon receiving input data, machine learning and adaptation service 220 can provide machine-learning operation output(s) to system application 230 as machine-learning operation output 234 and/or provide machine-learning operation output(s) to user application 240 as machine-learning operation output 244. That is, machine learning and adaptation service 220 need not have detailed information about feature-related data 222, 232, 242 a priori; rather machine learning and adaptation service 220 can utilize incremental learning techniques to generate a model of feature-related data 222, 232, 242, and update the model as needed based on feature-related data 222, 232, 242.

Additionally, machine learning and adaptation service 220 need not have detailed information about applications 230, 240 a priori. Rather, applications 230, 240 can use interface(s) to machine learning and adaptation service 220 to permit use of machine learning and adaptation service 220 as a toolkit of machine-learning techniques.

Figure 3:
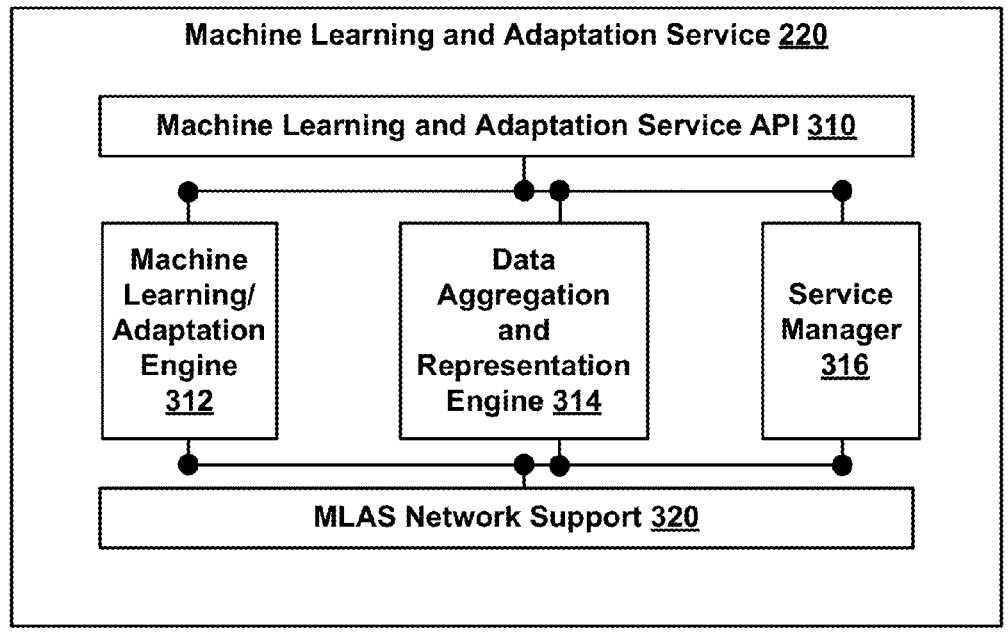
FIG. 3 is a block diagram of a machine learning and adaptation service, in accordance with an example embodiment.

FIG. 3 is a block diagram of machine learning and adaptation service 220, in accordance with an example embodiment. Machine learning and adaptation service 220 includes machine learning and adaptation service API 310, machine learning and adaptation engine (MLAE) 312, data aggregation and representation engine (DARE) 314, service manager 316, and machine learning and adaptation service (MLAS) network support 320.

Machine learning and adaptation service API 310 provides interfaces to access a number of machine learning and adaptation techniques and to exchange data with machine learning and adaptation service 220. In some embodiments, models for machine learning and adaptation can be saved and loaded via machine learning and adaptation service API 310.

Machine learning and adaptation engine 312 performs the machine learning and adaptation techniques of machine learning and adaptation service 220. In some embodiments, machine learning and adaptation engine 312 can learn data from one or more sources, and then classify, cluster, rank, and/or predict data from given input data.

Classifying data involves putting data with a number N of possible values into one of C1 pre-determined categories, where C1 is finite. For an example with C1=2, a mobile platform can be classified, for each value T of a set of times, into one of two categories: either "powered up" or "not powered up". As another example with C1=3, a location specified as a latitude/longitude pair (or via another technique) can be classified into one of three categories: "having a strong accessible Wi-Fi signal", "having an adequate accessible Wi-Fi signal", or "having little or no accessible Wi-Fi signal." Many other examples are possible as well.

Classification can be performed using one or more statistical classification techniques, such as, but not limited to, linear classifiers, support vector machines, quadratic classifiers, kernel estimation, decision trees, neural networks, Bayesian techniques and/or networks, hidden Markov models, binary classifiers, and/or multi-class classifiers.

Clustering data involves putting data with a number N of possible values into one of C2 clusters, where C2 is finite, and where the clusters are not necessarily pre-determined. Generally, each data item in a given cluster is more similar to each other than to data item(s) in other cluster(s). For example, a mobile platform can track its location throughout the day to find clusters of locations where the mobile platform can be commonly found, such as work location(s), home location(s), shopping location(s), entertainment location(s), and other location(s). Location clusters can vary from person to person; an attorney who works at a law office and then frequents a restaurant may consider the law office as a "work location" and the restaurant as an "entertainment location", but chef may consider the law office as an "other location" and the restaurant as a "work location."

Clustering can be performed using one or more clustering algorithms, such as, but not limited to, connectivity-based clustering, hierarchical clustering, centroid-based clustering, distribution-based clustering, density-based clustering, and partitioning algorithms.

Ranking a set of data items of size S involves applying a ranking function RF to the S data items and returning the highest (or lowest) N ranked data items, where 0<N≦S. For example, suppose a co-ed volleyball team had the following statistics for points scored:

TABLE 1

| Name | Points Scored |
| --- | --- |
| Pat | 10 |
| Chris A. | 9 |
| Kelly | 8 |
| Taylor | 7 |
| Alex | 6 |
| Drew | 5 |
| M. C. | 4 |
| Jaden | 3 |
| Chris B. | 2 |
| Lucky | 1 |

Let the ranking function RF rank the N=10 team players listed in Table 1 from 1 to N based on points scored. For this example, RF("Pat")=1, RF("Chris A")=2, and RF("Lucky")=10.

Another ranking example is ranking documents based on a query of one or more keywords. The ranking of a document D out of a total of N documents can express the relative relevance of document D to the query. In some embodiments, rankings can have two or more partitions or levels. For example, given a query with keywords K1, K2, ... Kn, documents can first be ranked as relevant or irrelevant based on keywords K1-Kn. Then, a second ranking function can rank the subset of relevant documents, perhaps in more detail.

Ranking can be performed using one or more ranking algorithms, such as, but not limited to, instance ranking algorithms, label ranking algorithms, subset ranking algorithms, rank aggregation algorithms, bipartite/k-partite ranking algorithms, and learning-to-rank algorithms.

Predicting data can involve determining a predicted value given a previous pattern of values. For example, given that the previous N=20 values were: 1, 2, 1, 2, 1, 2, 1, 2, 1, 2, 1, 2, 1, 2, 1, 2, 1, 2, 1, and 2, the predicted value may be 1. Prediction can be performed using one or more prediction algorithms, such as, but not limited to, minimax, decision tree algorithms, classification tree algorithms, linear regression, polynomial regression, statistical regression, curve fitting, interpolation, and maximum likelihood estimation algorithms.

Data aggregation and representation engine 314 aggregates, or combines, data from applications and the mobile platform system and stores the aggregated data in a model accessible to machine learning and adaptation engine 312. In some scenarios, aggregation of data enables discovery of new inferences based on the combined data that were difficult to observe in the raw data. For example, suppose a mobile platform is located in the labeled locations listed in Table 2 below:

TABLE 2

| Location | % of Time at Location |
|---|---|
| Work | 42 |
| Home | 38 |
| Other | 12 |
| Store 1 | 3 |
| Store 2 | 1 |
| Bart | 1 |
| Jill | 1 |
| Mom/Dad | 1 |
| Maureen | 1 |

Assuming a large amount of the "Other" location time is time spent driving, these data indicate that the mobile platform is at work, home, or traveling. That is, the mobile platform spends 80% of the time at work and home and more than 90% of the time at work, home, or (likely) in a vehicle. Based on this information, the mobile platform likely has easy access to commercial electrical power at least 80% of the time, and so battery life may not be as important to this mobile platform, as compared to, say, being able to recharge a battery of the mobile phone from commercial electrical power and while driving.

Service manager 316 can manage learning session(s), or instances of one or more machine learning and adaptation models, for the application(s) utilizing machine learning and adaptation service 220. Service manager 316 can also coordinate permissions for access and/or display of data. In some embodiments, service manager 316 can prioritize learning sessions and/or resources used by machine learning and adaptation service 220

Machine learning and adaptation service network support 320 can provide "back end" support to access non-private and/or anonymized data that has been authorized to be gathered from a plurality of mobile platforms. In some scenarios, the non-private and/or anonymized data can be resident on mobile platform 200, while in other scenarios, part or all of the non-private and/or anonymized data can reside on other devices, such as servers and/or other mobile platforms. In the other scenarios, mobile platform 200 may temporarily or permanently store the non-private and/or anonymized data, perhaps depending on the access to the non-private and/or anonymized data provided to mobile platform 200 and/or machine learning and adaptation service 220.

As the non-private and/or anonymized data is administered by machine learning and adaptation service network support 320, the non-private and/or anonymized data can be used by machine learning and adaptation service 220, but not shared or "hidden" from applications. In some embodiments not shown in FIG. 3, a built-in manager can enable access to built-in features for machine learning and adaptation service 220 while hiding some or all built-in features from applications.

Figure 4:
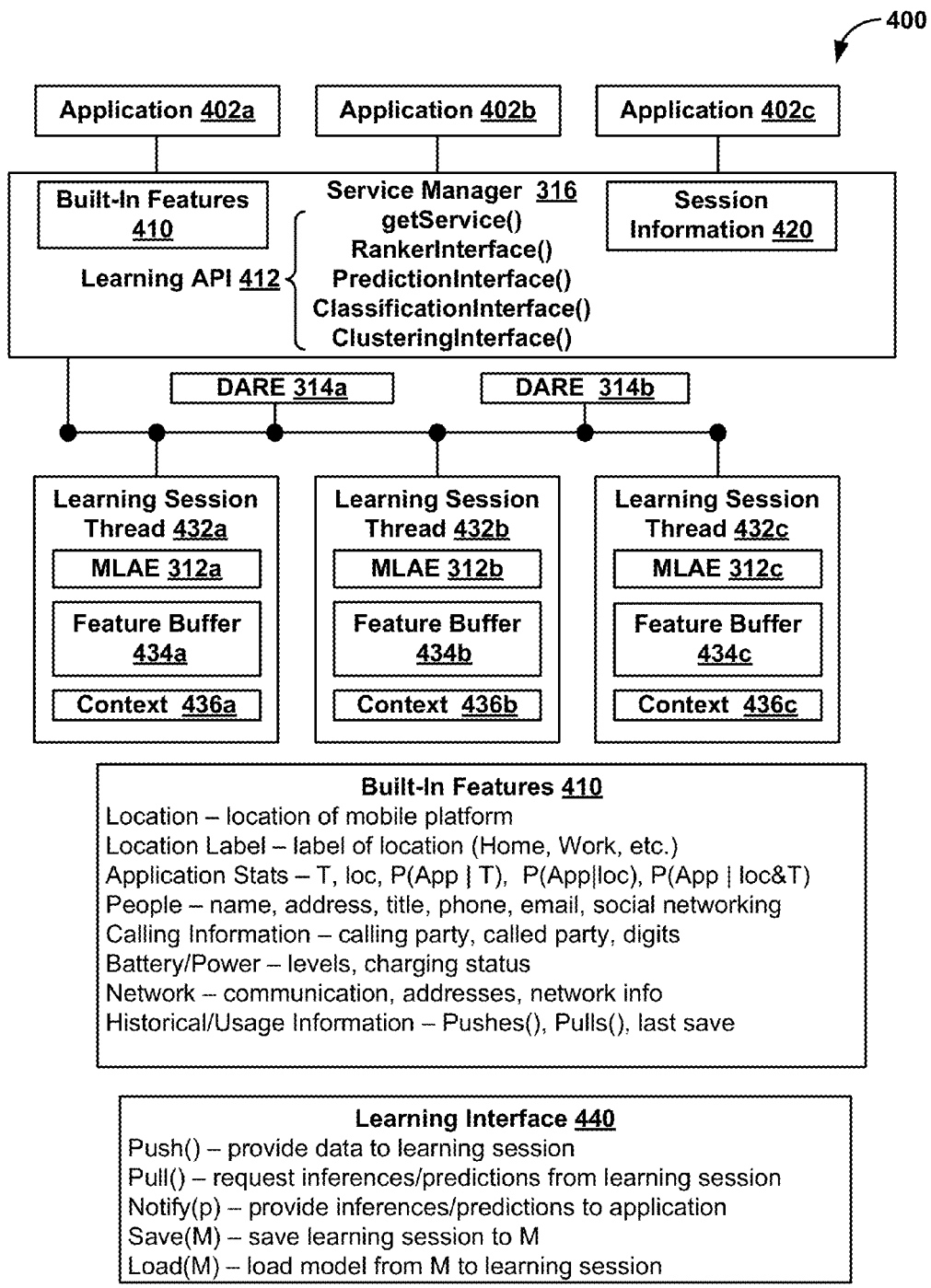
FIG. 4 depicts programming interfaces for the machine learning and adaptation service, in accordance with an example embodiment.

FIG. 4 depicts programming interfaces 400 related to machine learning and adaptation service 200, in accordance with an example embodiment. Applications 402a, 402b, 402c communicate with service manager 316 to manage learning sessions. Each learning session is shown in FIG. 4 as a learning session thread. For example, learning session threads 432a, 432b, 432c respectively communicate with applications 402a, 402b, and 402c to conduct a learning session. In some embodiments not shown in FIG. 4, an application can conduct zero learning sessions or conduct multiple learning sessions simultaneously.

FIG. 4 shows that service manager 316 includes built-in features 410, learning application programming interface (API) 412, and session information 420. In embodiments not shown in FIG. 4, built-in features 410, learning API 412, and/or session information 420 can be components of other portions of machine learning and adaptation service 220. In still other embodiments not shown in FIG. 4, built-in features 410, learning API 412, and/or session information 420 can be separate components of machine learning and adaptation service 220.

As FIG. 4 shows just below learning sessions 432a-43c, built-in features 410 can provide various types of data to service manager 316 and, more generally, to machine learning and adaptation service 220. FIG. 4 shows examples of data provided by built-in features 410, such as location, location labels, application statistics, people-related features, calling information, battery/power data, network information, and historical/usage information. Locations can be specified in terms of latitude/longitude pairs, latitude/longitude/altitude triples, street addresses, intersections, and/or using other location-specifying data. Location labels can include names such as the "Locations" shown in Table 2 above; e.g., work, home, stores, etc.

Application statistics can include a time T an application App was last executed, a location loc an application was last executed, a probability P(App|T) that the application App is executing at a given time, a probability P(App|loc) that App is executing at a given location, and a probability P(App|T & loc) that App is executing at a given location at a given time. The above-mentioned application statistics can be generated by statistical software operating on data regarding application execution times and locations. Other statistics can be determined as application statistics as well or instead.

Information about people can be determined from contact information, calendar information, social networking accounts and pages, and from other sources. As part of built-in features 410, information such as, but not limited to a person's name, address, phone number(s), e-mail address(es), social networking account information can be provided to machine learning and adaptation service 220.

Calling information can include per-call information such as calling party, dialed digits/called party information, call duration, call start time, and call end time. In some cases, calling information can also or instead include contact information, such as a name and/or "Caller-ID" data associated with a called party, and/or historical calling information for a number of previous calls NPC, where NPC>0.

In embodiments not shown in FIG. 4, other types of communication information can be provided as part of built-in features 410. Examples of other types of communication information include, but are not limited to, e-mail information, SMS information, blog information, and social networking messaging information.

Battery/power information can include, but is not limited to, information about batteries and/or power for the mobile platform, such as battery levels, battery status (e.g., operating, disconnected, charging), commercial power status (e.g., connected, charging, disconnected), time(s) of connection(s) to and/or disconnection(s) from commercial power. Network information can include, but is not limited to, information about telecommunications networks, local area networks, other networks, network addresses, connection time(s), disconnection time(s), and network status (e.g., connecting, connected, acquiring address(es), communicating data, idle, disconnecting, disconnected).

Historical/usage information can include, but is not limited to, information about previous usage of machine learning and adaptation service 220. Example information includes a number of features "pushed" or provided to machine learning and adaptation service 220, a number of items "pulled" or requested from machine learning and adaptation service 220, a number of applications currently using machine learning and adaptation service 220, a number of applications that have used machine learning and adaptation service 220 in a unit period of time (e.g., a number of application using machine learning and adaptation service 220 per hour or per day), and maximum and/or minimum numbers of applications currently using machine learning and adaptation service 220.

Learning API 412 can include at least the functions shown in FIG. 4: getService( ), RankerInterface( ), PredictionInterface( ), ClassificationInterface( ), and ClusteringInterface( ). In some embodiments, more or fewer functions can be part of learning API 412. An application can call the getService( ) function to initialize and start a learning session; e.g., initialize and create a learning session thread. The getService( ) function can return a learning session key that can specify a specific learning session.

FIG. 4 shows learning API 412 with four example learning interfaces: RankerInterface( ), PredictionInterface( ), ClassificationInterface( ), and ClusteringInterface( ). In some embodiments, more or fewer learning interfaces can be part of learning API 412.

An application can call the RankerInterface( ) function to initialize and generate a ranking model of machine learning and adaptation service 220. The ranking model can be used to order or rank a set of data items of size S by applying a ranking function RF to the S data items and returning the highest (or lowest) N ranked data items, such as discussed above in the context of FIG. 3. An application can call the PredictionInterface( ) function to initialize and generate a prediction model of machine learning and adaptation service 220. The prediction model can be used to determine a predicted value given a previous pattern of values, such as discussed above in the context of FIG. 3.

An application can call the ClassificationInterface( ) function to initialize and generate a classification model of machine learning and adaptation service 220. The classification model can be used to put data with a number N of possible values into one of C1 pre-determined categories, where C1 is finite, such as discussed above in the context of FIG. 3. An application can call the ClusteringInterface( ) function to initialize and generate a clustering model of machine learning and adaptation service 220. The clustering model can be used to put data with a number N of possible values into one of C2 clusters, where C2 is finite, and where the clusters are not necessarily pre-determined, such as discussed above in the context of FIG. 3.

In some embodiments, an application can use only one learning interface per learning session, while in other embodiments, the application can use multiple learning interfaces per learning session.

Each of the learning interfaces shown in learning API 412 can include at least the functions of example learning interface 440. FIG. 4 shows learning interface 440 with five functions: Push( ), Pull( ), Notify( ), Save( ), and Load( ). In some embodiments, more or fewer functions can be part of learning interface 440.

The Push( ) function can enable an application to provide data to a learning session. The Pull( ) function can enable an application to request and receive information, such as inference(s) and/or prediction(s), from a learning session.

The Notify( ) function can enable an application to receive information, such as inference(s) and/or prediction(s), from a learning session without requesting the information. For example, suppose a learning session is informed about an event of interest to the application and consequently uses its learning model to generate a prediction for use by the application. In this example, the application has not requested the prediction, i.e., the application did not call the Pull( ) function. Therefore, the learning session can provide the prediction to the application using the Notify( ) function.

The Save( ) function can save learning-model data needed to start/restart a learning model, and provide a copy of the learning-model data to the application. The Load( ) function can take a copy of learning-model data from the application and to start/restart a learning model with the learning-model data.

Session information 420 can include information about each learning session conducted by machine learning and adaptation service 220. Example session information 420 can include, but is not limited to, a learning session key for the learning session, information about the application such as an application name, application addressing information, type(s) of learning interface(s) used in the learning session (e.g., RankerInterface( ), PredictionInterface( )), usage information for the learning interface(s), and perhaps data stored by the learning model for the learning session, such as a learning model cache.

As mentioned above, service manager 316 can manage learning session(s) for the application(s) utilizing machine learning and adaptation service 220. Specifically, as shown in FIG. 4, service manager can enable communications between applications 402a-402c, data aggregation and representation engines 314a, 314b and learning session threads 432a-432c. As each application 402a-402c is associated with one respective learning session thread 432a-432c, service manager 316 can ensure that information from a given application is directed to the corresponding learning session thread, and not routed to another learning session thread, and vice versa. One technique to ensure that information from a given application is directed to the corresponding learning session thread is to verify that a learning session key is common to both the given application and the corresponding learning session thread. In some embodiments, session information 420 can include a mapping between session keys, applications, and learning session threads.

Each of data aggregation and representation engines 314a, 314b aggregates, or combines, data from applications 402a-402c and the mobile platform system and stores the aggregated data in a model accessible to appropriate learning session thread(s) 432a-432c, such as discussed above in the context of FIG. 3.

Each of learning session threads 432a, 432b, and 432c implements a learning model. FIG. 4 shows that learning session threads 432a, 432b, and 432c each respectively include: machine learning and adaptation engine (MLAE) 312a, 312b, 312c, feature buffer 434a, 434b, 434c, and context 436a, 436b, 436c. Each of machine learning and adaptation engines 312a, 312b, 312c performs the machine learning and adaptation technique discussed above in the context of FIG. 3 and this figure, FIG. 4. Each of feature buffers 434a, 434b, 434c stores feature(s) used to train and/or perform functions for the corresponding machine learning and adaptation engines 312a, 312b, 312c.

Each of contexts 436a, 436b, and 436c stores a learning model that embodies classifications, predictions, clusterings, or rankings learned by the corresponding machine learning and adaptation engines 312a, 312b, 312c. A respective context can be saved by the application using the Save( ) function of learning interface 440, and the respective context can be loaded using the Load( ) function of learning interface 440.

Example Machine Learning and Adaptation Service Usage Scenarios

Figure 5A:
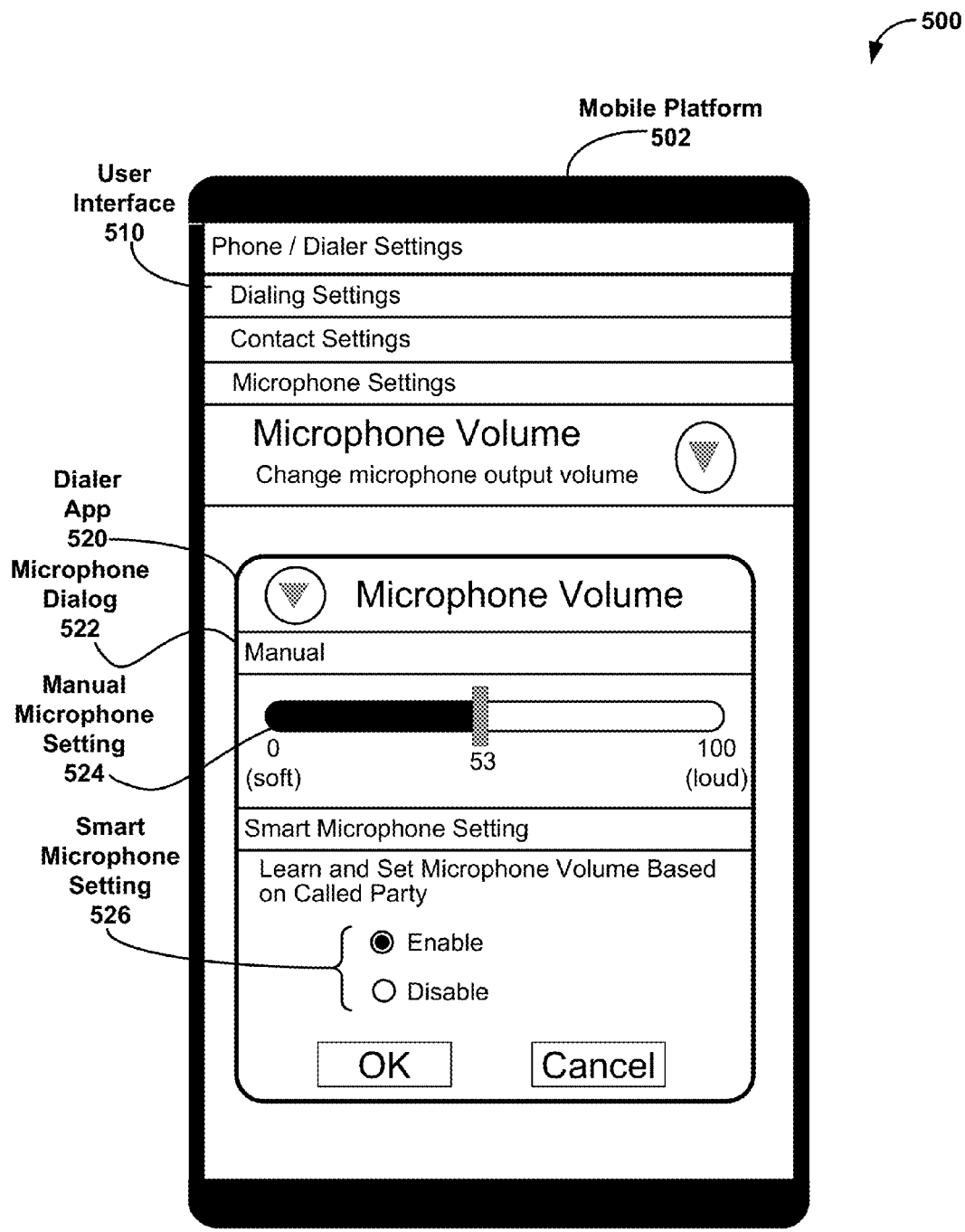
FIG. 5A shows an example user interface used in a first scenario, in accordance with an example embodiment.

FIG. 5A shows example user interface 510 used in example scenario 500, in accordance with an example embodiment. Scenario 500 includes user interface 510 executing on mobile platform 502. As shown in FIG. 5A, user interface 510 includes an interface for dialer application 520 that includes microphone dialog 522. Microphone dialog 522 includes manual microphone setting 524, smart microphone setting 526, an OK button to save current settings before exiting dialog 522, and a Cancel button to exit dialog 522 without saving current settings.

Manual microphone setting 524 includes a slider bar that enables a user to set a microphone output setting between a minimum setting of 0, which effectively mutes the microphone, and a maximum setting of 100, which provides the maximum output volume (a.k.a. maximum gain) for a given input. FIG. 5A shows manual microphone setting set to 53, or approximately halfway between the minimum and maximum settings.

As shown in FIG. 5A, smart microphone setting 526 can learn and set microphone volume based on called party and can be set to either enabled or disabled. When smart microphone setting 526 is disabled, dialer application 520 can instruct a microphone application (not shown in FIG. 5A) to use manual microphone setting 524 to determine output volume for a microphone of mobile platform 502. When smart microphone setting 526 is enabled, dialer application 520 can use a learning service of machine learning and adaptation service 220 to perform a machine-learning operation to provide setting values for the microphone setting. Then, upon receiving a setting value, dialer application 520 can provide the setting value to the microphone application, which can then determine output volume for the microphone of mobile platform 502 using the setting value. In scenario 500, and as shown in FIG. 5A, smart microphone setting 526 is set to enabled.

Figure 5B:
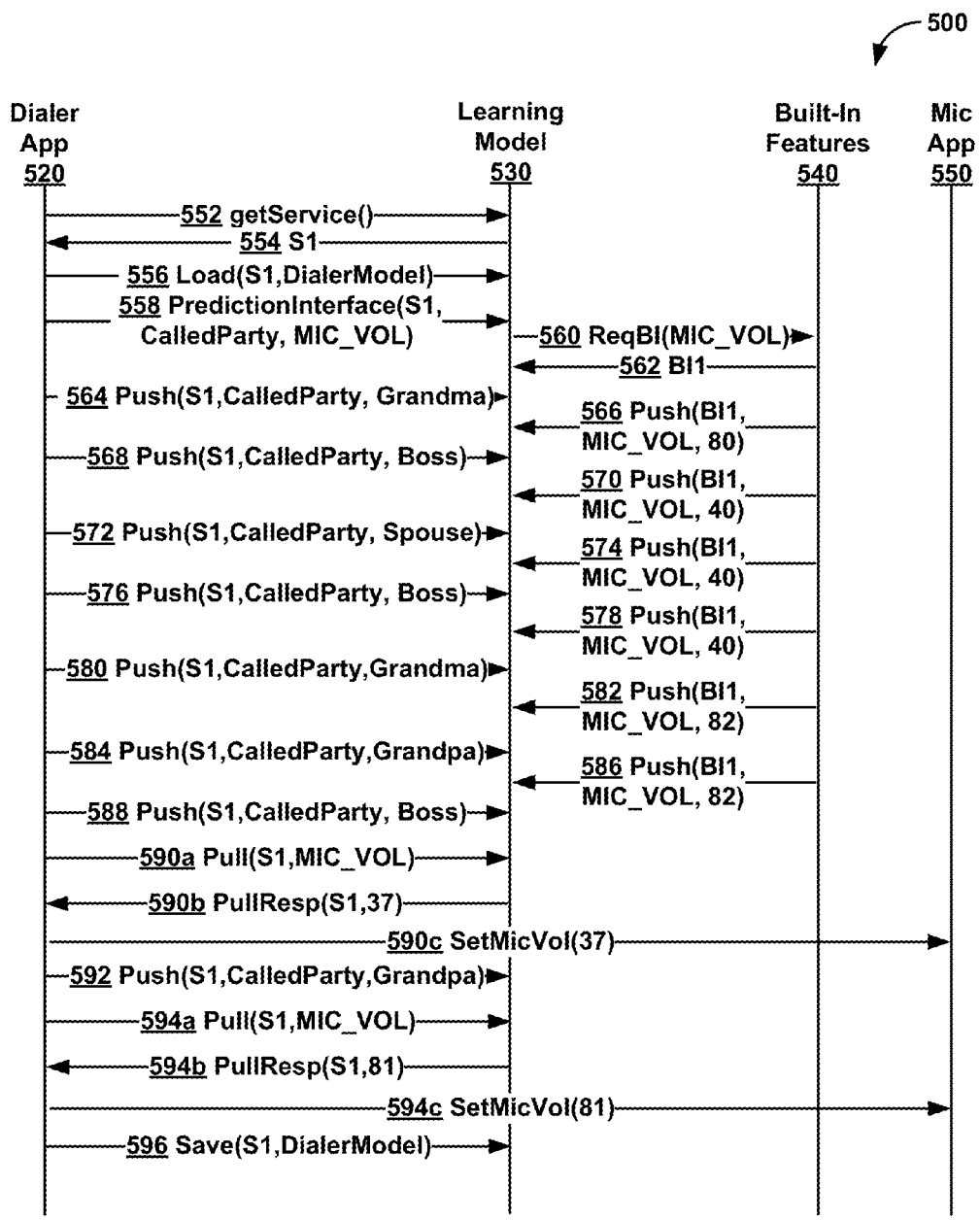
FIG. 5B shows example communications used in the first scenario, in accordance with an example embodiment.

FIG. 5B shows example communications for scenario 500, in accordance with an example embodiment. As part of the initial communications, learning model 530 is partially trained based on data stored in a "DialerModel" variable and then loaded into learning model 530 via a Load( ) function call. In FIG. 5B, communications between dialer application 520 and learning model 530 of machine learning and adaptation service 220 indicate that dialer application 520 had access to calling party information. As there are no apparent privacy concerns with microphone settings, microphone settings can be requested by dialer application 520 and provided by learning model 530. Just before concluding, learning model data is stored back in the DialerModel variable to preserve information garnered during scenario 500 for later use and loading into learning model 530.

In FIG. 5B, scenario 500 continues with dialer application 520 calling the getService( ) function of learning model 530 via communication 552. In response, learning model 530 provides a session key S1 via communication 554 to dialer application 520. Session key S1 is included for subsequent communications between dialer application 520 and learning model 530 to permit addressing the subsequent communications to the correct learning model, e.g., learning model 530 and correct application, e.g., dialer application 520 for a learning session keyed by S1.

Scenario 500 continues with dialer application 520 calling the Load( ) function via communication 556 to provide stored learning model data, e.g., a context, stored in a DialerModel variable passed as a parameter of the Load( ) function to learning model 530. Upon receipt of communication 556, learning model 530 can load a context and perhaps other data stored in the DialerModel variable into a learning session thread that can be utilized by learning model 530. In some scenarios not shown in FIG. 5B, learning model 530 can provide a response to communication 556, such as a return value to the Load( ) function and/or a communication providing a status of the Load( ) function; e.g., LoadOK or LoadFail.

Dialer application 520 can instruct learning model 530, via communication 558, to set up a prediction interface. As shown in FIG. 5B, communication 558 includes a PredictionInterface( ) call with three parameters: session key S1, an input-source reference of CalledParty, and a requested output prediction of microphone volumes, as shown in FIG. 5B, using the predefined MIC_VOL value.

In response, learning model 530 sends communication 560 to built-in features 540 to request a built-in feature (ReqBI) of microphone values, as shown in FIG. 5B by passing the predefined MIC_VOL value to built-in features 540. Built-in features 540 can include at least the functionality of built-in features 410 discussed above. In response, built-in features 540 returns a built-in session key BI1 via communication 562. Built-in session key BI1 is included with subsequent communications between learning model 530 and built-in features 540 to permit addressing the subsequent built-in related communications to the correct learning model.

FIG. 5B continues with dialer application 520 sending communication 564 to learning model 530 with a Push( ) function to inform learning model 530 that a call is being made to a called party "Grandma." Additionally, built-in features 540 sends communication 566, with a Push( ) function to inform learning model 530 that the microphone volume is being set to a setting of 80.

FIG. 5B shows a number of communications 568-586 for five subsequent calls made with the calling parties indicated by dialer application 520 and microphone volume indicated by built-in features 540 to learning model 530 with the values listed in Table 3 below.

TABLE 3

| Communications | Called Party | Microphone Volume |
|---|---|---|
| 568 and 570 | Boss | 40 |
| 572 and 574 | Spouse | 40 |
| 576 and 578 | Boss | 40 |
| 580 and 582 | Grandma | 82 |
| 584 and 586 | Grandpa | 82 |

Scenario 500 continues with dialer application 520 sending communications 588 and 590a to learning model 530. Communication 588 uses the Push( ) function to inform learning model 530 that a call is being made to a called party "Boss." Communication 590a requests, via the Pull( ) function, a predicted value for the MIC_VOL (microphone volume) setting.

In response to communication 590a, learning model 530 predicts a microphone volume setting of 37 based on data (a) stored in the DialerModel variable and loaded as a consequence of communication 556 and (b) learned from communications 564-586, particularly communications 568, 570, 576, and 578 which relate to calls to a called party of "Boss." Subsequently, learning model 530 can send a Pull Response (PullResp) as communication 590b to dialer application 520 providing the predicted microphone volume setting of 37. In some embodiments, the Pull Response can be a return value of the Pull( ) function of communication 590a. In response to communication 590b, dialer application 520 instructs microphone application 550 to set the microphone volume to 37 via a SetMicVol( ) function communicated in communication 590c.

In some scenarios, learning model 530 can communicate to an application, such as dialer application 520, once the learning model has been trained and is ready to perform machine-learning operations, such as predicting microphone volume levels. In other scenarios, learning model 530 is not trained sufficiently to provide a prediction in response to communication 590a. In these scenarios, learning model 530 can inform the application that the learning model is insufficiently trained to perform machine-learning operations, such as predicting microphone volume settings. In still other scenarios, microphone application 550 can provide a response, such as a function return value or communication (e.g., "SetMicVolOK" or "SetMicVolFail") to the SetMicVol( ) command.

FIG. 5B shows scenario 500 continuing by dialer application 520 sending communications 592 and 594a to learning model 530. Communication 592 informs learning model 530 that a call is being made to a called party "Grandpa" and communication 594a requests a predicted value for the microphone volume setting. In response, learning model 530 predicts a microphone volume setting of 81 based on data stored in the DialerModel variable and learned from communications 564-586, particularly communications 584 and 586 which relate to a call to a called party of "Grandpa." Subsequently, learning model 530 can send a Pull Response as communication 594b to provide the predicted microphone volume setting of 81 to dialer application 520. In response to communication 594b, dialer application 520 can instruct microphone application via communication 594c to set the microphone volume to 81.

Scenario 500 concludes with dialer application 520 call Save( ) function via communication 596 to request that learning model 530 save a context, and perhaps other data, of a learning session thread in the DialerModel variable. In some scenarios not shown in FIG. 5B, learning model 530 can provide a response to communication 596, such as a return value to the Save( ) function and/or a communication providing a status of the Save( ) function; e.g., SaveOK or SaveFail.

Figure 6A:
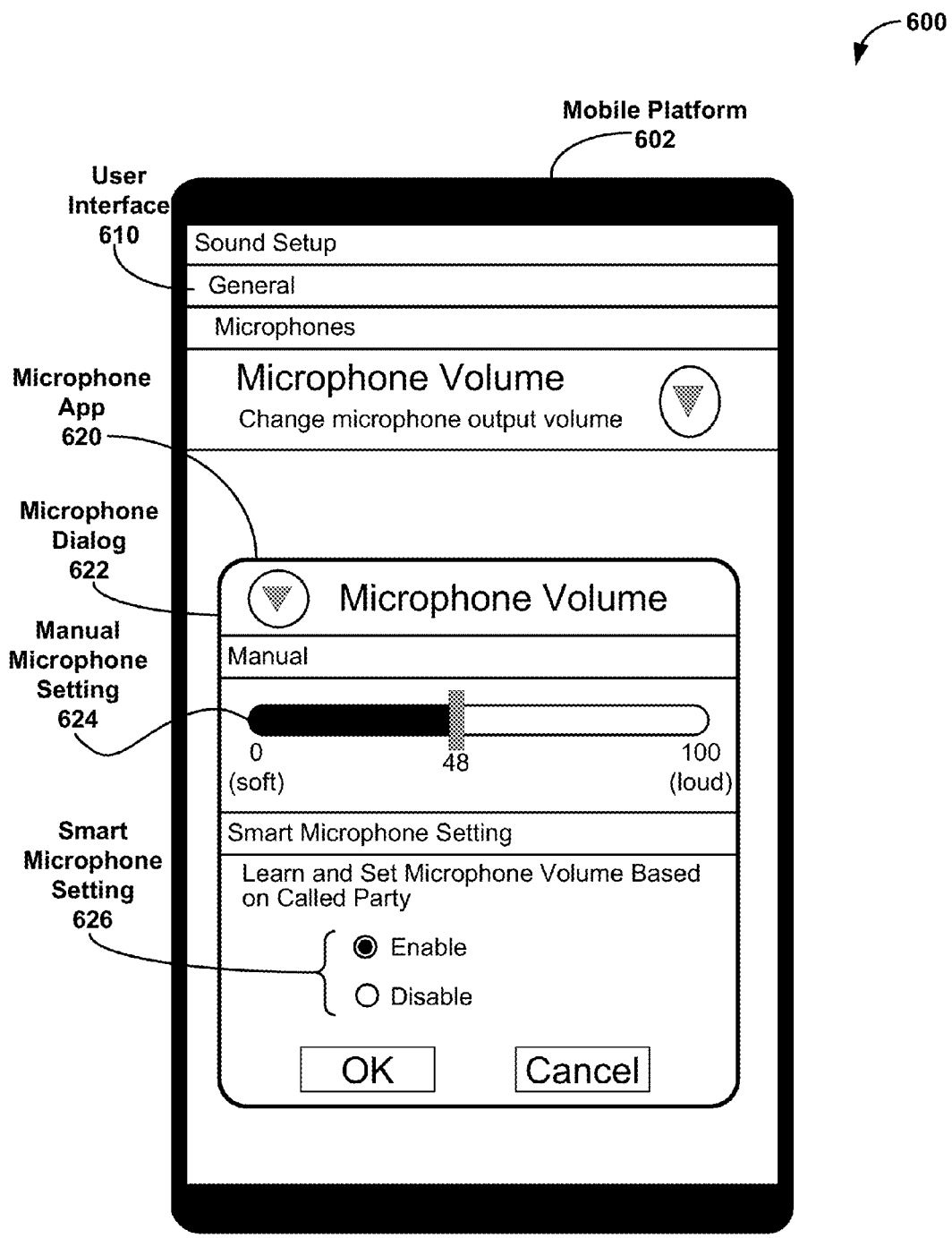
FIG. 6A shows an example user interface used in a second scenario, in accordance with an example embodiment.

FIG. 6A shows example user interface 610 used in scenario 600, in accordance with an example embodiment. Scenario 600 includes user interface 610 executing on mobile platform 602. As shown in FIG. 6A, user interface 610 includes microphone dialog 622 as an interface for microphone application 620. Microphone dialog 622 includes manual microphone setting 624, smart microphone setting 626, an OK button to save current settings before exiting dialog 622, and a Cancel button to exit dialog 622 without saving current settings.

Manual microphone setting 624 includes a slider bar that enables a user to set a microphone output setting to between a minimum setting 0, which effectively mutes the microphone, and a maximum setting of 100, which provides the maximum output volume (a.k.a. maximum gain) for a given input. FIG. 6A shows manual microphone setting 624 set to 48, or approximately halfway between the minimum and maximum settings.

As shown in FIG. 6A, smart microphone setting 626 can be set to either enabled or disabled and used to learn and set microphone volume based on called party. When smart microphone setting 626 is disabled, microphone application 620 can use manual microphone setting 624 to determine an output volume for a microphone of mobile platform 602. When smart microphone setting 626 is enabled, microphone application 620 can use a learning service of machine learning and adaptation service 220 to perform a machine-learning operation to provide setting values. Upon receiving a setting value, microphone application 620 can determine output volume for the microphone of mobile platform 602. In scenario 600, and as shown in FIG. 6A, smart microphone setting 626 is set to enabled.

Figure 6B:
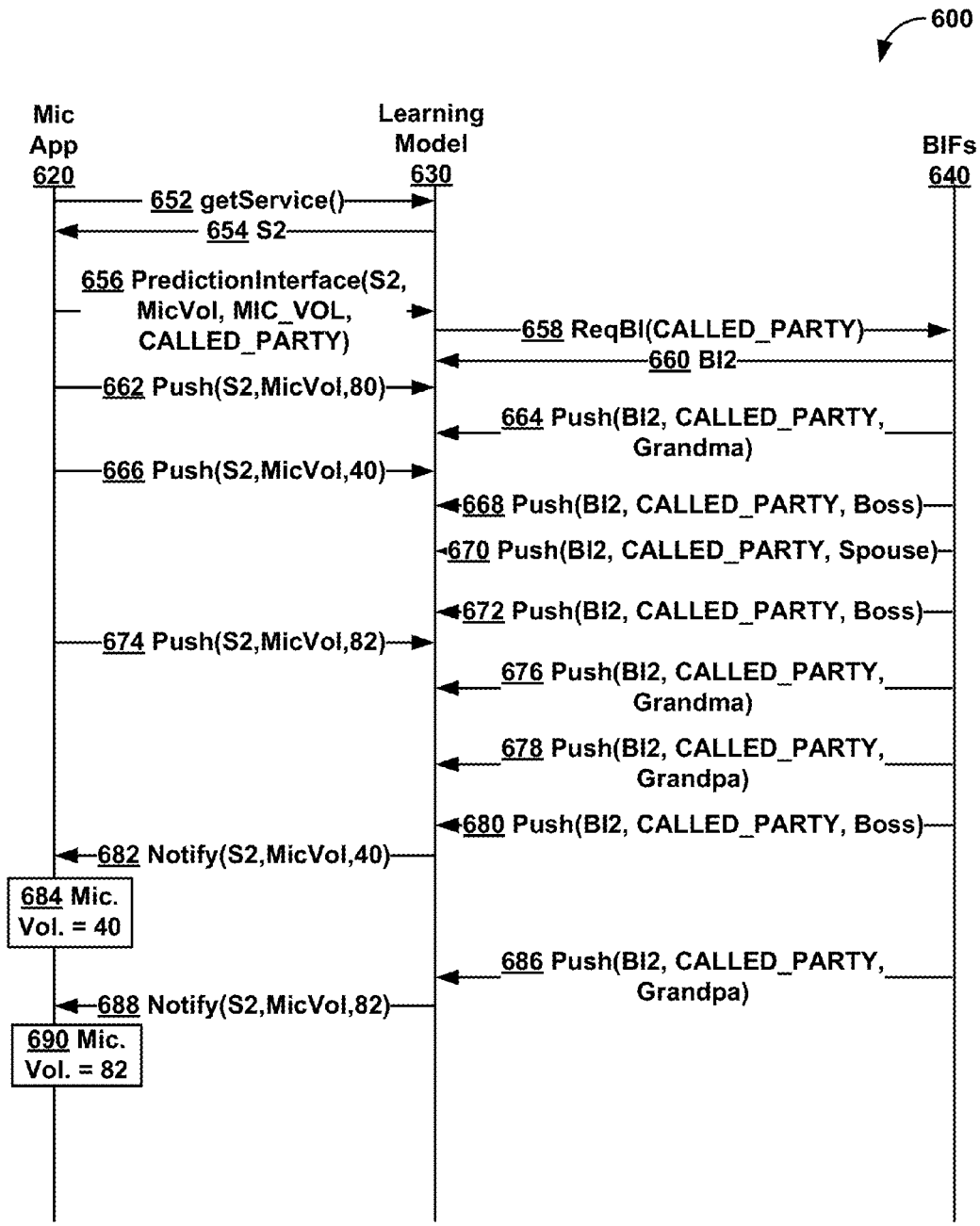
FIG. 6B shows example communications for the second scenario, in accordance with an example embodiment.

FIG. 6B shows example communications for scenario 600, in accordance with an example embodiment. Scenario 600 has similar communications to those of scenario 500 shown in FIG. 5B, but there are two substantive differences. In scenario 500, dialer application 520 has access to calling party information. In contrast, microphone application 620 does not have access to calling party information during scenario 600; thus, calling party information is hidden from microphone application 620 by learning model 630. The second substantive difference is that in scenario 500, learning model 530 was trained in part using data stored in a DialerModel variable. In scenario 600, no stored model data is loaded into learning model 630.

In FIG. 6B, communications in scenario 600 begin with microphone application 620 calling the getService( ) function of learning model 630 via communication 652. In response, learning model 630 provides a session key S2 via communication 654 to microphone application 620. Session key S2 is included for subsequent communications between microphone application 620 and learning model 630 to permit addressing the subsequent communications to the correct learning model, e.g., learning model 630, and the correct application, e.g., microphone application 620, for a learning session keyed by S2.

Microphone application 620 can instruct learning model 630, via communication 656, to set up a prediction interface. As shown in FIG. 6B, communication 658 includes a PredictionInterface( ) call with three parameters: session key 51, an input-source reference MicVol, and a requested output prediction of microphone volumes, as shown in FIG. 6B, using the predefined MIC_VOL value. The requested output prediction of microphone volumes is based on called parties, as indicated by the fourth parameter CALLED_PARTY to the PredictionInterface( ) function. As with the MIC_VOL value, the value of CALLED_PARTY can be predefined. In other scenarios not shown in the Figures, the output prediction can be based on multiple values as requested via the PredictionInterface( ) function.

In response, learning model 630 sends communication 658 to built-in features (BIFs) 640 to request built-in feature (ReqBI) of called party values, as shown in FIG. 6B by passing the predefined CALLED_PARTY value to built-in features 640. Built-in features 640 can include at least the functionality of built-in features 410 discussed above. In response, built-in features 640 returns a built-in session key BI2 to learning model 630 via communication 660. Built-in session key BI2 is included with subsequent communications between learning model 630 and built-in features 640 to permit addressing the subsequent built-in-feature related communications to the correct learning model.

FIG. 6B continues with microphone application 620 sending communication 662 to learning model 630, via the Push( ) function, to indicate that the microphone volume is being set to a setting of 80. Additionally, built-in features 640 can send communication 664, via the Push( ) function, to learning model 630 to indicate that a call is being made to a called party "Grandma."

FIG. 6B shows a number of communications 666-678 for five subsequent calls made with the calling parties indicated by built-in features 640 and microphone volume indicated by microphone application 620 to learning model 630 with the values listed in Table 4 below.

TABLE 4

| Communications | Called Party | Microphone Volume |
|---|---|---|
| 666 and 668 | Boss | 40 |
| 666 and 670 | Spouse | 40 |
| 666 and 672 | Boss | 40 |
| 674 and 676 | Grandma | 82 |
| 674 and 678 | Grandpa | 82 |

Scenario 600 continues with learning model 630 receiving communication 680 from built-in features 640. Communication 680 informs learning model 630 that a call is being made to a called party "Boss."

In response to communication 680, learning model 630 predicts a microphone volume setting of 40 based on data learned from communications 662-678, particularly communications 666, 668, and 672 which relate to calls to a called party of "Boss." Subsequently, learning model 630 can send communication 682 including the Notify( ) function to indicate the predicted microphone volume setting of 40 to microphone application 620. In response to communication 682, microphone application 620 can perform function 684 to set the microphone volume to 40.

Scenario 600 continues with learning model 630 receiving communication 686 from built-in features 640, which informs learning model 630 that a call is being made to a called party "Grandpa." In response to communication 686, learning model 630 predicts a microphone volume setting of 82 based on data learned from communications 662-678, particularly communications 674 and 678 which relate to a call to a called party of "Grandpa." Subsequently, learning model 630 can send communication 688 including the Notify( ) function to indicate the predicted microphone volume setting of 82 to microphone application 620. In response to communication 688, microphone application 620 can perform function 690 to set the microphone volume to 40.

Example Communication Action Prediction Service

Figure 7:
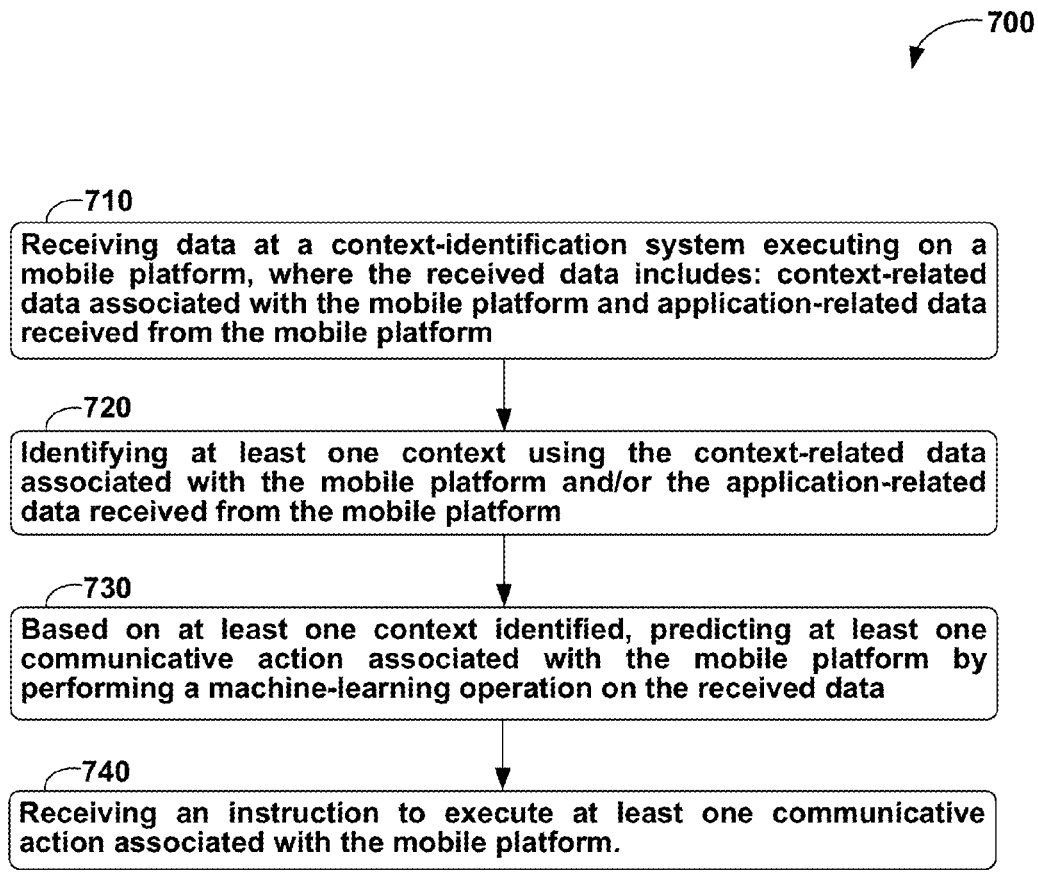
FIG. 7 is a flow chart of a method, in accordance with an example embodiment.

FIG. 7 is a flow chart of method 700, in accordance with an example embodiment. In some embodiments, part or all of method 700 can be executed using one or more mobile platforms; e.g., mobile platform 200, 502, 602, 802, 1202, 1502, 1852, 2002 and/or one or more computing devices; e.g., computing device 2200.

Method 700 begins at block 710, where a context-identification system executing on a mobile platform can receive data. The received data can include context-related data associated with the mobile platform and application-related data received from the mobile platform. In some instances, the context-related data and the application-related data can differ.

In some embodiments, context-related data can be received from a network. Further, in some instances, the network can include a server, a cloud-based server, and/or a database with context-related data stored dynamically, among other possibilities to provide context-related data. Further, in some instances a mobile platform can connect to such a network to receive context-related data continuously and/or periodically, possibly by executing a network connection application. Yet further, in some instances, context-related data can be received by a network with multiple programmable devices sitting on different nodes of the network, possibly as described with respect to FIG. 21. In such instances, context-related data can be received through the network from multiple other programmable devices communicating with the network.

In addition, in some embodiments, the context-related data can be received and/or generated by a context-identification system (CIS) executing on an exemplary mobile platform. In particular embodiments, the CIS can be configured to extract context-related data from information streaming to the mobile platform, possibly from a network as described above. In practice, the CIS may be initiated by a context-related application executed on the mobile platform. An exemplary context-identification system is further described with respect to FIG. 9A.

In some embodiments, a context-related application may be executed to cause the CIS to stream context-related data associated with mobile platform and identify a context. For example, the mobile platform may be turned off before a flight to Chicago and then turned back on after the flight arriving in Chicago. After turning on the mobile platform, the context-related application may cause the CIS to receive and/or generate context-related data. Further certain context signals associated with the context-related data may be extracted such as: a) the location of the mobile platform (i.e. Chicago O'Hare International Airport), b) the time zone based on the location of the mobile platform (i.e., Central Time zone), and/or c) the weather of the area near the mobile platform (e.g., rainy at 58° F.), among other possibilities. In some instances, such context signals may be used to determine that the user has just arrived at Chicago O'Hare International airport via an airplane flight.

Yet further, in some embodiments, context-related data can be directly received and/or generated by sensors associated with the mobile platform and/or components provided inside the mobile platform. In some instances, sensors can be external to the mobile platform and capable of receiving and/or generating context-related data. By way of example and without limitation, sensors could be any one or more of a motion detector (e.g., a gyroscope, an accelerometer, and/or a shock sensor), a camera, a proximity sensor, an impact sensor, a contact sensor (e.g., capacitive sensing device), a location determination device (e.g., a GPS device), a magnetometer, and/or an orientation sensor (e.g., a theodolite), among other possibilities.

In some embodiments, application-related data can include data related to an exemplary mobile platform. For example, application-related data can include data associated with operating the mobile platform. In some instances, application-related data can include a "dialing indication" for opening a phone dialing application and/or a "received call indication" indicating a new call has been received at the mobile platform. Further, a user can enter one or more digits of a phone number to be dialed using the phone dialing application (e.g., entering the digit "5" for the number "555-555-5555"). In some instances, received call indications can include digits of a phone number from another phone calling the mobile platform and/or a phone number from another phone that has called the mobile platform in the past. In addition, an indication can include a digit of the mobile platform's phone number. Further, in some instances, a user can vocalize a command while using voice recognition to dial the phone number (e.g., verbally reciting "call my wife" in the vicinity of the mobile platform).

In some embodiments, application-related data can include a "messaging indication" for opening a messaging application, a short message service (SMS) text messaging application for example. Further, a user may enter one or more text characters of a message to be sent using the messaging application (e.g., entering "h" or "hey" for "hey, you want to play golf today?"). The messaging application may receive a messaging indication for an incoming text message with incoming text (e.g., "Golf sounds great—which course?"). Yet further, a user can vocalize a command and/or part of a command while using voice recognition to send a message using the phone messaging application (e.g., verbally reciting part of "hey, you want to play golf today?") In some instances, a "contact indication" for opening a contact may be provided through a user interface of the mobile platform. In other instances, an "application indication" for executing an application on the mobile platform may be provided through the user interface of the mobile platform.

Further, in some embodiments application-related data may include how an application is executed, opened, and/or interacted with. For example, in some instances, an application may be opened quickly, in parallel with other applications (e.g., a phone dialing application), and in some instances, an application may be opened sequentially after performing other operations (e.g., opening other applications) with the mobile platform. Yet further, in some instances, an application may be executed remotely from a mobile platform, perhaps using a laptop and/or a tablet computer. Other examples are possible as well.

At block 720, the context-identification system may identify at least one context using the context-related data associated with the mobile platform and/or the application-related data received from the mobile platform.

Generally, identifying a context may be identified based on context-related data. Further, in some embodiments, context-related data may include one or more "context signals." Accordingly, an exemplary mobile platform may be configured to identify a context by determining various context signals and/or acquiring context signals from other sources, such as the external sensors and/or networks, perhaps as mentioned above.

A context signal may be any signal that provides a measurement of or otherwise provides information pertaining to the state or the environment associated with a certain subject (e.g., with a certain person, device, event, etc.). Many types of information from many different sources may be used to establish context signals and/or provide information from which context signals may be determined. In some instances a context-identification system (CIS) may be used to receive and/or generate one or more context signals.

By way of example and without limitation, context signals may include: (a) the current time, (b) the current date, (c) the current day of the week, (d) the current month, (e) the current season, (f) a time of a future event or future user-context, (g) a date of a future event or future user-based context, (h) a day of the week of a future event or future context, (i) a month of a future event or future user-context, (j) a season of a future event or future user-based context, (k) a time of a past event or past user-based context, (l) a date of a past event or past user-based context, (m) a day of the week of a past event or past user-based context, (n) a month of a past event or past user-based context, (o) a season of a past event or past user-based context, ambient temperature near the user (or near a monitoring device associated with a user), (p) a current, future, and/or past weather forecast at or near a current location, possibly based on the location of the mobile platform, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, a user's relationship with the user's friends, and/or communications between the user and the user's friends, (u) noise level or any recognizable sounds detected by the mobile platform and/or a monitoring device (v) items that are currently detected by the mobile platform and/or a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information (e.g., whether the user is walking, running, and/or jogging, among other possibilities), (bb) a current location of the user and/or the mobile platform, (cc) a past location of the user and/or the mobile platform, and (dd) a future location of the user and/or the mobile platform. Those skilled in the art will understand that the above list of possible context signals and/or sources of context information is not intended to be limiting, and that other context signals and/or sources of context information are possible in addition, or in the alternative, to those listed above.

Some context signals may take the form of discrete measurements. For example, a temperature measurement or a current GPS location may be received as a context signal. On the other hand, context signals may also be received over time, or may even be a continuous signal stream. For instance, an exemplary mobile platform may use the current volume of a continuous audio feed from an ambient microphone as one context signal, and the volume of a continuous audio feed from a directional microphone as another context signal.

In some embodiments, a context may be identified by extracting and/or interpreting context signals from other types of data (e.g., weather forecast data, satellite data, GPS coordinates, etc.). Further, in some embodiments, a machine-learning operation may cluster the one or more context signals by grouping one or more context signals. In addition, a machine-learning operation may categorize or classify the context by assigning a label to one or more context-signals, possibly after grouping them. For example, one or more context signals may take the form of data indicative of the environment or state information. As such, context signals may be categorized or classified as "at home," "at work," "outside," "in a car," "outdoors," "indoors," "inside," "outside," "free," and/or "in a meeting," among other possibilities.

Furthermore, a context may be a qualitative or quantitative indication that is based on one or more context signals. In addition, a context may be identified by extracting specific context signals from an aggregation of context signals. For example, context signals may indicate a change in time to 6:30 AM on a weekday (possibly setting off an alarm set by a mobile platform). The user may be located at their home and such information may be used to categorize or classify contexts such that the user went from "sleeping" to "awake." In some instances, a context may simply be reflected in a context-related database as "getting ready for work."

In some embodiments, a context may be identified by a mobile platform. For example, a mobile platform may determine, based on GPS location signals, that it has changed its location from one city to another different city. As such, the mobile platform may determine the context to be changing locations from "in Los Angeles" to "in Chicago." Many other examples are also possible. In yet another example, a context may include data indicating changes to the environment or state information such as moving from "home" to "at work," from "outside" to "in a car," from "outdoors" to "indoors," from "inside" to "outside," and/or from "free" to "in a meeting," among other possibilities. Further, in some instances, a context may indicate "going to work," "getting in the car," "going inside," "going outside," and/or "going to a meeting," among other possibilities.

Further, in addition to and/or alternatively, the context-identification system may identify a context based on application-related data. For example, a user operating an exemplary mobile platform may provide an indication of a current context. In particular, after receiving a text message via the mobile platform's text messaging application, the user may respond in a text message reciting, "Can't talk, in a meeting." In a further example, the user may update their status on a social networking site by stating, "I am so excited about this all-day meeting." In addition, the user may have accepted a meeting invite to the all-day meeting set in the user's calendar such that the context-identification can identify the context of "attending a meeting."

Yet further, a context may be identified by a user indication. For example, a dialing indication may be generated by opening up a phone dialing application on the mobile platform. In some instances, a dialing indication can be received by the phone dialing application, e.g., a dialing indication for an incoming phone call. In such instances, the dialing indication may be used to identify a context for "calling co-worker." Further, entering the first digit of the co-worker's phone number may further provide an indication for the "calling co-worker" context.

Yet additionally, a messaging indication may be generated by opening up the messaging application on the mobile platform. In some instances, a messaging indication can be received by the messaging application, e.g., a messaging indication for an incoming text message. In such instances, the messaging indication may be used to identify a context for "messaging co-worker." Further, selecting and/or opening up the messaging co-worker's contact may further provide an indication for such contexts directed to communicating with the messaging co-worker. Other examples are possible as well.

At block 730, based on at least one context identified, the context-identification system can predict at least one communicative action associated with the mobile platform by performing a machine-learning operation on the received data.

In some embodiments, the user may manually provide the context by entering the text "going to office" in a context field of the mobile platform's user interface. In addition, as noted, a context may be classified by assigning a label to one or more context-signals. In some embodiments, a machine-learning operation may be performed to assign such labels. For example, the mobile platform may determine the context from "subway" to "office" when the user leaves the subway station and arrives to their office.

Further, the context identified may provide an indication of a communicative action. By way of example and without limitation, a "communicative action" may include any of the following: dialing a phone number using the mobile platform, ending a current call using the mobile platform, sending a message using the mobile platform, opening a contact on the mobile platform, executing an application on the mobile platform, updating a status on social networking site, and/or sending communication via email, among other possibilities.

In some embodiments, identifying a context may help predict at least one communicative action. For instance, an exemplary mobile platform may store context signals associated with "leaving for work," "driving to work," "driving home from work," and "arriving home." Further, the mobile platform may track previously-called phone numbers associated with such contexts, possibly storing the previously-called phone numbers with their respective contexts in a context-related database. For example, if the mobile platform identifies the "leaving for work" context, the mobile platform may display (e.g., on its user interface) a phone-number for the "leaving for work" context taken from a list of all previously-stored phone numbers called associated with the "leaving for work" context. Other possibilities may also exist.

In some embodiments, there may be more than one phone number associated with a given context identified. In such instances, a machine-learning operation may be performed to rank the phone numbers associated with the given context. For example, the mobile platform may have stored three phone numbers associated with the "driving home from work" context: 1) a son's phone number, 2) a daughter's phone number, and 3) a wife's phone number. In some instances, the mobile platform may be able to determine its velocity, possibly consistent with the movement of the user's car. For example, the mobile platform may be able to detect if it is moving toward the son's location, the daughter's location, and/or the wife's location.

Based on the location and/or velocity of the mobile platform, the mobile platform may change the rankings of the three phone numbers stored. In this example, the mobile platform's location and velocity may indicate the mobile platform is traveling toward the son's location. Given the mobile platform's current direction toward the son's location and possibly as the mobile phone's location gets closer to the son's location, the mobile platform may suggest the user call the son, perhaps by displaying the son's phone number as a "Suggested Call" and/or "Suggested Number" on the phone dialing application's user interface.

Further, identifying changes in context may allow a mobile platform to intelligently predict communicative actions (e.g., a phone number to dial). In some instances, the mobile platform may determine that a current context matches a context that corresponds to a previously-dialed phone number. In such instances, the mobile platform may suggest the user to call the previously-dialed phone number. This aspect is discussed in greater detail below with reference to FIG. 8B. Other examples are possible as well.

At block 740, an instruction can be received to execute at least one communicative action associated with the mobile platform.

In some embodiments, the instruction may be provided from a user of the mobile platform. For example, the mobile platform may provide a prompt on its user interface with a suggested number to call. In some instances, the suggested number to call may be provided based on a prediction using the machine-learning operation. Further, the user may use an instruction input on the mobile platform's user interface to initiate the call to the suggested number.

Further, in another example, the mobile platform may identify the "leaving work and going home" context as the user is driving their car from the workplace after a day at work. In such instances, the mobile platform may prompt the user with a computerized voice communication stating, "Would you like to text your wife that you are 'leaving work and going home'?" Utilizing voice recognition capabilities, the user may respond, "Yes," and a text message may be sent to the user's wife indicating that the user is "leaving work and going home." As such, the user is able to send text messages without making physical contact with the phone and/or making visual contact with the phone, possibly to refrain from distracting the user from driving.

In some embodiments, the instruction may be provided from the context-identification system (CIS). For example, the CIS may identify a context associated with "arriving to the office" and provide an instruction to dial into a conference call as done regularly upon identifying the "arriving to the office" context. In some instances, previously-stored data may indicate a pre-determined instruction to dial into the conference call upon identifying the "arriving to the office" context. In other scenarios, pre-determined instructions can enable the CIS to automatically originate other phone calls, generate and send text messages, and/or other communicative actions, Many other examples are possible as well.

Figure 8A:
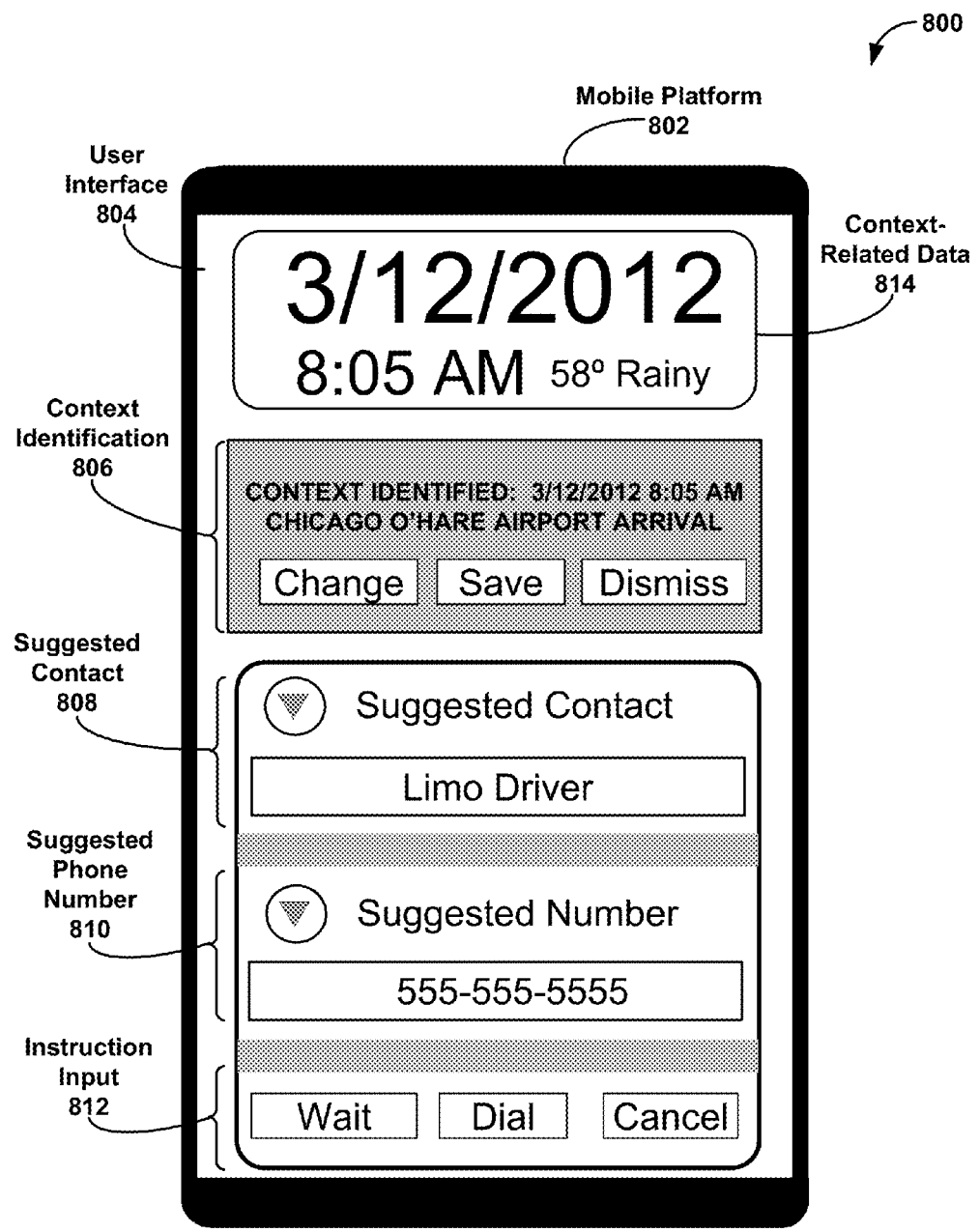
FIG. 8A shows an example user interface used in a third scenario, in accordance with an example embodiment.

FIG. 8A shows an example user interface 804 used in scenario 800, in accordance with an example embodiment. Scenario 800 includes user interface 804 executing on mobile platform 802. User interface 804 includes an interface for context identification 806. Further, user interface 804 includes an interface for suggested contact 808 to be viewed, possibly based on context identification 806. In addition, user interface 804 includes an interface for suggested phone number 810 to be dialed, also possibly based on context identification 806. Further, user interface 804 includes instruction input 812.

Further, FIG. 8A shows context identification 806, perhaps based on receiving context related-data. For example, mobile platform 802 may receive multiple context signals such as the date, time, temperature, and/or weather, as shown by context-related data 814.

Context identification 806 may illustrate the identified context, "3/12/2012 8:05 AM Chicago O'Hare Airport Arrival," by accessing a pre-stored entry in the user's calendar indicating when the user is scheduled to land in Chicago. Yet, in some instances, mobile platform 802 may detect a recent operation for turning on the power of mobile platform 802 and use a GPS locator to detect the location of mobile platform 802. In such instances, mobile platform 802 may make a prediction that the user has arrived at Chicago O'Hare Airport, perhaps after a flight. In other instances, mobile platform 802 may access the user's itinerary stored in mobile platform 802's memory to identify that the user has arrived at Chicago O'Hare Airport after a flight. Other possibilities may exist.

FIG. 8A shows context identification 806 with a "Change" button to change and/or correct the context identified, a "Save" button to save the context identified, and a "Dismiss" button to dismiss the context identified without saving the context identified. In some instances, the "Change" button may allow the user to correct the context identified to provide further context-related data, possibly to predict communicative actions. In some instances, the "Save" button may be used for identifying contexts in the future, and perhaps storing the context signals associated with the context identified.

In addition, FIG. 8A shows suggested contact 808 as "Limo Driver." In such instances, the user may press the "Limo Driver" button to see further information regarding the Limo Driver and possibly view other options for text messaging the Limo Driver. In some embodiments, multiple suggestions can be provided, and the user can press the circle enclosing a downward-facing triangle within suggested contact 808 to view additional suggestions. For example, pressing the circle may provide a list of other contacts, possibly including local taxi services, rental car services, airport bus services, and/or other contacts that the user may want view and/or call based on the context identified. Other possibilities may also exist.

FIG. 8A shows suggested phone number 810 as "555-555-5555" as the phone number to call the Limo Driver. In some examples, the user may provide an instruction through instruction input 812. Instruction input 812 includes a Wait button to possibly delay the phone call to the Limo Driver such that the call may be made later upon a timed prompt (not shown in FIG. 8A) for suggested phone number 810. Instruction input 812 also provides a Dial button to call the Limo Driver immediately and a Cancel button to exit user interface 804 without calling the Limo Driver.

Figure 8B:
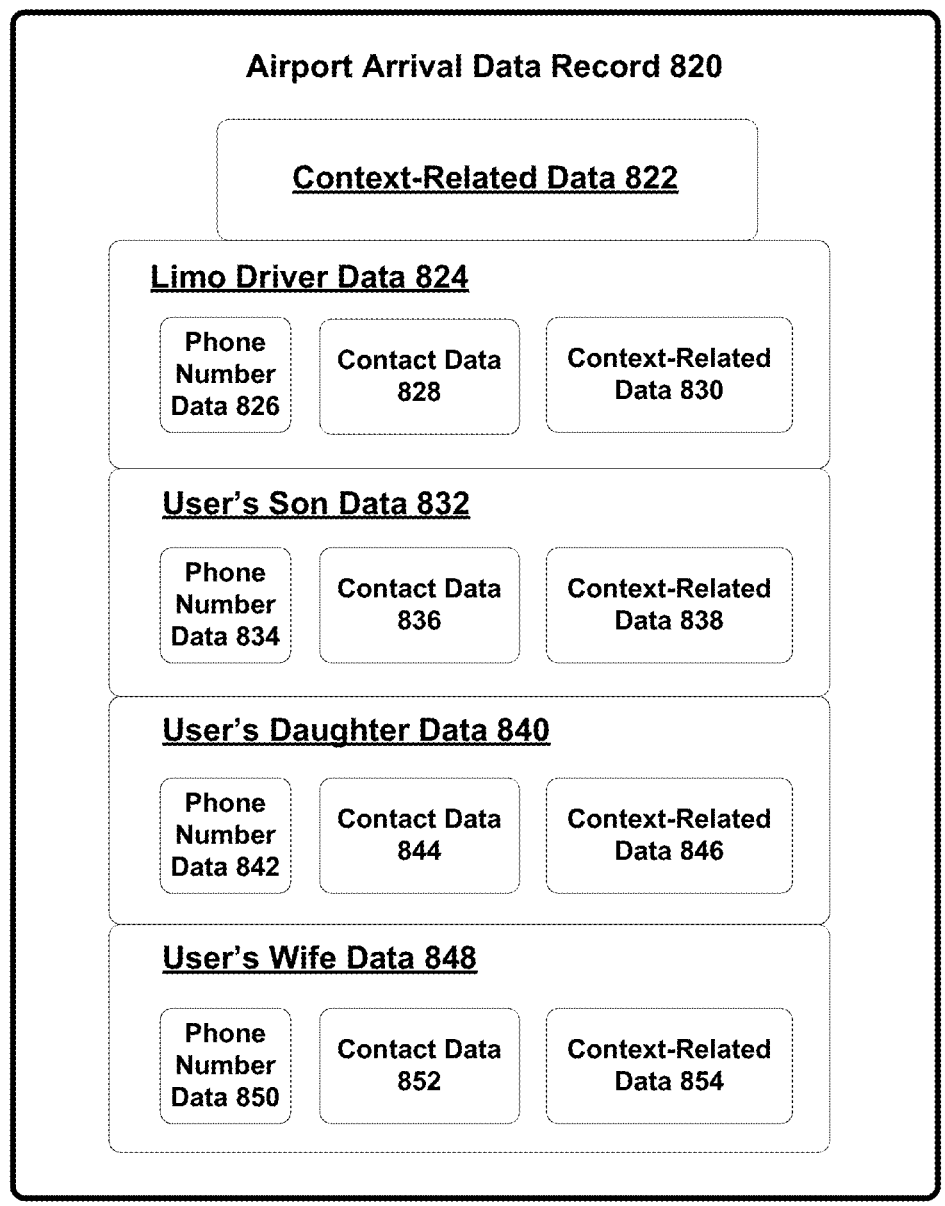
FIG. 8B shows an example data record, in accordance with an example embodiment.

FIG. 8B shows an example airport arrival data record 820 based on received context-related data 822. It should be understood that airport arrival data record 820 may correspond to scenario 800 in FIG. 8A. Airport arrival data record 820 may be stored in mobile platform 802, perhaps in mobile platform 802's memory. Further, airport arrival data record 820 may be stored on a server, a network, cloud-based system, and/or other server system configured to store data records with context-related data, among other possibilities. In some embodiments, data records with context-related data may be updated by multiple mobile platforms and/or computing devices, possibly if authorized by a user of mobile platform 802.

In some embodiments, airport arrival data record 820 may include context-related data 822 corresponding to the date, time, temperature, and/or weather, as shown by context-related data 814 in FIG. 8A. Further, in FIG. 8A, consider the scenario such that the "save" button is pressed in context identification 806. Referring back to FIG. 8B, context-related data 822 may be updated to include additional data corresponding to a recent operation for turning on the power of mobile platform 802 and the GPS location data of mobile platform 802 indicative of the arrival at Chicago O'Hare Airport after a flight.

As part of airport arrival data record 820, FIG. 8B further illustrates limo driver data 824 with its corresponding phone number data 826, contact data 828, and context-related data 830. In addition, user's son data 832 may include its corresponding phone number data 834, contact data 836, and context-related data 838. Further, user's daughter data 840 may include its corresponding phone number data 842, contact data 844, and context-related data 846. Yet further, user's wife data 848 may include its corresponding phone number data 850, contact data 852, and context-related data 854.

In some embodiments, context-related data 822, 830, 838, 846, and 854 may be stored in airport arrival data record 820 to predict a communicative action by a user of mobile platform 802. As such, context-related data may include mobile platform 802's call history (e.g., contacts called most frequently), information corresponding to the user's relationships with other contacts (e.g., people that the user has spoken to the most over a given period in time), and/or browsing history of an internet browser application indicative of the user's interests. Other possibilities may also exist.

In FIG. 8B, phone number data 826, 834, 842, and 850 may include information regarding each respective person's phone number. Further, phone number data 826, 834, 842, and 850 may also include more than one phone number for a given person if the person has more than one phone number (e.g., cell phone number, office number, and/or pager number, among other possibilities). For example, phone number data 826 may correspond to the limo driver's phone number, 555-555-5555, shown as suggested phone number 810 in FIG. 8A. Further, contact data 828, 836, 844, and 852 may correspond to each person's availability, possibly incorporating work schedules, historical data indicative of when each person has answered (or has not answered) after calling them during certain times, and/or other possible alternative contacts to reach the person, among other possibilities.

Further, in FIG. 8B, context-related data 830, 838, 846, and 854 may correspond to context signals detected when each respective person has been called by mobile platform 802 and/or when each person has called mobile platform 802. For example, context-related data 830 may correspond to context signals indicating an operation for turning on the power of mobile platform 802 and the GPS location data of mobile platform 802 indicative of an arrival at Chicago O'Hare Airport after a flight. Context-related data 838, 846, and 854 may also correspond to context signals indicative of the GPS location at Chicago O'Hare Airport. However, context-related data 838, 846, and 854 may not include data suggestive of a recent operation turning on the power of mobile platform 802 indicative of an after-flight arrival. For example, it may be possible that the son, the daughter, and the wife were previously called just prior to the user's departure from Chicago O'Hare Airport.

A current context identified with mobile platform 802 may closely match context-related data 822. Further, context-related data 822 may match most closely with context-related data 830 as compared to context-related data 838, 846, and 854. As such, limo driver data 824 may be ranked higher than user's son data 832, user's daughter data 840, and user's wife data 848, indicating that the user is more likely to call the Limo Driver. Thus, a prediction can be made that the user will want to contact the Limo Driver using phone number data 826.

In some embodiments, contact data 828, 836, 844, and 852 may establish a weighting factor to further predict who the user may want to call. For example, contact data 828 may indicate that the limo service does not open until 9:00 AM on 3/12/2012. Thus, although context-related data 822 may match most closely with context-related data 830, limo driver data 824 may fall in the rankings since the limo driver is probably not available. In such instances, user's son data 832 may be next in line to prompt the user with a suggested phone number corresponding to phone number data 834.

In some embodiments, application-related data corresponding to the user's indications on the mobile platform may adjust the weighting factor. For example, as noted in FIG. 8A, instruction input 812 provides a Cancel button to not call the Limo Driver at all. Provided that the user presses the Cancel button, a weighting factor may be applied to lower limo driver data 824 in the rankings, perhaps eliminating limo driver data 824 from the rankings and/or eliminating limo driver data 824 from airport arrival data record 820. Other examples are possible as well.

Figure 9A:
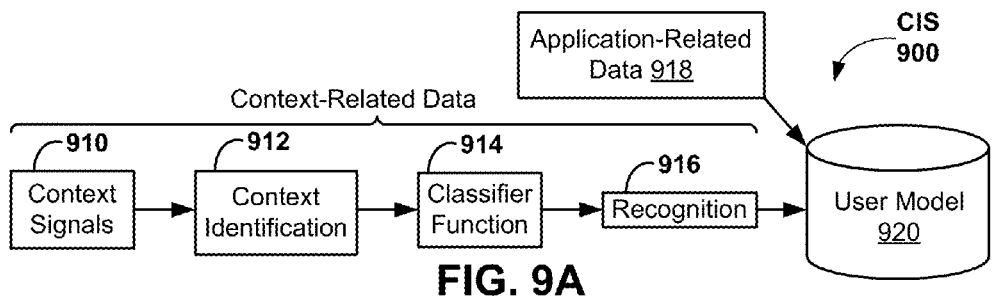
FIG. 9A shows an example context identification system, in accordance with an example embodiment.

FIG. 9A shows example context identification system (CIS) 900, in accordance with an example embodiment. CIS 900 receives context signals 910. In some instances, context signals 910 can be stored as a data string in a mobile platform, a context-related database, a cloud, and/or a network, among other possibilities.

Context identification 912 of CIS 900 can receive context signals 910, such as, but not limited to (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with a user-profile, (u) information accessible via a user's social networking account, (v) noise level or any recognizable sounds detected by a device, (w) devices that are currently available to communicate with the mobile platform, (x) devices in proximity to the mobile platform, (y) devices that are available to receive instruction from the mobile platform, (z) information derived from cross-referencing at least one of: information on the user's calendar, information sent to the user, and/or information available via the user's social networking account, (aa) health statistics or characterizations of the user's current health, (bb) a user's recent context as determined from sensors on or near the user and/or other sources of context information associated with the mobile platform, (cc) a current location of the mobile platform, (dd) a past location of the mobile platform, and (ee) a future location of the mobile platform.

For some or all of the context signals received, context identification 912 can copy and/or extract data from context signals 910 to identify one or more contexts. The context identified can be output from context identification 912 as a vector.

Classifier function 914 of CIS 900 can receive the context vector as input, classify contexts into a CC context classification, CC>0, and output classification indications. For an example with CC=3, a context may be classified as "work," "home," and "travel" based on an activity, a state of the user, an arrival, a departure, context signal(s), etc. Many other classifications are possible as well.

A classification indication can include the classification of a context, possibly using a predetermined classification scheme. For example, suppose classifier function 914 determines a recurring context indicative of the user going on their lunch break at noon. In this example, classifier function 914 can output a classification indication assigning a label "going out to lunch." Many other possible classification indications are possible as well.

Recognition function 916 can receive the classification indications and recognize certain functions. For example, upon receiving the classification indication of the mobile platform "moving towards the pizza parlor," recognition function 916 can recognize previous phone calls made in the context of "moving towards the pizza parlor." For example, in some prior instances, perhaps the user made a call to the pizza parlor to make reservations. Then, recognition function 916 can recognize these previous phone calls and generate a predicted communication (e.g., phone call, e-mail or text message) to the pizza parlor.

Recognition function 916 can be performed using software and data solely resident and executing on a mobile platform, while in other embodiments, recognition function 916 can be performed using software and data both resident and executing on the mobile platform and on other computing devices, such as one or more servers configured to recognize contexts.

Application-related data 918 can include data generated by and/or related to an application executed on the mobile platform. Examples of application-related data 818 can include, but are not limited to interacting with applications, initiating programs on the mobile platform, and/or executing communicative actions such as dialing phone numbers, among other possibilities. Additional examples of application-related data are discussed above in the context of FIG. 7, among other figures as well. Further, application-related data 918 can differ from context-related data, context vector(s) extracted by context identification 912, classification indications from classifier function 914, and recognized contexts from recognition function 916.

In some instances, user model 920 can take recognized contexts from recognition function 916 and application-related data 918 to predict and/or suggest communicative actions, such as possible phone numbers to dial. For example, suppose that the mobile platform recognizes a context such that the user is on their lunch break and is at their office continuing to work. Further, application-related data may indicate that the user is initiating a phone dialing application and/or a restaurant browsing application. The mobile phone may predict that the user may want to order food and provide a phone number to a local restaurant, possibly a previously-called restaurant for making such a food order.

Figure 9B:
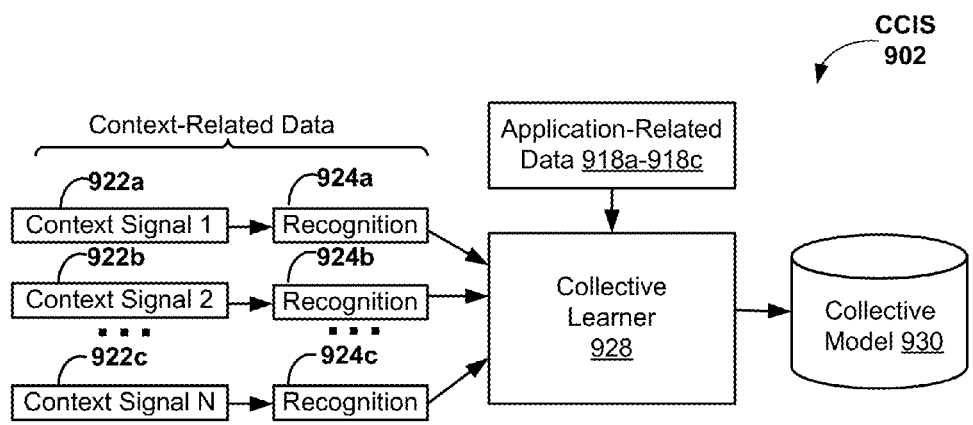
FIG. 9B shows an example collective context identification system, in accordance with an example embodiment.

FIG. 9B shows an example collective context identification system (CCIS) 902, in accordance with an example embodiment. CCIS 902 can be configured to receive context-related data and application-related data from a number N of mobile platforms. In some embodiments, each of the N mobile platforms can be configured to determine whether or not to provide some or all context-related data and/or application-related data to CCIS 902. In other embodiments, some or all of the context-related data and/or application-related data used CCIS 902 can be anonymously used.

As shown in FIG. 9B, context-related data, including context signals 922a, 922b, 922c and recognized contexts 924a, 924b, 924c, and application-related data 918a-918c can be provided to collective learner 928. Collective model 930 can take recognized contexts provided by collective learner 928 to suggest communicative actions to execute, such as possible phone numbers to dial and/or addresses for text messages and/or emails to be sent.

Figure 9C:
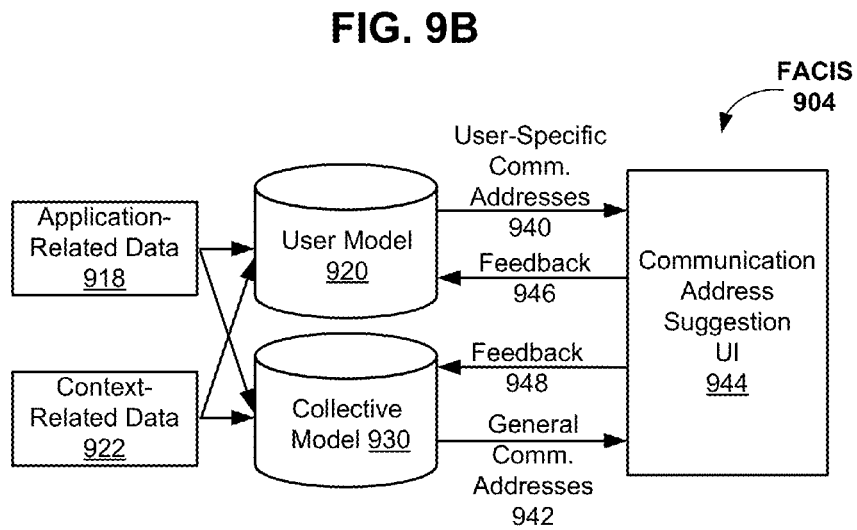
FIG. 9C shows an example context identification system adaptable to feedback, in accordance with an example embodiment.

FIG. 9C shows an example feedback-adaptable context identification system (FACIS) 904, in accordance with an example embodiment. FACIS 904 takes application-related data 918 and context-related data 922 as inputs, and provides the inputs to both user model 920 and collective model 930, which respectively generate user-specific communication addresses 940 and general communication addresses 942. For example, user-specific communication addresses 940 may include phone numbers, e-mail addresses, Instant Messaging (IM) addresses, IP addresses, Uniform Resource Locators (URL)s, and/or other communication addresses to restaurants previously contacted by a user whereas general communication addresses 942 may include phone numbers, e-mail addresses, Instant Messaging (IM) addresses, IP addresses, Uniform Resource Locators (URL)s, and/or other communication addresses to common restaurants, and perhaps other establishments, in proximity to the mobile platform's current location. User-specific communication addresses 940 and general communication addresses 942 can be provided to communication address suggestion user interface (UI) 944 for presentation and possible selection as a communication address for contacting one or more entities.

For example, a user using communication address suggestion UI 944 can view one or more suggested user-specific communication addresses 940, and perhaps provide additional feedback, such as dismissing the suggestion (i.e. refusing to use the suggested communication address). Information about the suggested communication address and any additional feedback can be respectively provided as feedback 946, 948 to user model 920 and collective model 930. Based on this feedback, user model 920 and collective model 930 can adapt to the feedback such as by increasing probabilities that the next communication address suggested by the other model will be accepted by the user. Continuing this example, user model 920 can examine feedback 946, facilitate collective model 930's prediction for another communication address to be used, and increase the probability that the next communication address provided to communication address suggestion communication address UI) will be accepted going forward. Additionally or instead, collective model 930 can examine feedback 948, facilitate user model 920's prediction for another communication address to be used, and increase the probability that the next communication address provided to communication address suggestion user U1 944 will be accepted going forward.

Example Photo Name/Photo Album Suggestion Service

Mobile platforms, such as mobile phones, can include one or more cameras to capture images. Frequently, the images are named, perhaps with a brief description of the image. For example, an image named "Sunset 18 Mar. 2012" can be a picture of a sunset captured on Mar. 18, 2012. Labeling a large number of pictures can take a great deal of time in reviewing the image, determining a title for the image, and then naming the image with the determined title.

An image identification system (IIS), based on the learning models described above, can suggest image and album titles based on image content and other data. The other data can include social signals such as social-networking messages, postings, comments, tags, e-mail and other messages, other persons' social signals, and social status indicators, calendar data, locations, and times. The IIS can learn a collective model that represents the collective data from at least one person and their images. The collective model can be learned, stored, and executed on the mobile platform alone or, in some embodiments, on the mobile platform and one or more other computing devices 2200, such as servers.

The IIS can also be configured with image feature recognition and detection capabilities, such as facial recognition modules, object recognition modules, landmark recognition models, and modules to recognize features in images such as lines, edges, patches of color, shapes, object areas/volumes, and other features. The IIS can detect features in one image, a sequence of images, and/or a video file or stream for a sequence of one or more images.

Figure 10:
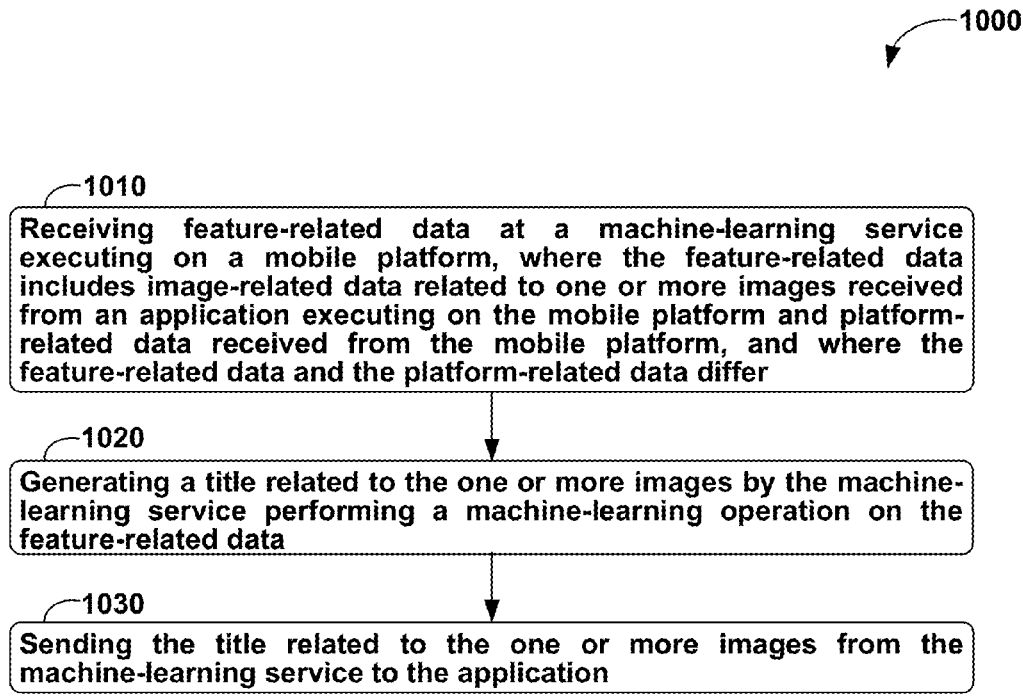
FIG. 10 is a flow chart of a method, in accordance with an example embodiment.

The IIS and/or collective model can include or otherwise be associated with a personalized model, perhaps using data stored solely on the mobile platform. The personalized model can be equipped to adapt to feedback from a user of the mobile platform. For example, for a given image IMG1, the personalized model can suggest three titles: T1, T2, and T3. Then, if the user decides to entitle IMG1 with title T2, the personalized model can increase the probability that title T2 and/or titles similar to title T2 are suggested in the future. In response to selection of title T2 in this example, the personalized model can decrease the probabilities that unselected titles T1 and T3 and/or titles similar to title T2 are suggested in the future FIG. 10 is a flow chart of method 1000, in accordance with an example embodiment. In some embodiments, part or all of method 1000 can be executed using one or more mobile platforms; e.g., mobile platform 200, 502, 602, 802, 1202, 1502, 1852, 2002 and/or one or more computing devices; e.g., computing device 2200.

Method 1000 begins at block 1010, where a machine-learning service executing on a mobile platform can receive feature-related data. The feature-related data can include image-related data related to one or more images received from an application executing on the mobile platform and platform-related data received from the mobile platform. The image-related data and the platform-related data can differ.

In some embodiments, the image-related data can be generated by an image-identification system (IIS) executing on the mobile platform. In particular embodiments, the IIS can be configured to extract image-related features from the one or more images. In more particular embodiments, the IIS can be configured to classify at least one image-related feature of the image-related features. In even more particular embodiments, the IIS can be configured to recognize the at least one classified image-related feature and/or object(s) and/or scene(s) that include the at least one classified image-related feature.

In some of the even more particular embodiments, the at least one classified image-related feature can include a feature related to a face of a person, and the IIS can be configured to recognize the face of the person. In other of the even more particular embodiments, the at least one classified image-related feature can include a feature related to a landmark, and the IIS can be configured to recognize the landmark. In still other of the even more particular embodiments, the at least one classified image-related feature can include a feature related to an object, and the IIS can be configured to recognize the object.

At block 1020, the machine-learning service can generate a title related to the one or more images. The title can be generated by the machine-learning service performing a machine-learning operation on the feature-related data.

In some embodiments, the title related to the one or more images can include at least one datum from the image-related data and at least one datum from the platform-related data. In particular embodiments, the at least one datum from the image-related data can include at least one datum selected from among a name of a person, a name of a landmark, and/or a name of an object and the at least one datum from the platform-related data includes at least one datum selected from among a date, a time, a calendar entry, a social-networking message, and a location.

At block 1030, the machine-learning service can send the title related to the one or more images from the machine-learning service to the application.

Figure 11A:
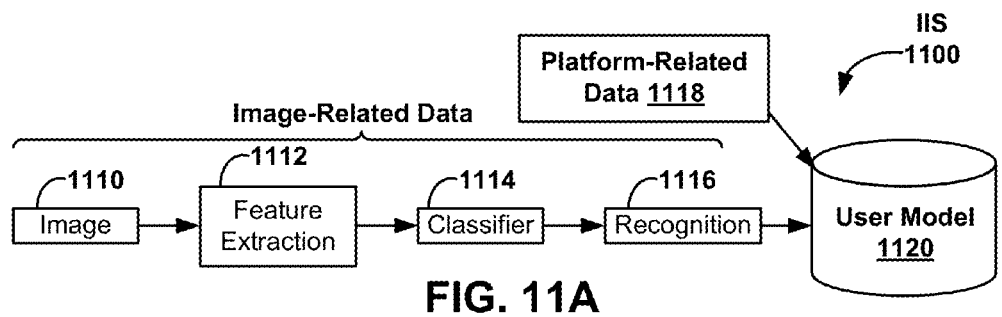
FIG. 11A shows an example image identification system, in accordance with an example embodiment.

FIG. 11A shows example image identification system (IIS) 1100, in accordance with an example embodiment. IIS 1100 receives an input image 1110. Image 1110 can be an electronically-storable image perhaps stored in a well-known image format, e.g., JPG, MPEG, GIF, BMP, etc. Feature extraction function 1112 of IIS 1100 can detect features from image 1110, such as, but not limited to, lines/edges, corners, points of interest, contours, patches of color, regions of interest. For some or all of the detected features, feature extraction function 1112 can copy and/or extract a "local image patch" from image 1110 that includes the detected feature. The detected feature(s) and/or corresponding local image patch(es) can be output from feature extraction function 1112 as a feature vector.

Classifier function 1114 of IIS 1100 can receive the feature vector as input, classify features into one of IC image classifications, IC>0, and output classification indications. For an example with IC=3, the features can be classified as a face, a landmark, or an object. Many other classifications are possible as well.

A classification indication can include the classification of a recognized feature, and an indication of a range of pixels that include the classified feature. For example, suppose classifier function 1114 determines an image of a face is depicted by a rectangle of pixels whose upper-left-hand corner has pixel coordinates (10, 10), and whose lower-right-hand corner has pixel coordinates (90, 100). In this example, classifier function 1114 can output a classification indication of <face, (10, 10), (90, 100)>, to indicate an image of a face can be located within the rectangle having pixel coordinates from (10, 10) to (90, 100). As another example, a classification indication of <landmark, (1,100), (400, 400)> can indicate an image of a landmark can be found within the rectangle having pixel coordinates from (1, 100) to (400, 400). Many other possible classification indications are possible as well.

Recognition function 1116 can receive the classification indications and recognize the feature in the classification indication. For example, upon receiving the classification indication <face, (10, 10), (90, 100)>, recognition function 1116 can attempt to recognize the face in the image. Recognition function 1116 can be performed using software and data solely resident and executing on a mobile platform, while in other embodiments, recognition function 1116 can be performed using software and data both resident and executing on the mobile platform and on other computing devices, such as one or more servers configured to recognize image features.

Platform-related data 1118 can include data generated by and/or related to a mobile platform. Examples of platform-related data 1118 include, but are not limited to times, dates, locations, calendar entries, social-networking messages and other messages. Additional examples of platform-related data are discussed above as built-in feature-related data in the context of at least FIG. 2. Other examples are possible as well. Feature-related data 1118 can differ from image-related data that includes image 1110, feature vector(s) extracted by feature extraction function 1112, classification indications from classifier function 1114, and recognized features from recognition function 1116.

User model 1120 can take recognized features from recognition function 1116 and platform-related data 1118 to generate titles for images and/or collections of images (a.k.a. albums). For example, suppose an image I1 had three recognized features: recognized faces of Alice and Bob and a recognized object of a bottle, and that the platform-related data indicated that I1 was taken at 9 AM on Mar. 18, 2012, at Alice and Bob's home. Platform-related data 1118, authorized by Bob to examine his calendar entries, can include a calendar entry of "St. Pats Party 2012" that was held starting at 7 PM on Mar. 17, 2012. Based on this information, user model 1120 can generate example titles for image I1, such as:

"Alice_and_Bob__18Mar2012"
"Alice_and_Bob_home__18Mar2012"
"Alice_and_Bob_home_with_bottle__18Mar2012"
"Alice_and_Bob_home_with_bottle_after_St Pats Party 2012".

Similarly, if images I2, I3, and I4 are taken in succession, all of which include images of Alice, Bob, and the bottle, the above-generated example titles can be used for a photo album that includes images I1, I2, I3, and I4. Further, the above-generated example titles could be used for a video clip of Bob, Alice, and the bottle taken at 9 AM on Mar. 18, 2012 that includes images I1, I2, I3, and I4. Images I1-I4 can reside on a mobile platform; e.g., Alice's mobile platform, and/or on a server configured to store data, such as images I1-I4.

Figure 11B:
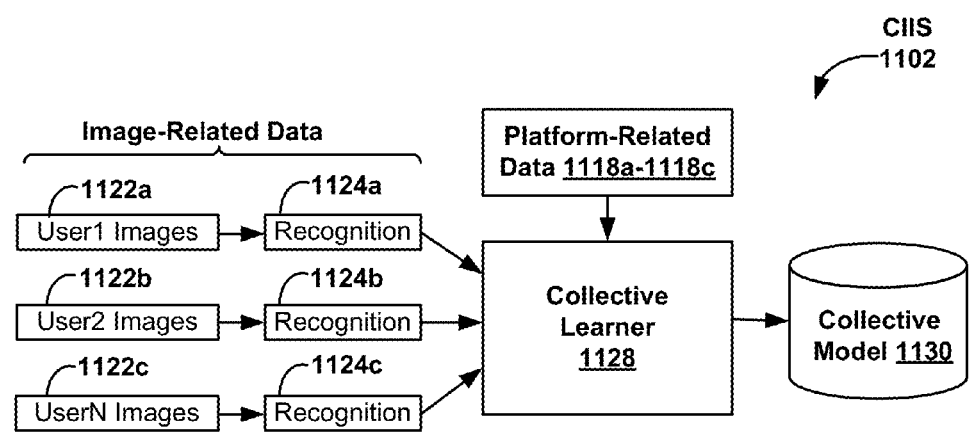
FIG. 11B shows an example collective image identification system, in accordance with an example embodiment.

FIG. 11B shows an example collective image identification system (CIIS) 1102, in accordance with an example embodiment. CIIS 1102 can be configured to receive image-related data and platform-related data from a number N of mobile platforms. In some embodiments, each of the N mobile platforms can be configured to determine whether or not to provide some or all image-related data and/or platform-related data to CIIS 1102. In other embodiments, some or all of the image-related data and/or platform-related data used CIIS 1102 can be anonymized.

As shown in FIG. 11B, image-related data, including images 1122a, 1122b, 1122c and recognized features 1124a, 1124b, 1124c, and platform-related data 1118a-1118c can be provided to collective learner 1128. Collective model 1130 can take recognized features provided by collective learner 1128 to generate titles for images and/or collections of images (a.k.a. albums).

Figure 11C:
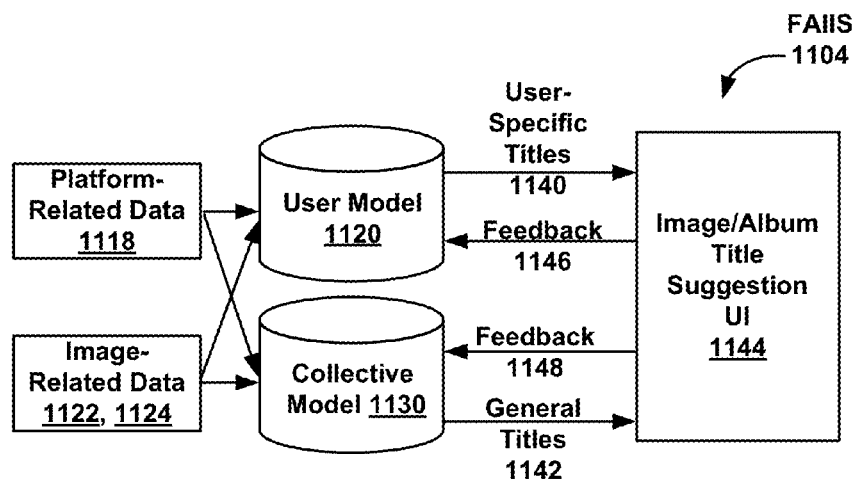
FIG. 11C shows an example image identification system adaptable to feedback, in accordance with an example embodiment.

FIG. 11C shows an example feedback-adaptable image identification system (FAIIS) 1104, in accordance with an example embodiment. FAIIS 1104 takes platform-related data 1118 and image-related data 1122, 1124 as inputs, provides the inputs to both user model 1120 and collective model 1130, which respectively generate user-specific titles 1140 and general titles 1142. Image-related data 1122, 1124 can include images 1122a-c and/or recognized features 1124a-c. User-specific titles 1140 and general titles 1142 can be provided to image/album title suggestion user interface (UI) 1144 for presentation and possible selection as an image, video, or album title.

For example, a user using image/album title suggestion UI 1144 can select one of user-specific titles 1140, and perhaps provide additional feedback, such as a rating of the title. Information about the selected title and any additional feedback can be respectively provided as feedback 1146, 1148 to user model 1120 and collective model 1130. Based on this feedback, user model 1120 and collective model 1130 can adapt to the feedback such as by increasing probabilities of titles generated by the other model. Continuing this example, user model 1120 can examine feedback 1146, determine that collective model 1130 generated the selected title, and increase the probability that titles similar to the selected title are provided to image/album title suggestion UI 1144 going forward. Additionally or instead, collective model 1130 can examine feedback 1148, determine that user model 1120 generated the selected title, and increase the probability that titles similar to the selected title are provided to image/album title suggestion UI 1144 going forward.

Figure 12A:
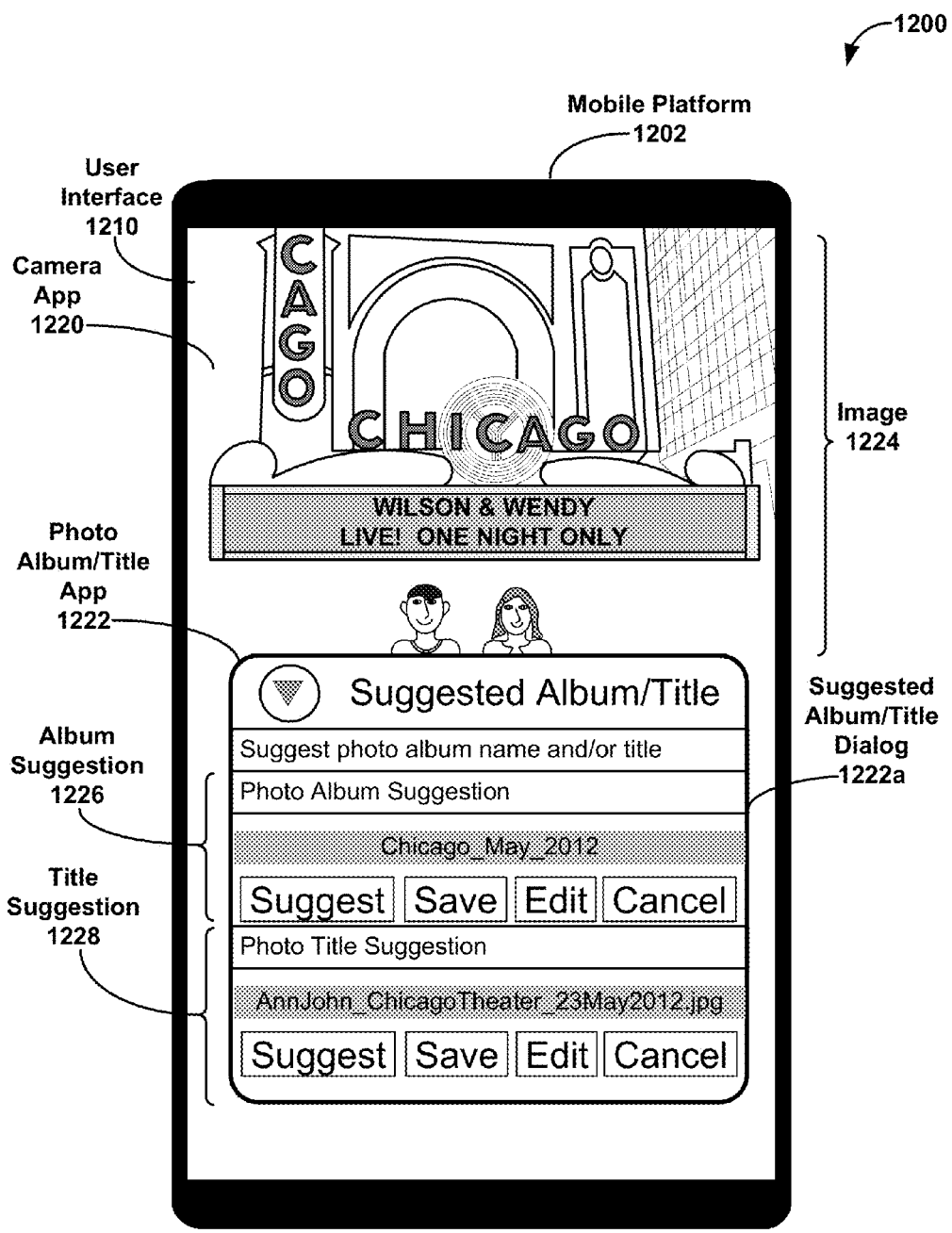
FIG. 12A shows an example user interface used in a fourth scenario, in accordance with an example embodiment.

FIG. 12A shows an example user interface 1210 used in scenario 1200, in accordance with an example embodiment. Scenario 1200 includes user interface 1210 executing on mobile platform 1202. User interface 1210 includes an interface for camera application 1220 and photo album/title application 1222. In scenario 1200, FIG. 12A shows photo album/title application 1222 operating in the foreground and utilizing suggested album/title dialog 1222a. Suggested album/title dialog 1222a includes album suggestion 1226 and title suggestion 1228.

FIG. 12A shows that album suggestion 1226 includes an album name suggestion of "Chicago_May__2012", a Suggest button to request another album name suggestion, a Save button to create an album named as suggested, e.g., Chicago_May__2012, an Edit button to modify the album name, and a Cancel button to exit the photo album/title application 1222 without creating an album title. FIG. 12A also shows title suggestion 1228 with a title suggestion of "AnnJohn_ChicagoTheater__23May2012.jpg" for a particular image, a Suggest button to request another title suggestion, a Save button to save an image named as suggested, e.g., AnnJohn_ChicagoTheater__23May2012.jpg, an Edit button to modify the album name, and a Cancel button to exit the photo album/title application 1222 without using the suggested title.

In some embodiments, use of the Edit button to change album suggestion 1228 and/or title suggestion 1228 can generate feedback 1146 to user model 1120 and/or feedback 1148 to collective model 1130. Feedback 1146, 1148 can include the originally-suggested title and the title as edited. Feedback 1146, 1148 can be provided to the user model 1120 and/or collective model 1130 in response to use of the Save button to save an edited album suggestion 1226 and/or title suggestion 1228.

In scenario 1200, image 1224 has recently been captured. Image 1224 is an image of two people, Ann and John, pictured beneath the marquee of the landmark Chicago Theater. Image 1224 has been provided to photo album/title application 1222, which in turn used an image identification system, such as IIS 800, CIIS 802, or FAIIS 804, to generate the suggested image title and image album names discussed above and shown in FIG. 12A.

In some embodiments not explicitly shown in the Figures, photo album/title application 1222 can operate in the background if so authorized; e.g., photo album/title application 1222 operates without displaying suggested album/title dialog 1222a. Then, when an image is captured, such as image 1224, album/title application 1222 can provide the captured image to photo album/title application 1222 and generate suggested image title and image album names, perhaps after enough images have been captured and/or named to train learning model 1230. Once the suggested image title and image album names are generated, album/title application 1222 can generate a notification, such as a pop-up dialog, that presents the suggested image title and/or image album names.

Timing and/or display of the notifications can depend on user response. For example, album/title application 1222 can use threshold times to determine "relatively quick" and "relatively slow" response. For example, if a user responds to a notification within a relatively-quick threshold period of time; e.g., within five seconds of notification display, album/title application 1222 can continue to generate notifications as soon as suggested image title and/or image album names are available. As another example, if a user does not respond to a notification within a relatively-slow threshold period of time; e.g., within sixty seconds of notification display, album/title application 1222 can either generate notifications less frequently and/or stop generating notifications in favor of waiting for album/title application 1222 to be returned to the foreground, and then provide suggested image title and/or image album names via suggested album/title dialog 1222a. Other values for threshold periods of time are possible.

Figure 12B:
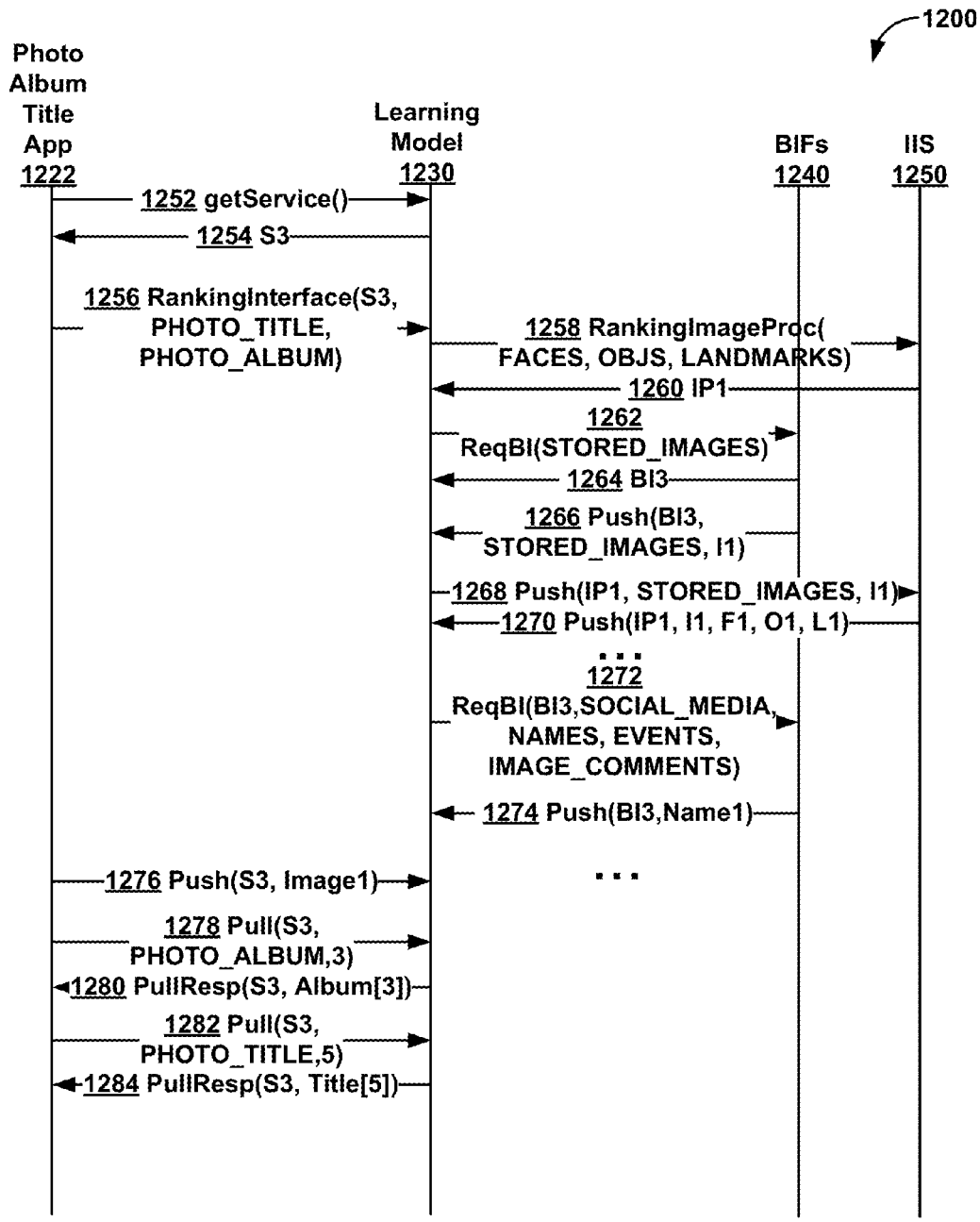
FIG. 12B shows example communications for the fourth scenario, in accordance with an example embodiment.

FIG. 12B shows communications for the example scenario 1200, in accordance with an example embodiment. Communications shown in FIG. 12B involve photo album/title application 1222 requesting ranked lists of photo titles and photo album names from learning model 1230. Learning model 1230 gets image-related data from IIS 1250 and platform-related data from built-in features (BIFs) 1240. Built-in features 1240 can include at least the functionality of built-in features 410 discussed above. When photo album/title application 1222 provides an image to learning model 1230, learning model 1230 generates a list of a photo album names and photo titles.

Photo album/title application 1222 initiates communications in scenario 1200 by calling the getService( ) function for learning model 1230 via communication 1252. In response, learning model 1230 provides a session key S3 via communication 1254 to photo album/title application 1222. Session key S3 is included for subsequent communications between photo album/title application 1222 and learning model 1230 to permit addressing the subsequent communications to the correct learning model, e.g., learning model 1230, and to the correct application, e.g., photo album/title application 1222, for a learning session keyed by S3.

Photo album/title application 1222 can instruct learning model 1230, via communication 1256, to set up a ranking interface. As shown in FIG. 12B, communication 1256 includes a RankingInterface( ) call with three parameters: session key S3 and requests for ranked lists of photo titles and album names, as shown in FIG. 12B, using the predefined PHOTO_TITLE and PHOTO_ALBUM values.

In response, learning model 1230 sends communication 1258 to IIS 1250 to request identification of image features, such as faces, objects, and landmarks. As shown in FIG. 12B, learning model 1230 requests identifications using the RankingImageProc( ) function with three parameters: requests to identify faces, objects, and landmarks using the respective pre-defined values of FACES, OBJS, and LANDMARKS. In response, IIS 850 sends an image-identification session key of IP1 via communication 1260.

Scenario 1200 continues with learning model 1230 sending communication 1262 to built-in features 1250 to request retrieval one or more images stored on a mobile platform, as shown in FIG. 12B by passing the predefined STORED_IMAGES parameter in a ReqBI( ) function call to built-in features 1240. In response, built-in features 1240 returns a built-in session key BI3 via communication 1264 to learning model 1230. If authorized to provide stored images by the user/owner of the mobile platform, built-in features 1244 can provide an image stored on the mobile platform to learning model 1230 via communication 1266. Communication 1266 includes a Push( ) function call with three parameters: built-in session key BI3, identification of a stored image using the predefined value STORED_IMAGES, and a reference I1 to the stored image.

Upon receiving the stored image, learning model 1230 provides the stored image to IIS 1250 via communication 1268 to determine image-related features related to the stored image. Communication 1268 includes a Push( ) function call with three parameters: image-identification session key IP1, identification of a stored image using the predefined value STORED_IMAGES, and a reference I1 to the stored image.

Scenario 1200 continues with IIS 1250 determining image-related data for the image referenced by I1 and returning the image-related data to learning model 1230 via communication 1270. Communication 1270 includes a Push( ) function call with five parameters: image-identification session key IP1, a reference I1 to the stored image, image-related data for faces in F1, image-related data for objects in O1, and image-related data for landmarks in L1.

Scenario 1200 continues with built-in features 1240 continuing to provide images stored on the mobile platform to learning model 1230, which in turn provides each stored image to IIS 1250 to generate image-related data for faces, objects, and landmarks for each stored image.

Learning model 1230 then requests platform-related data from built-in features 1240 via communication 1272. Communication 1272 includes a ReqBI( ) function call with five parameters: built-in session key BI3, a predefined value of SOCIAL_MEDIA requesting all authorized social networking messages stored on the mobile platform, a predefined value of NAMES requesting all authorized contact names stored on the mobile platform, a predefined value of EVENTS requesting all authorized calendar entries and/or events stored on the mobile platform, and IMAGE_COMMENTS requesting all authorized comments on the STORED_IMAGES previously requested. In other scenarios, more or less information can be requested by learning model 1230 as platform-related data.

As shown in FIG. 12B, in response to communication 1272, built-in features 1240 deliver a name referred to as Name1 via communication 1274 to learning model 1230. Built-in features 1240 can use additional Push( ) function calls to provide additional requested and authorized feature-related data to learning model 1230.

Scenario 1230 continues with photo album/title application 1222 providing an image Image1 to learning model via communication 1276. Photo album/title application 1222 then requests a list of three suggested photo album names related to Image1 from learning model 1230 via communication 1278.

In response to communication 1278, learning model 1230 generates a list of three suggested photo album names related to Image1 and provides the requested list as the "Album[3]" parameter of the Pull response shown in communication 1280.

FIG. 12B shows that photo album/title application 1222 then requests a list of five suggested photo titles related to Image1 from learning model 1230 via communication 1282. In response to communication 1282, learning model 1230 generates a list of five suggested photo titles related to Image1 and provides the requested list as the "Title[5]" parameter of the Pull response shown as part of communication 1284. In the present example, scenario 1200 then concludes.

Example Communication Signal Classification Service

Some mobile platforms can search to connect with available communication networks. In Wi-Fi systems, the mobile platform can turn on a transmitter to send one or more probe request messages requesting connection information, and/or turn on a receiver to listen for a beacon signal. If a network is available, the mobile platform either receives a probe response signal to a sent probe message, or receives a listened-for beacon signal. The mobile platform can establish a Wi-Fi connection with the network after performing authenticated and associated procedures. If no network is available, the mobile station does not receive a signal; e.g., either a probe request signal or beacon signal, and so can determine that no network is available.

Thus, to search for a network, the mobile platform has to turn on a radio receiver to listen for signals and, if sending probe messages, perhaps also turn on a radio transmitter to send probe messages. In some embodiments, mobile platforms can continue searching until an available network is found and a Wi-Fi connection is established. This searching procedure can take a relatively large amount of power, thereby reducing power available for other mobile platform tasks, such as voice and/or data communication.

To save power, the mobile platform can train and use a machine-learning service to predict whether or not a search to connect with available communication networks will succeed. The machine-learning service can be trained using a number of features, including, but not limited to: mobile platform location, mobile platform velocity, time, signal characteristics such as signal strength, device usage, time since a last search for wireless communication service was performed, and outcome of the last search for wireless communication service. By predicting search outcomes rather than performing actual searches, the mobile platform can save power and reduce the amount of signaling used in attempting to connect with communication networks.

As part of training the machine-learning service, the mobile platform can carry out a number of searches to connect with available communication networks. At least while training, the mobile platform can store the above-mentioned features, along with an outcome of each search to connect, e.g., success or failure. The outcome of each search can be treated as a fact or "ground truth." In one embodiment, the machine-learning service can include a binary classifier that predicts a likelihood of a finding an available communication network, a.k.a. predicts a result of a search to connect with available communication networks.

In another embodiment, the machine-learning service can include a tri-nary classifier that predicts a likelihood of a finding an available communication network or indicates that the service cannot predict the outcome of a search. For example, if the machine-learning service were trained to look for communications networks in north-eastern Illinois only and the mobile platform was moved to central California, the machine-learning service can output that it cannot predict the outcome of a search to connect with available communication networks, as the current set of features, especially location, do not match any features used to train the machine-learning service.

In still another embodiment, the machine-learning service can get features and communication search outcomes from other mobile platforms, either via direct communication with other mobile platforms or via communication with one or more intermediate computing devices, such as servers storing feature and outcome data. In the above example of a mobile platform going from north-eastern Illinois to central California, the mobile platform can download feature and outcome data from mobile platforms in central California, and use the California-based data to predict search outcomes. In still other embodiments, the machine-learning service can learn about and generate predictions regarding connections with communication networks along with or instead of Wi-Fi networks, such as, but not limited to, Wi-Max, GSM, CDMA, TDMA, 3G, 4G, Bluetooth, and Zigbee networks.

Figure 13:
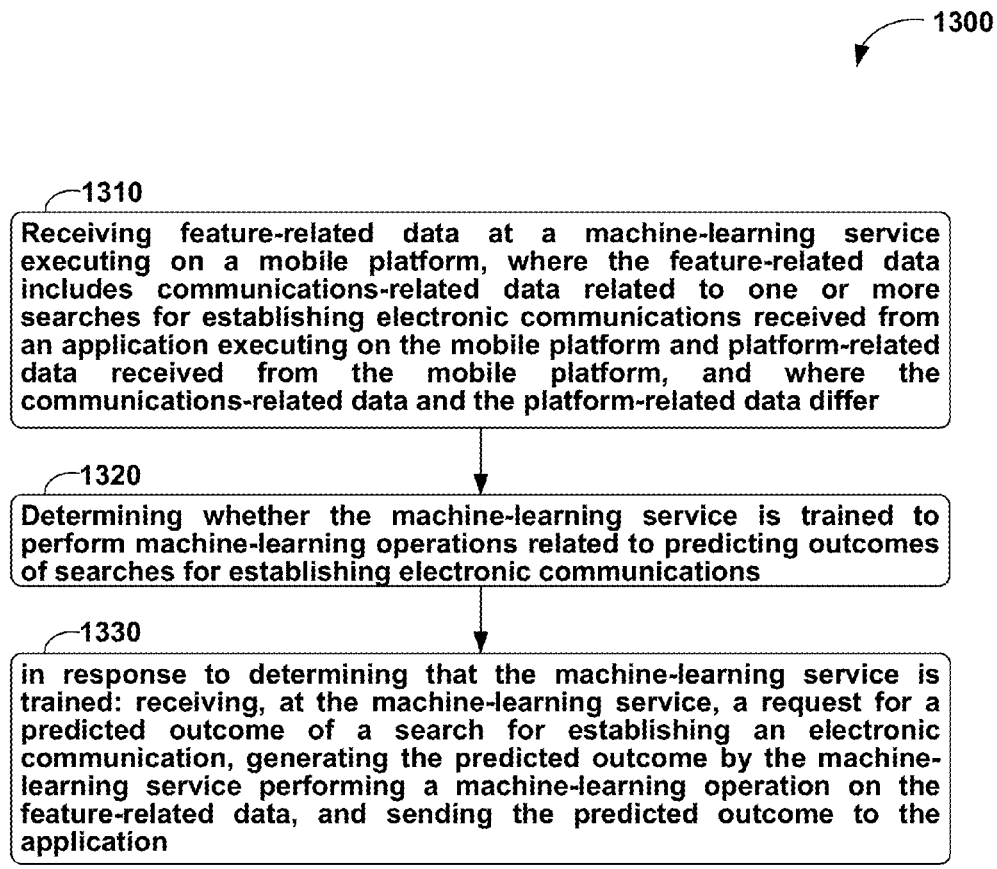
FIG. 13 is a flow chart of a method, in accordance with an example embodiment.

Turning to the figures, FIG. 13 is a flow chart of a method 1300, in accordance with an example embodiment. In some embodiments, part or all of method 1300 can be executed using one or more mobile platforms; e.g., mobile platform 200, 502, 602, 802, 1202, 1502, 1852, 2002 and/or one or more computing devices; e.g., computing device 2200.

Method 1300 begins at block 1310, where a machine-learning service executing on a mobile platform can receive feature-related data. The feature-related data can include communications-related data related to one or more searches for establishing electronic communications received from an application executing on the mobile platform and platform-related data received from the mobile platform. The communications-related data and the platform-related data can differ.

At block 1320, the machine-learning service can determine whether or not the machine-learning service is trained to perform machine-learning operations related to predicting outcomes of searches for establishing electronic communications.

In some embodiments, the searches for establishing electronic communications can include a search to establish a wireless local-area network connection. In particular embodiments, the search to establish the wireless local-area network connection can include a search to establish the wireless local-area network connection based on an Institute of Electrical and Electronics Engineers (IEEE) 802.11 standard.

In other embodiments, in response to determining that the machine-learning service is not trained: additional feature-related data can be received at the machine-learning service, where the additional feature-related data can include additional communications-related data related to one or more searches for establishing electronic communications received from the application and additional platform-related data from the mobile platform, and where the communications-related data, additional communications-related data, platform-related data, and additional platform-related data all differ. After receiving the additional feature-related data, determining whether the machine-learning service is now trained to perform machine-learning operations related to predicting outcomes of searches for establishing electronic communications.

At block 1330, in response to determining that the machine-learning service is trained: (i) the machine-learning service can receive a request for a predicted outcome of a search for establishing an electronic communication, (ii) the machine-learning service can generate the predicted outcome by performing a machine-learning operation on the feature-related data, and (iii) the predicted outcome can be sent to the application, perhaps by the machine-learning service.

In particular embodiments, the machine-learning service can generate the predicted outcome by performing a machine-learning operation on the feature-related data without receiving the request for the predicted outcome of the search; i.e., the machine-learning service can generate the predicted outcome of the search without being prompted by the request.

In some embodiments, method 1300 can further include: in response to determining that the machine-learning service is trained, a communication indicating that the machine-learning service is trained can be sent to the application, perhaps by the machine-learning service.

In other embodiments, method 1300 can further include: in response to the predicted outcome indicating a search for establishing electronic communications would be successful, a wireless interface of the mobile platform can be activated. In still other embodiments, in response to the predicted outcome indicating a search for establishing electronic communications would not be successful, deferring activation of a radio of the mobile platform. In particular of the still other embodiments, after receiving the predicted outcome indicating the search for establishing electronic communications would be not successful, the application can start a periodic request for the predicted outcome of the search for establishing the electronic communication.

In more particular of the still other embodiments, the application starting the periodic request for the predicted outcome of the search for establishing an electronic communication can include: sending the request for the predicted outcome of the search for establishing the electronic communication to the machine-learning service, receiving the predicted outcome from the machine-learning service, in response to the predicted outcome indicating a search for establishing electronic communications would not be successful, waiting at least a pre-determined amount of time, and in response to the predicted outcome indicating a search for establishing electronic communications would be successful: stopping the periodic request for the predicted outcome and attempting establishment of the electronic communications.

In even other embodiments, method 1300 can further include: in response to the predicted outcome indicating failure to predict a search for establishing electronic communications: conducting the search to establish electronic communications, determining an outcome of the search, and sending an indication of the outcome of the search to the machine-learning service.

Figure 14:
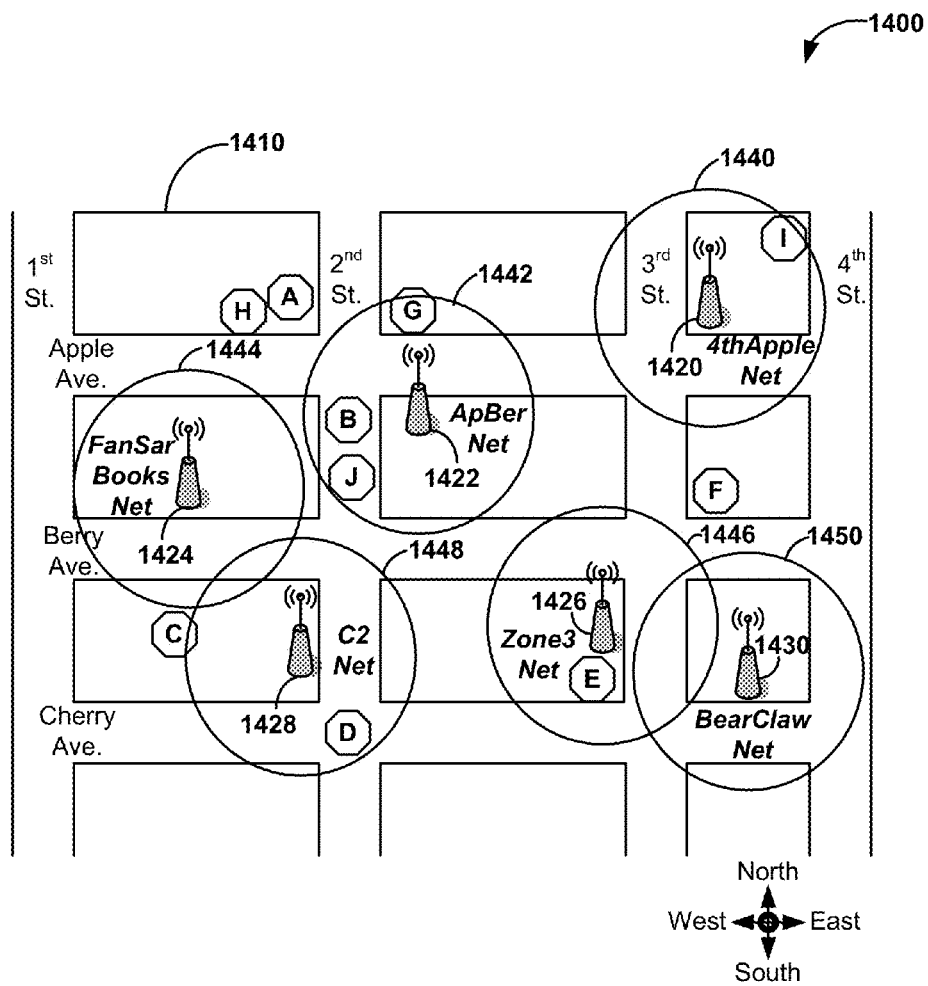
FIG. 14 shows a scenario for establishing wireless communications with a number of access points, in accordance with an example embodiment.

FIG. 14 shows a scenario 1400 for establishing wireless communications with a number of access points, in accordance with an example embodiment. During scenario 1400, a mobile platform travels to a number of locations and attempts to establish wireless electronic communications at each of the locations. Some of the locations are served by one or more wireless networks, and so some of the attempts to establish wireless electronic communications are successful while other attempts are unsuccessful. Records of the attempts to establish wireless electronic communications scenario during scenario 1400 are stored in log 1460, which can be stored on the mobile platform.

The top portion of FIG. 14 depicts a twelve-block map. The four north/south streets shown in FIG. 14 are numbered from $1^{st}$ St., on the left or west side, $2^{nd}$ St., just to the east of $1^{st}$ St., $3^{rd}$ St. to east of $2^{nd}$ St. and $4^{th}$ St., which is the right-most or east-most north/south street. The three east/west avenues shown in FIG. 14, going from north to south are: Apple Ave, Berry Ave., and Cherry Ave.

Several of the blocks shown in FIG. 14 have wireless communications transmitters, specifically shown as transmitters 1420, 1422, 1424, 1426, 1428, 1430. Transmitter 1420 generates network "4thApple" with a range shown using circle 1440. Similarly, transmitters 1422, 1424, 1426, 1428, 1430 respectively generate networks "ApBer", "FanSar Books", "Zone3", "C2", and "BearClaw", with respective ranges shown using circles 1442, 1444, 1446, 1448, 1450.

During scenario 1400, the mobile platform travels from location A, shown in FIG. 14 as an octagon surrounding the letter "A" that is just north of Apple Ave near $2^{nd}$ St, through locations B, C, D, E, F, and G. At each of locations A, B, C, D, E, F, and G, the mobile platform attempts to connect wirelessly with a wireless network, such as wireless network conducted using an IEEE 802.11 standard (a.k.a. a Wi-Fi network) or perhaps using another communications protocol. After each attempt to connect wirelessly, the mobile platform stores data related to the attempt in a log, shown in FIG. 14 as log 1460.

As shown at the bottom of FIG. 14, log 1460 stores the following information:
 a location (Loc) of the mobile platform,
 a velocity of the mobile platform,
 a time that the mobile platform attempted to connect with a wireless network,
 a signal strength (SigStr) of a wireless network detected at the time that the mobile platform attempted to connect. In the example log shown in FIG. 14, signal strengths are rated on a 0 (no signal) to 100 (maximum strength) scale. Other techniques for rating signal strengths are possible as well.
 a wireless network name (Ntwk), if detected during the attempt to connect or 0, if no network detected,
 a time (Time(S)) since the last "search" or attempt to connect, and
 an outcome (Out(S)) of the last attempt to connect.

In other embodiments, more or fewer data items can be collected and stored in log 1460.

In scenario 1400, log 1460 shows that the mobile platform was at location A at time 17:00 on Tuesday and attempted to connect to a wireless network. The outcome of the attempt was unsuccessful. At 17:00 on Tuesday, the mobile platform had been used for two minutes, and it had been five minutes since the last attempt to connect to a wireless network.

As another example, log 1460 shows that the mobile platform was at location B (just south of the intersection $2^{nd}$ St. and Apple Ave.) at time 17:10 on Tuesday and attempted to connect to a wireless network. The outcome of the attempt was successful. In particular, the mobile platform connected to the ApBer network with a signal strength of 40 out of 100. At 17:10 on Tuesday, the mobile platform had been used for twelve minutes, and it had been ten minutes since the last attempt to connect to a wireless network.

Information for attempts made by the mobile platform at locations C, D, E, F, and G is also shown in FIG. 14. At locations D (the intersection of $2^{nd}$ St. and Cherry Ave.), E (just northwest of the intersection of $3^{rd}$ St. and Cherry Ave.), and G (on the north side of Apple Ave. just east of $2^{nd}$ St.), the mobile platform was able to connect to respective networks C2, Zone3, and ApBer with respective signal strengths of 25, 80, and 12. However, at locations C (midway between $1^{st}$ and $2^{nd}$ Streets and midway between Berry and Cherry Ayes.) and F (on the northeastern corner of $3^{rd}$ St. and Berry Ave.), the mobile platform was unable to connect—at location C, the mobile platform was able to detect the C2 network, but was unable to connect, perhaps due to the low signal strength of 3 out of 100. At location F, no network was detected.

Figure 15A:
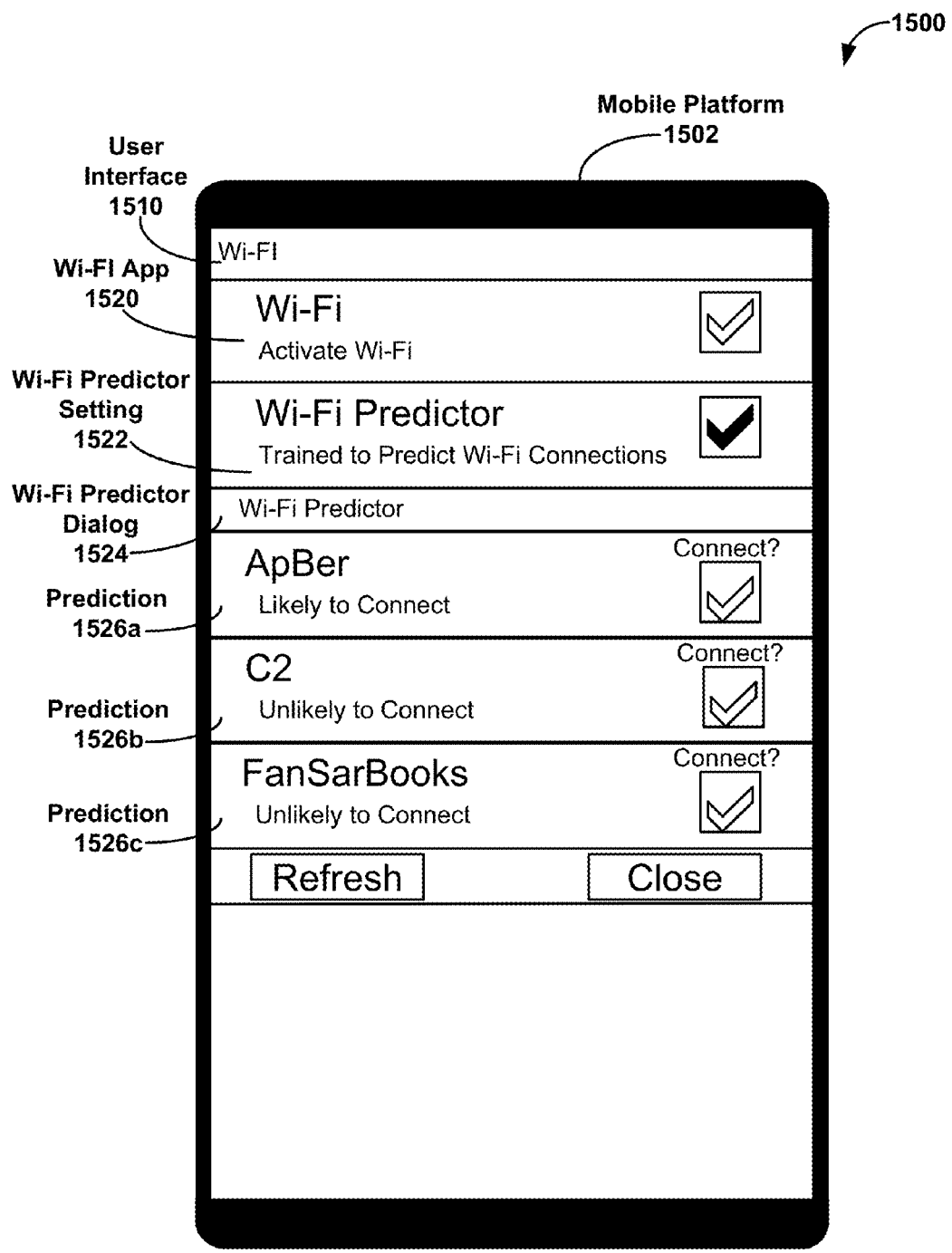
FIG. 15A shows an example user interface used in a fifth scenario, in accordance with an example embodiment.

FIG. 15A shows example user interface 1510 used in scenario 1500, in accordance with an example embodiment. Scenario 1500 includes user interface 1510 executing on mobile platform 1502. As shown in FIG. 15A, user interface 1510 includes Wi-Fi application 1520 with Wi-Fi Predictor Setting 1522. FIG. 15A shows that Wi-Fi Predictor Setting 1522 is set to active and that a Wi-Fi predictor is "Trained to Predict Wi-Fi Connections." The Wi-Fi predictor has a Wi-Fi Predictor Dialog 1524 that includes three predictions 1526a, 1526b, 1526c, an Refresh button to re-execute the Wi-Fi predictor and display new predictions before exiting dialog 1522, and an close button to close dialog 1524.

Each of predictions 1526a, 1526b, 1526c shown in FIG. 15A indicates a prediction for connecting to a wireless network. For examples, prediction 1526a indicates that mobile platform 1502 is likely to connect to the "ApBer" Network, prediction 1526b indicates that the Wi-Fi Predictor indicates that mobile platform 1502 is unlikely to connect to the "C2" Network, and prediction 1526c indicates that mobile platform 1502 is unlikely to connect to the "FanSarBooks" Network, Each of predictions 1526a, 1526b, 1526c shown in FIG. 15A additionally enables a user of Wi-Fi Predictor Dialog 1524 to attempt to connect with the network mentioned in the prediction. For example, by clicking on the check-mark box underneath the word "Connect?" on the right side of prediction 1526a, mobile platform 1502 can attempt to connect to the "ApBer" network.

Figure 15B:
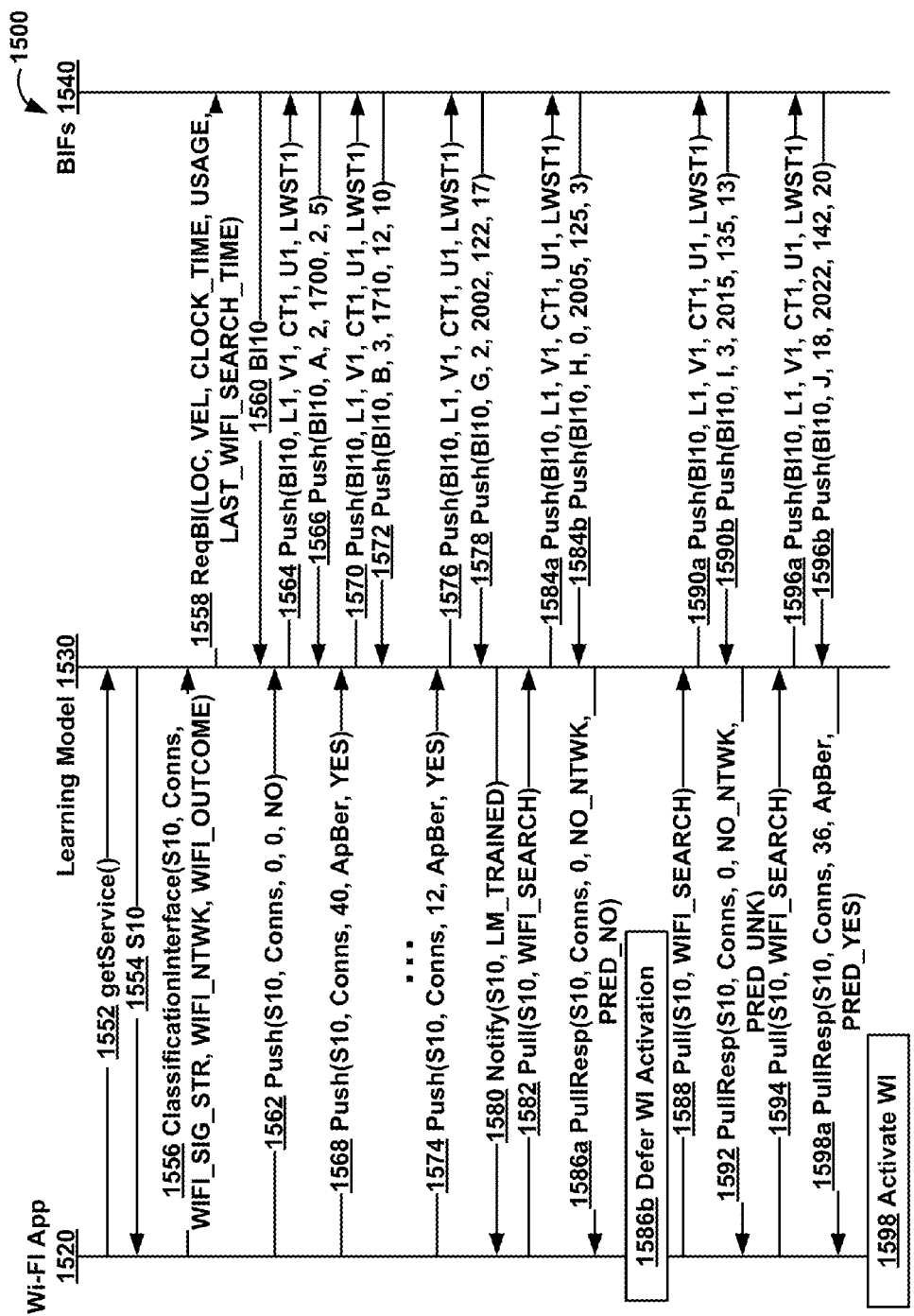
FIG. 15B shows example communications for the fifth scenario, in accordance with an example embodiment.

FIG. 15B shows example communications for scenario 1500, in accordance with an example embodiment. Scenario 1500 is related to Scenario 1400, as scenario 1500 starts with the same attempts to communicate wirelessly as shown in log 1460. During scenario 1500, the logged data is provided as training data to a classifier learning model 1530. After training with the logged data, learning model 1530 is then requested to predict communications at three additional locations H, I, and J, which are shown in the map depicted in FIG. 14, using the location's letter surrounded by an octagon. Location H is just southwest of location A, location I is near the northernmost point of $4^{th}$ St. depicted in FIG. 14, and location J is just south of location B.

Wi-Fi application 1520 requests service from learning model 1530 using the getService( ) function in communication 1552. In response, learning model 1530 sends a learning model session key of "S10" to Wi-Fi application 1520 using communication 1554. Session key S10 is included for subsequent communications between Wi-Fi application 1520 and learning model 1530 to permit addressing the subsequent communications to the correct learning model, e.g., learning model 1530 and correct application, e.g., Wi-Fi application 1520 for a learning session keyed by S10.

Wi-Fi application 1520 can instruct learning model 1530 via communication 1520 to set up a classification interface. As shown in FIG. 15B, communication 1556 includes a ClassificationInterface( ) call with five parameters: session key S10, an input-source reference of Conns, and a requested outputs of Wi-Fi signal strengths, Wi-Fi Network names, and Wi-Fi search outcomes, as shown in FIG. 15B, using the predefined WIFI_SIG_STR, WIFI_NTWK, and WIFI_OUTCOME values.

In embodiments not shown in FIG. 15B, an application can request a similar prediction for a non-Wi-Fi network, such as, but not limited to, a Wi-Max, GSM, CDMA, TDMA, 3G, 4G, Bluetooth, or Zigbee network.

In response, learning model 1530 then requests platform-related data from built-in features 1540 via communication 1578. Communication 1578 includes a ReqBI( ) function call with five parameters: a predefined value of LOC requesting a current location of the mobile platform, a predefined value of VEL requesting a current velocity of the mobile platform, a predefined value of CLOCK_TIME requesting a current clock time, a predefined value of USAGE requesting a current usage value, such as uptime, of the mobile platform a, and a predefined value of LAST_WIFI_SEARCH_TIME requesting a time of a last search for a Wi-Fi network. In other scenarios, more or less information can be requested by learning model 930 as platform-related data. In response, built in features 1540 returns a built-in session key BI10 via communication 1560.

Scenario 1500 continues with the mobile platform moving to location A and searching for Wi-Fi service. As shown in FIG. 14, at location A, the mobile platform is unable to connect to a Wi-Fi network. FIG. 15B shows Wi-Fi Application 1520 providing information about searching for Wi-Fi networks at location A via communication 1562, which includes a Push( ) function call with five parameters. The five parameters are a session key S10, an input-source reference of Conns, a Wi-Fi signal strength value of 0, a Wi-Fi Network name of 0 to indicate no network was found, and a Wi-Fi search outcome of NO to indicate the search was unsuccessful.

In response to the Push( ) function call of communication 1562, learning model 1530 can send communication 1564 with a Push( ) function to built-in features 1540 to request platform-related data. The Push( ) function sent via communication 1564 has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1566 with values for the parameters requested using communication 1564. As shown in FIG. 15B, communication 1566 includes a Push( ) function with a built-in session key of BI10, a location value of "A" indicating location A as shown in FIG. 14, a velocity value of 2 MPH, a clock-time value of 1700, a usage value of 2 minutes, and a last Wi-Fi search time value of 5 minutes.

In response to communication 1566, learning model 1530 and/or built-in features 1540 can log part or all of the information provided by Wi-Fi Application 1520 and/or built-in features 1540, such as shown in log 1460 of FIG. 14.

Scenario 1500 continues with the mobile platform moving to location B and searching for Wi-Fi service. As shown in FIG. 14, at location B, the mobile platform is able to connect to the "ApBer" network. FIG. 15B shows Wi-Fi Application 1520 providing information about searching for Wi-Fi networks at location B via communication 1568, which includes a Push( ) function call with five parameters. The five parameters are a session key S10, an input-source reference of Conns, a Wi-Fi signal strength value of 40, a Wi-Fi Network name of ApBer to indicate that the ApBer network was found, and a Wi-Fi search outcome of YES to indicate the search was successful.

In response to the Push( ) function call of communication 1568, learning model 1530 can send communication 1570 with a Push( ) function to built-in features 1540 to request platform-related data. The Push( ) function sent via communication 1570 has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1572 with values for the parameters requested using communication 1570. As shown in FIG. 15B, communication 1572 include a Push( ) function with a built-in session key of BI10, a location value of "B" indicating location B as shown in FIG. 14, a velocity value of 3 MPH, a clock-time value of 1710, a usage value of 12 minutes, and a last Wi-Fi search time value of 10 minutes.

In response to communication 1572, learning model 1530 and/or built-in features 1540 can log part or all of the information provided by Wi-Fi Application 1520 and/or built-in features 1540, such as shown in log 1460 of FIG. 14.

Scenario 1500 continues with the mobile platform traveling to locations C, D, E, and F as shown in FIG. 14. At each location, the mobile platform searches to find one or more Wi-Fi networks. The resulting communication search data and platform-related data are shown in log 1460 of FIG. 14, but are not shown in FIG. 15B to save space.

Scenario 1500 then continues with the mobile platform traveling to location G and searching for Wi-Fi service. As shown in FIG. 14, at location G, the mobile platform is able to connect to the "ApBer" network. FIG. 15B shows Wi-Fi Application 1520 providing information about searching for Wi-Fi networks at location G via communication 1574, which includes a Push( ) function call with five parameters. The five parameters are a session key S10, an input-source reference of Conns, a Wi-Fi signal strength value of 12, a Wi-Fi Network name of ApBer to indicate that the ApBer network was found, and a Wi-Fi search outcome of YES to indicate the search was successful.

In response to the Push( ) function call of communication 1574, learning model 1530 can send communication 1576 with a Push( ) function to built-in features 1540 to request platform-related data. The Push( ) function sent via communication 1576 has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1578 with values for the parameters requested using communication 1576. As shown in FIG. 15B, communication 1578 include a Push( ) function with a built-in session key of BI10, a location value of "G" indicating location G as shown in FIG. 14, a velocity value of 2 MPH, a clock-time value of 2002, a usage value of 122 minutes, and a last Wi-Fi search time value of 17 minutes.

In response to communication 1576, learning model 1530 and/or built-in features 1540 can log part or all of the information provided by Wi-Fi Application 1520 and/or built-in features 1540, such as shown in log 1460 of FIG. 14.

In scenario 1500, learning model 1530 is trained after receiving the data from communications 1576 and 1578. FIG. 15B shows that learning model 1530 indicates it is trained by sending communication 1580 to Wi-Fi Application 1520 with a Notify( ) function call including two parameters: a session key S10, and a predefined value of LM_TRAINED to indicate that learning model 1530 is now trained.

Scenario 1500 continues with the mobile platform traveling to location H and requesting a prediction of a Wi-Fi search outcome. To request the prediction of the Wi-Fi search outcome, Wi-Fi Application 1520 can send communication 1582 with a Pull( ) function call. As shown in FIG. 15B, the Pull( ) function call has two parameters: a session key S10, and a pre-defined value WIFI_SEARCH, indicating that Wi-Fi Application 1520 is requesting a prediction of an outcome of search for Wi-Fi networks from learning model 1530.

In some embodiments not shown in FIG. 15B, the Pull( ) function call as sent in communication 1582 can have more than two parameters. For example, a third parameter specifying a network name, e.g., Zone3, can be interpreted by learning model 1530 as a request for a prediction for a search of wireless communications with the specified network. As another example, a third parameter specifying a location, e.g., location D, can be interpreted by learning model 1530 as a request for a prediction for a search of wireless communications at the specified location. Combining these examples, parameters specifying both a network name and a location can be interpreted by learning model 1530 as a request for a prediction for a search of wireless communications at the specified location for the specified network. Many other possible requests for prediction of searches for wireless communication are possible as well.

In response to communication 1582, learning model 1530 can send communication 1584a with a Push( ) function to built-in features 1540 to request platform-related data. The Push( ) function sent via communication 1584a has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1584b with values for the parameters requested using communication 1584a. As shown in FIG. 15B, communication 1584b includes a Push( ) function with a built-in session key of BI10, a location value of "H" indicating location H as shown in FIG. 14, a velocity value of 0 MPH, a clock-time value of 2005, a usage value of 125 minutes, and a last Wi-Fi search time value of 3 minutes.

Learning model 1530 can then classify the data received from built-in features 1540 into one of two possible predicted outcomes: a prediction that a search for a Wi-Fi network will be successful, and a prediction that a search for a Wi-Fi network will be unsuccessful. In some embodiments, a third possible outcome that the learning model is unable to predict the outcome, perhaps because the learning model is not trained to generate a prediction given the current data, is possible as well. In still other embodiments, other predictions are possible as well.

In scenario 1500, learning model 1530 can predict that a search for a Wi-Fi connection at location H is unlikely to succeed, perhaps based on recent data from nearby-location A. Learning model 1530 can send communication 1586a to inform Wi-Fi Application 1520 of the prediction. FIG. 15B shows that communication 1586a includes a PullResp( ) function call with five parameters: a session key S10, a input-source reference Conns, a predicted Wi-Fi signal strength of 0, a predicted Wi-Fi network of none indicated using the predefined value of NO_NTWK, and a predicted Wi-Fi search outcome of no network found indicated using the predefined value of PRED_NO.

In response to the prediction of a search for a Wi-Fi connection, Wi-Fi Application 1520 can determine that the wireless interface (WI) activation to search for and/or connect to a Wi-Fi network can be deferred, as shown in box 1586b of FIG. 15B, as learning model 1530 has predicted the search and/or attempt to connect would be unsuccessful. Wi-Fi Application 1520 can save power for the mobile platform by deferring wireless interface activation and making fewer unsuccessful searches for Wi-Fi connections.

In some embodiments, in response to the unsuccessful prediction, Wi-Fi Application 1520 can make one or more additional requests for predictions of searches for Wi-Fi connections. For example, Wi-Fi Application 1520 can periodically request predictions of searches for Wi-Fi connections, such as requesting one prediction every N seconds, where N>0. In other embodiments, Wi-Fi Application 1520 can request another prediction of a search for Wi-Fi connections when the mobile platform has moved more than a threshold amount from a location of an unsuccessful search. For example, if the threshold amount is 100 yards, then Wi-Fi Application 1520 can request another predicted search when mobile platform moves more than 100 yards from location H. Other responses to unsuccessful predictions are possible as well.

Scenario 1500 continues with the mobile platform traveling to location I and requesting a prediction of a Wi-Fi search outcome. To request the prediction of the Wi-Fi search outcome, Wi-Fi Application 1520 can send communication 1588 with a Pull( ) function call. As shown in FIG. 15B, the Pull( ) function call has two parameters: a session key S10, and a pre-defined value WIFI_SEARCH, indicating that Wi-Fi Application 1520 is requesting a prediction of an outcome of search for Wi-Fi networks from learning model 1530.

In response to communication 1588, learning model 1530 can send communication 1590a with a Push( ) function to built-in features 1540 to request platform-related data. The Push( ) function sent via communication 1590a has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1590*b* with values for the parameters requested using communication 1590*a*. As shown in FIG. 15B, communication 1590*b* includes a Push( ) function with a built-in session key of BI10, a location value of "I" indicating location I as shown in FIG. 14, a velocity value of 3 MPH, a clock-time value of 2015, a usage value of 135 minutes, and a last Wi-Fi search time value of 13 minutes.

In scenario 1500, learning model 1530 can determine that learning model 1530 is unable to predict an outcome of a search for a Wi-Fi connection at location I. For example, learning model 1530 can determine that training data does not apply to locations, velocities, clock times, usage values, and/or last search times as provided in communication 1590*b*, and so determine that learning model 1530 is unable to predict an outcome of a search for a Wi-Fi connection at location I moving at 3 MPH at 20:15 with 135 minutes of usage and with 13 minutes since a last Wi-Fi search for a Wi-Fi connection.

Learning model 1530 can send communication 1592 to inform Wi-Fi Application 1520 of the inability of learning model 1530 to make a prediction. FIG. 15B shows that communication 1592 includes a PullResp( ) function call with five parameters: a session key S10, a input-source reference Conns, a predicted Wi-Fi signal strength of 0, a predicted Wi-Fi network of none indicated using the predefined value of NO_NTWK, and a predicted Wi-Fi search outcome of an unknown outcome as indicated using the predefined value of PRED_UNK. Upon observing the predefined value of PRED_UNK, Wi-Fi Application 1520 can then determine that learning model 1530 to unable make a prediction.

In response to the unknown prediction of a search for a Wi-Fi connection, Wi-Fi Application 1520 can determine that activating the wireless interface to search for and/or connect to a Wi-Fi network can be deferred, as learning model 1530 has not predicted the search and/or attempt to connect would be successful.

In some embodiments not shown in FIG. 15B, in response to the unknown prediction, Wi-Fi Application 1520 can activate the wireless interface, search for Wi-Fi connections, and provide search result data to learning model 1530, such as performed via communications 1562, 1568, and 1574. Other responses to prediction unavailability are possible as well.

Scenario 1500 continues with the mobile platform traveling to location J and requesting a prediction of a Wi-Fi search outcome. To request the prediction of the Wi-Fi search outcome, Wi-Fi Application 1520 can send communication 1594 with a Pull( ) function call. As shown in FIG. 15B, the Pull( ) function call has two parameters: a session key S10, and a pre-defined value WIFI_SEARCH, indicating that Wi-Fi Application 1520 is requesting a prediction of an outcome of search for Wi-Fi networks from learning model 1530.

In response to communication 1594, learning model 1530 can send communication 1596*a* with a Push( ) function to built-in features 1540 to request platform-related data. The Push( ) function sent via communication 1596*a* has six parameters: a built-in session key of BI10, a location parameter L1, a velocity parameter V1, a clock-time parameter CT1, a usage parameter U1, and a last Wi-Fi search time parameter LWST1. In response, built-in features 1540 can send a Push( ) function via communication 1596*b* with values for the parameters requested using communication 1596*a*. As shown in FIG. 15B, communication 1596*b* includes a Push( ) function with a built-in session key of BI10, a location value of "J" indicating location J as shown in FIG. 14, a velocity value of 18 MPH, a clock-time value of 2022, a usage value of 142 minutes, and a last Wi-Fi search time value of 20 minutes.

In scenario 1500, learning model 1530 can predict that a search for a Wi-Fi connection at location J is likely to succeed, perhaps based on recent data from nearby-location B. Learning model 1530 can send communication 1598*a* to inform Wi-Fi Application 1520 of the prediction. FIG. 15B shows that communication 1598*a* includes a PullResp( ) function call with five parameters: a session key S10, a input-source reference Conns, a predicted Wi-Fi signal strength of 36, a predicted Wi-Fi network name of "ApBer", and a predicted Wi-Fi search outcome a network found indicated using the predefined value of PRED_YES.

In response to the prediction of a successful search for a Wi-Fi connection, Wi-Fi Application 1520 of mobile platform 1502 can activate the wireless interface, as shown in box 1598 of FIG. 15B. Once the wireless interface is activated, mobile platform 1502 can search for and/or connect to a Wi-Fi network, as learning model 1530 has predicted the search and/or attempt to connect would be successful. Other responses to successful predictions are possible as well.

Example Session Duration Prediction Service

A "usage session" for a mobile platform is the span of time between when the mobile platform is awakened or perhaps powered up and when the mobile platform is put to sleep or perhaps powered down. The time span or duration of the usage session is the amount of time between the awakening of the mobile platform and putting the mobile platform to sleep. For example, if a mobile platform is powered up at 8:00 AM and powered down at 8:05 AM, the time span of the usage session starting at 8:00 AM is five minutes.

The machine-learning service can predict a time span of a usage session either numerically or via classification. An example numerical prediction would be that a usage session will be six minutes long. An example classification of the duration of the usage session can be: short (e.g., less than five minutes), medium (e.g., between five and ten minutes), or long (greater than five minutes). In an example utilizing these classifications, the machine-learning service can predict a usage session will be either short, medium, or long.

A software application can use a predicted session duration or time span to guide the application's behavior. For example, suppose a user powers up a mobile platform and then starts a jukebox application to play random audio and/or video files. The jukebox application can send a request to the machine-learning service to predict a time span for the current usage session. In this example, the machine-learning service predicts a "medium" (5-10 minute) time span for the usage session. Based on the predicted medium time span, the jukebox application can initially select only audio, video, and/or audio-video files that cumulatively take ten minutes or less to play based on the predicted medium time span.

Further, suppose the jukebox application first plays an audio, video, and/or audio-video file that takes three minutes. Then, in selecting a second audio, video, and/or audio-video file, the jukebox application can select files that take no more than seven minutes long, based on a ten-minute long maximum duration of the usage session, with three minutes already consumed by playing the first file. Many other examples of application requests and using predicted session durations and/or time spans are possible as well.

Figure 16:
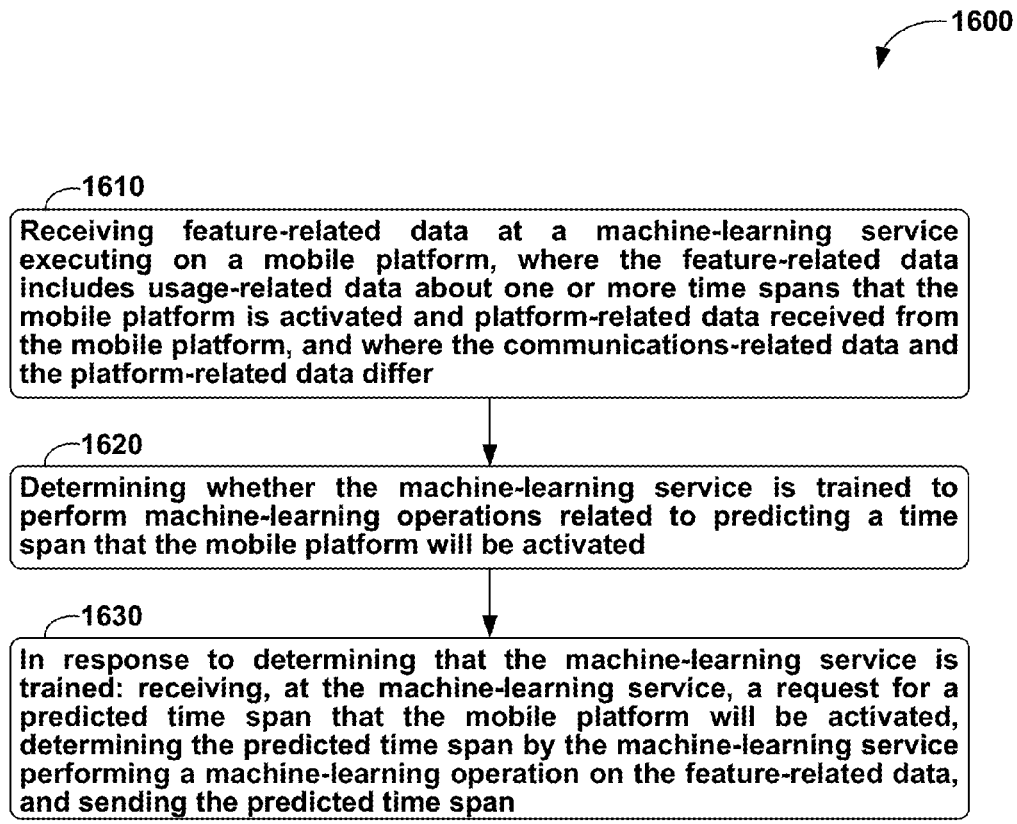
FIG. 16 is a flow chart of a method, in accordance with an example embodiment.

Turning to the figures, FIG. 16 is a flow chart of a method 1600, in accordance with an example embodiment. In some embodiments, part or all of method 1600 can be executed using one or more mobile platforms; e.g., mobile platform 200, 502, 602, 802, 1202, 1502, 1852, 2002 and/or one or more computing devices; e.g., computing device 2200.

At block 1610, feature-related data can be received at a machine-learning service executing on a mobile platform. The feature-related data can include usage-related data and platform-related data. The usage-related data can include data about one or more time spans that the mobile platform is activated. The platform-related data can be received from the mobile platform. The usage-related data and the platform-related data can differ.

At block 1620, the machine-learning service can determine whether the machine-learning service is trained to perform machine-learning operations related to predicting a time span that the mobile platform will be activated.

In some embodiments, the machine-learning operations can include a classification operation.

In other embodiments, the machine-learning operations can include a regression operation. In particular embodiments, the regression operation can include a linear regression operation. In other particular embodiments, the predicted time span can include a predicted amount for the predicted time span.

At block 1630, in response to determining that the machine-learning service is trained, the machine-learning service can: receive a request for a predicted time span that the mobile platform will be activated, determine the predicted time span by performing a machine-learning operation on the feature-related data, and send the predicted time span.

In particular embodiments, the machine-learning service can determine the predicted time span by performing a machine-learning operation on the feature-related data without receiving the request for the predicted time span; i.e., the machine-learning service can generate the predicted time span without being prompted by the request.

In some embodiments, the predicted time span can include a predicted classification of the time span. In particular embodiments, the predicted classification of the time span can be selected from among a short time span, a medium time span, and a long time span. In other embodiments, method 1600 can include selecting one or more media files based on the predicted time span and presenting the selected one or more media files using the mobile platform, such as discussed above in the context of the example jukebox application.

FIG. 17A shows usage log 1700 for activations of a mobile platform, in accordance with an example embodiment. Usage log 1700 shows, for each activation of the mobile platform, a time span (TS), a starting time shown using military-time notation, a location number, a location label (Loc Label), and a time-span label (TS Label).

Semantic labels, such as the location label and time-span label, can be part of usage log 1700. For example, the first row of usage log 1700 corresponds to an eight-minute long usage session starting at 8:08 AM (0808) at location 1, also known as "Home", and the time span of "medium" duration. For the entries in usage log 1700, a usage session with a time span of zero to five minutes is labeled "short", a usage session with a time span of five to ten minutes is labeled "medium", and a usage session with a 10+ minute time span is labeled "long." In some embodiments, more, fewer, and/or other semantic labels for time spans can be used. In other embodiments, other ranges of times can be used for short, medium, and/or long time spans.

Additionally, locations can have semantically labels. As shown in FIG. 17A, seven separate locations are listed, both numerically using the numbers one through seven, and with semantic labels. FIG. 17A shows location 1 with a semantic location label of "Home", location 2 with a semantic location label of "Work", location 3 with a semantic location label of "Random1", location 4 with a semantic location label of "Groceries", location 5 with a semantic location label of "Lunch Rest." abbreviating Lunch Restaurant, location 6 with a semantic location label of "Movie" for a movie theater, and location 7 with a semantic location label of "Random2."

FIG. 17B shows a usage log 1710 of activations of a mobile platform at a particular location, in accordance with an example embodiment. In particular, usage log 1710 shows activations of the mobile platform logged in usage log 1700 at location four, which has a semantic location label of "Groceries" as shown in FIG. 17A. The time-span data in usage log 1710 ranges from a minimum time-span of 15 minutes in the last entry of usage log 1710 to a maximum time-span of 22 minutes in the second entry of usage log 1710.

Usage log 1710 also includes a "Start" column with starting times for usage sessions shown in military time notation and a "Mins" column with starting times for usage sessions shown in terms of the number of minutes since midnight. For example, the first row of usage log 1710 in the "Start" column is for a usage session of 17 minutes duration that started at 17:59, where the time 17:59=17*60+59=1,079 minutes after midnight.

FIG. 17C shows graph 1720 of a linear regression model based on the data in usage log 1710, in accordance with an example embodiment. To provide a numerical prediction for a time span, a learning model can use regression techniques, such as, but not limited to linear regression, multiple regression, multivariate linear regression, and non-linear regression techniques.

The linear regression model shown in FIG. 17C is based on the "TS" and "Mins" column data. Mins column data were used instead of "Start" column data, as the Mins column data covers a single range of integers from 0 (corresponding to 0000 military time of 0000) to 1439 (corresponding to 2359 military time), while the set of military time values involve 24 separate ranges of integers (0000-0059, 0100-0159, . . . 2300-2359).

Specifically, the linear regression model shown is based on the equation y=mx+b, where m is approximately −0.04 and b is approximately 61. While Mins column data were used to determine the linear regression model, the x or "Start" axis of graph 1720 is labeled using military time labels for convenience. For example, the x axis label "0600" shown in FIG. 17C represents the time 6:00 AM.

The linear regression model can predict numerical values for time spans. For example, suppose the machine-learning model was requested to predict a time span of a usage session for the mobile platform at location "Groceries" at 6 PM or 1800 military time. The machine-learning service can use the linear regression model shown in FIG. 17C to predict a time span of 18.85 minutes for the usage session starting at 1800.

Figure 18A:
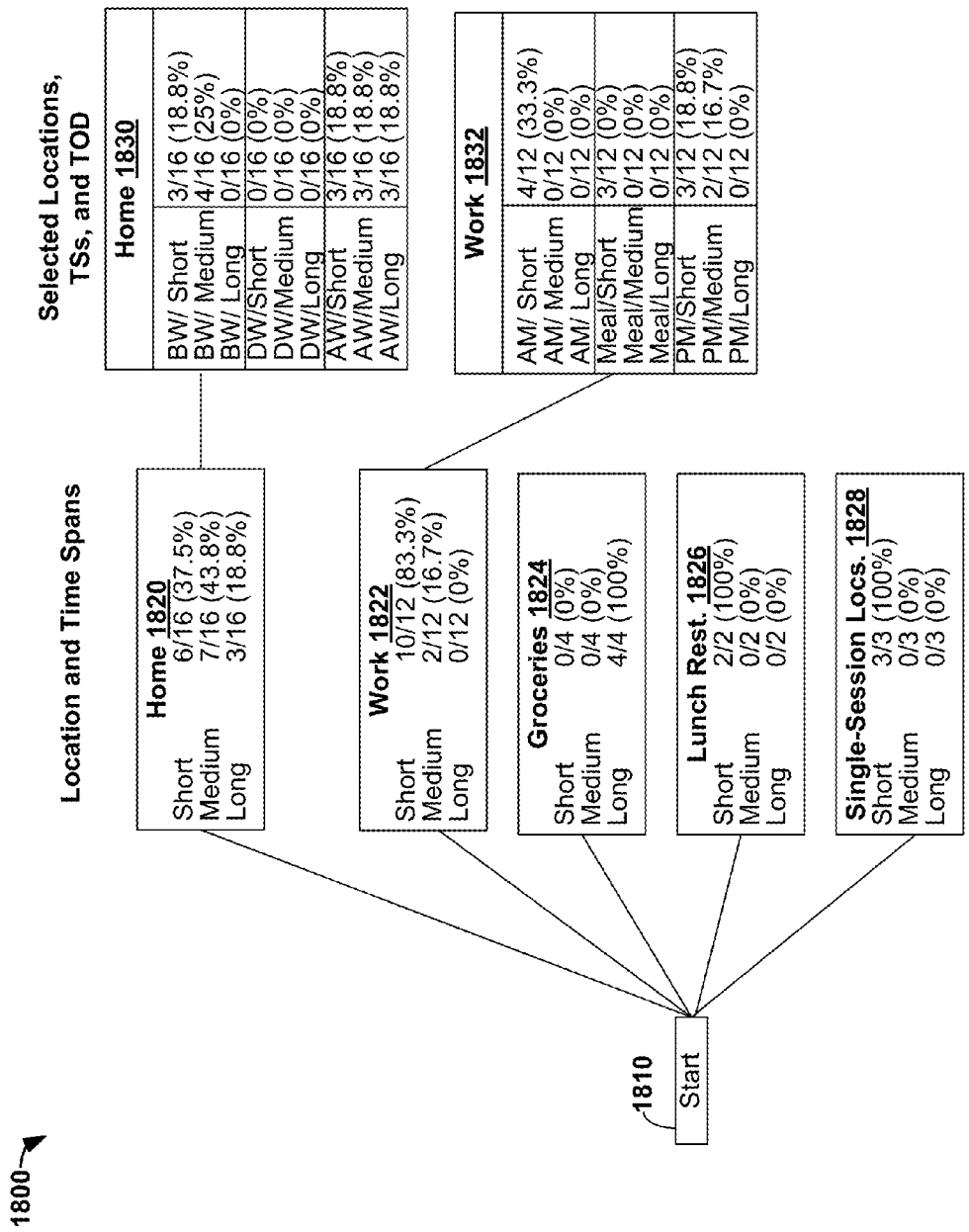
FIG. 18A is a classification diagram based on the data in the log shown in FIG. 17A, in accordance with an example embodiment.

FIG. 18A shows classification diagram 1800, which based on the data in usage log 1700 shown in FIG. 17A, in accordance with an example embodiment. Classification diagram 1810 depicts a result of a possible analysis of the data in usage log 1700 that can be used by the machine-learning service to predict time spans of usage sessions.

Classification diagram 1800 begins at node 1810, where a location is determined. FIG. 18A shows locations using the some of the semantic labels shown in FIG. 17A, such as Home used in node 1820, Work used in node 1822, Groceries used in node 1824, and Lunch Rest. used in node 1826. Node 1828 uses a label of "Single-Session Locs." to group all of the locations involved in one usage session as recorded in usage log 1700. Node 1828 include data generated for locations with semantic labels "Movie", "Random", and "Random2" in usage log 1700. In other embodiments, numeric locations can replace the use of semantic location labels in classification diagram 1800.

In the example shown in FIG. 18A, a short time span can range from zero to five minutes, a medium time span can range from six to ten minutes, and a long time span ranges longer than eleven minutes. Specifically, node 1820 shows an analysis of usage-session time spans from usage log 1700 at location Home, indicating that at location Home, six of sixteen of total sessions or 37.5% had a short time span, seven of sixteen total sessions or 43.8% had a medium time span, and three of sixteen total sessions or 18.8% had a long time span. In some embodiments, more, fewer, and/or other semantic labels for time spans can be used. In other embodiments, other ranges of times can be used for short, medium, and/or long time spans.

Node 1822 shows an analysis of usage-session time spans at location Work, indicating that at location Work, ten of twelve total sessions or 83.3% had a short time span, two of twelve total sessions or 16.7% had a medium time span, and zero sessions had a long time span.

Only one semantic time label is shown as being utilized for each of nodes 1824, 1826, and 1828. For node 1824, representing location Groceries, all four usage sessions had long time spans. Node 1826, regarding location Lunch Rest., indicates that both usage sessions at that location had short time spans. Node 1828, reflecting data from the Single-Session Locations, indicates that all three usage sessions at those locations had short time spans.

At the Home and Work locations, multiple possible classifications of time spans are possible. In that case, the data for those locations can be additionally analyzed. For example, node 1830, shown connected to node 1820 in classification diagram 1800, indicates a result of further analysis of usage sessions for location "Home" based on both usage-session time spans and time of day. In node 1830, times of day are classified as either before work (BW), during work (DW), or after work (AW). For example, the BW times of day can range from midnight to 8:59 AM, the DW times of day can range from 9:00 AM to 5:00 PM, and the AW times of day can range from 5:01 PM to 11:59 PM. In some embodiments, more, fewer, and/or other semantic labels for times of day can be used. In other embodiments, other ranges of times can be used for the BW, DW, and AW time spans. In still other embodiments, times of day can be used without classifications.

Node 1830 of FIG. 18A shows that: (a) three of seven usage sessions before work at location Home have short time spans and four usage sessions at location Home have medium time spans, (b) no usage sessions were made at location Home during work, and that (c) equal numbers of short, medium, and long duration usage sessions were made at location Home after work. Using the information shown in node 1830, if a prediction is requested while the mobile platform is at location Home, one prediction is that the call is slightly more likely to be of medium duration than short duration before work, and that all durations are equally likely either during work or after work. As there are data for after-work calls, additional analysis may be performed to better refine the after work call estimate that "all durations are equally likely"; e.g., use additional time span and/or time-of-day classifications for after-work calls.

For node 1832, times of day are classified as either "AM" for morning work hours; e.g., between 9:01 AM and 11:59 AM, "Meal" or during a meal, a.k.a. lunch or dinner; e.g., between 12:00 PM and 12:59 PM, and "PM" for post-meal afternoon work hours; e.g., between 1:00 PM and 4:59 PM. In some embodiments, more, fewer, and/or other semantic labels for times of day can be used. In other embodiments, other ranges of times can be used for the AM, Meal, and PM times of day. In still other embodiments, times of day can be used without classifications. Node 1832 of FIG. 18A shows that: (a) all AM-time usage sessions have short time spans, (b) all Meal-time usage sessions have short time spans, and (c) it is somewhat more likely that short time-span usage sessions will be made during the PM times of day than medium time-span usage sessions.

Classifications and classification diagram 1800 can be used to generate numerically-valued predictions. For example, using the data in node 1820, if a usage session is begun at location Home, 37.5% of all usage sessions are short, 43.8% of all usage sessions are medium, and 18.8% of all usage session are long. To generate a numerical prediction, one set of assumptions that can be used is that the mid-point value of a given range is chosen to represent usage-sessions in the range, and a long time-span usage session is arbitrarily chosen to have a 20 minute long time span.

Under these assumptions and for the data in node 1820, a predicted time span PT for a usage session at location Home can be determined as:

$$PT = \text{short\_percent} * \text{short\_midpoint} + \text{medium\_percent} *$$
$$\text{medium\_midpoint} + \text{long\_percent} * \text{long\_arbitrary\_valve}$$
$$= 37.5\% * 2.5 \text{ minutes} + 43.8\% * 8 \text{ minutes} + 18.8\% * 20 \text{ minutes}$$
$$= 0.94 + 3.50 + 3.76 = 8.20 \text{ minutes}$$

Other techniques for generating numerically-valued predictions from classifications and classification diagrams are possible as well.

Figure 18B:
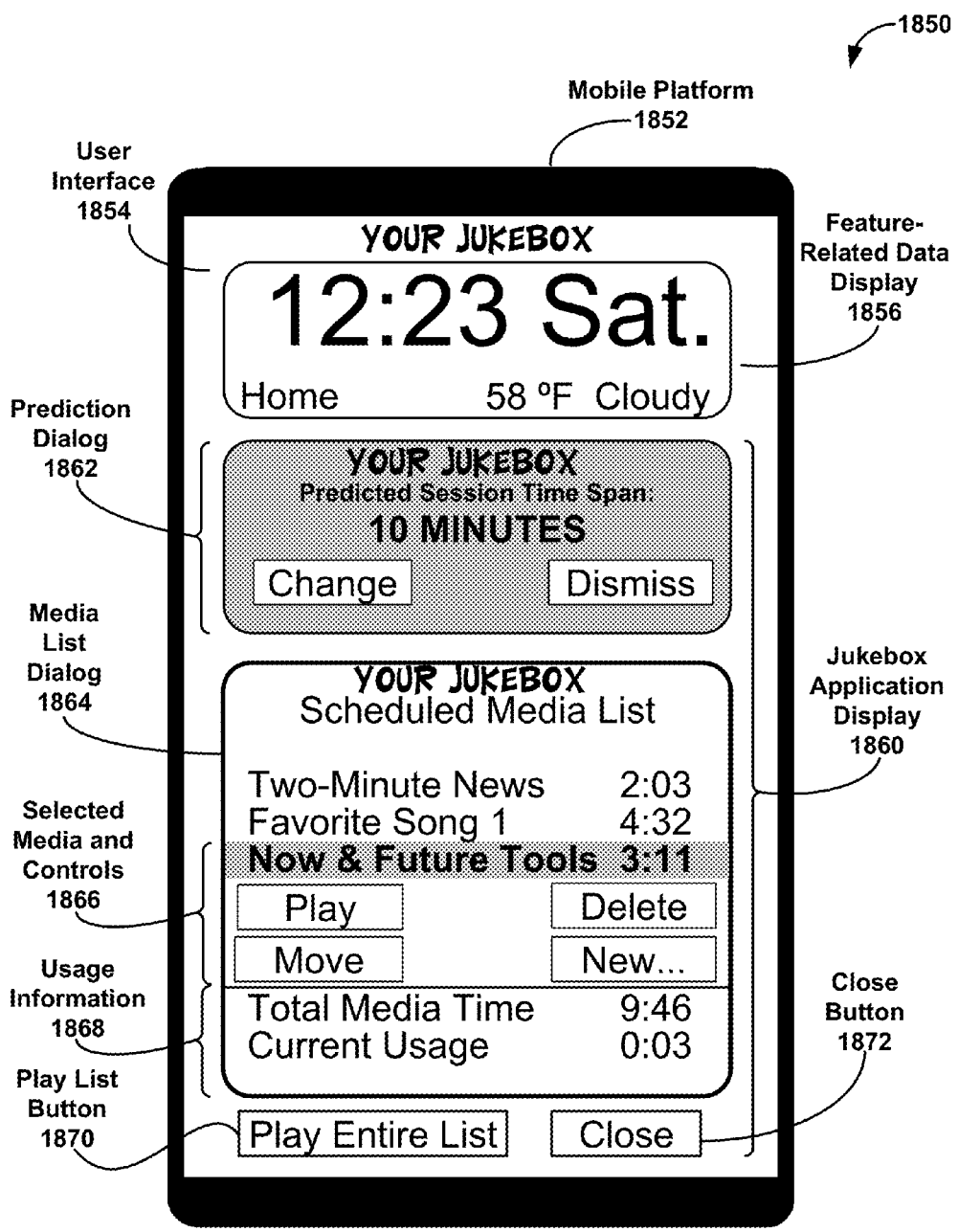
FIG. 18B is an example user interface for a jukebox application used in a sixth scenario, in accordance with an example embodiment.

FIG. 18B shows example user interface 1854 for jukebox application 1860 used in scenario 1850, in accordance with an example embodiment. In scenario 1850, user interface 1854 shows feature-related data display 1856 and jukebox application display 1860. Feature-related data display shows a current time and date of "12:23 Sat.", a current location with a semantic label of "Home", and current weather conditions of "58° F." and "Cloudy."

A jukebox application can be configured to request the machine-learning service to predict a time span of a usage session and then select media, including but not limited to audio, video, and audio/video files, to play during the predicted duration. In scenario 1850, the jukebox application generates jukebox application display 1860, which includes prediction dialog 1862, media list dialog 1864, play list button 1870, and close button 1872.

Prediction dialog 1862 shows the usage session time span predicted by the machine-learning service of 10 minutes, perhaps based on the feature-related data shown in feature-related display 1856, such as the displayed location, date, and time. Prediction dialog 1862 includes two buttons: a "Change" button to permit the user to change the usage session time span from the predicted value and a "Dismiss" button to close prediction dialog 1862.

As shown in FIG. 18B, media list dialog 1864 displays a media list selected by the jukebox application. The media list includes three media files to be played: "Two-Minute News" with a duration of 2:03, a "Favorite Song 1" with a duration of 4:32, and "Now & Future Tools" with a duration of 3:11.

In scenario 1850 and as shown in FIG. 18B, the "Now & Future Tools" media is selected, as shown in FIG. 18B using a grey background for the "Now & Future Tools" media list item and the bold font for the "Now & Future Tools" media list entry. As such, selected media and controls 1866 operate on the "Now & Future Tools" media. Selected media and controls 1866 include a "Play" button to play the selected media immediately, a "Delete" button to delete the selected media from the media list, a "Move" button to enable movement of the selected media within the media list, and a "New . . . " button to permit addition of new media item(s) to the media list. Other dialogs and controls are possible as well.

Usage information 1868 shows the total duration of the three media files is 9 minutes, 46 seconds (9:46) and the current usage, or amount of time mobile platform 1852 has been activated, is 3 seconds (0:03). In scenario 1850, the media shown in media list dialog 1864 were selected, in part, to play less in total less than the predicted session time span. In scenario 1850 and as shown in FIG. 18B, the total duration of the three media files is 14 seconds less than the predicted duration of 10 minutes.

Play list button 1870 can be used to play the media items in the order shown in media list dialog 1864. Close button 1872 can be used to close user interface 1854. In some embodiments, media files played using the jukebox application can be played in the background, to permit the user of mobile platform 1852 to interact with other applications during the usage session. In particular embodiments, when the jukebox application is in the background and is about to play a video or audio/video file, the jukebox application can attempt to become a foreground application to permit the user to view the video or audio/video file.

Example Automated Volume Setting Service

Volume settings for mobile platforms, such as ring tone volume, mute, and vibrate settings, are often changed according to predictable patterns. For example, before attending meetings, a mobile platform user can use a mute setting to turn off a telephone ringer. At that time, the user may set the mobile platform to a vibrate mode, where a user of the mobile platform is alerted to an incoming telephone call by use of a haptic or vibration system rather than the telephone ringer.

Once the meeting is complete, the user may "un-mute" the mobile platform so to turn on the telephone ringer. At that time, the user may also set the vibrate mode to off, so to turn off the haptic or vibration system, and thus rely on the telephone ringer to alert the user of an incoming telephone call. The user may perform similar actions at other places than meetings where silence is often expected, such as at movie theaters, libraries, schools, lecture halls, live performances, and similar situations.

The machine-learning service can be trained to learn patterns in changing volume settings for a mobile platform. Once trained, the machine-learning service can generate predictions for the volume settings. The predictions can be used to have the mobile platform directly or indirectly change the volume settings. For example, the machine-learning service can provide the predicted settings to a dialer application or other application that changes the settings to the predicted setting values. As another example, the machine-learning service can generate a prompt with the predicted setting values, perhaps with a reminder to the user to change the volume settings.

By predicting volume settings for mobile platforms, the mobile-learning service can save the user the effort and time involved in repeatedly setting and resetting volume settings. Additionally, if the mobile platform is configured to prompt the user to change volume settings when predicted, the user can be reminded to change volume settings before attending an event where silence is often expected, and thus avoid the embarrassment of having the mobile platform sound off during the event.

Figure 19:
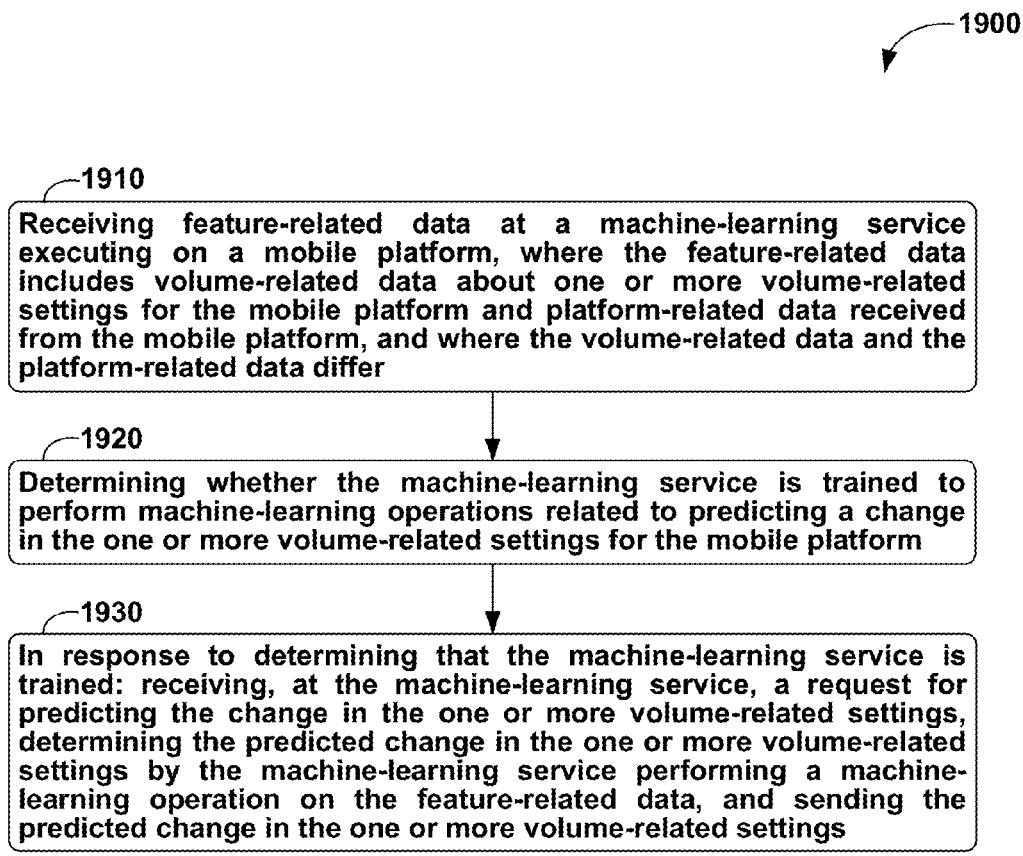
FIG. 19 is a flow chart of a method, in accordance with an example embodiment.

Turning to the figures, FIG. 19 is a flow chart of a method 1900, in accordance with an example embodiment. In some embodiments, part or all of method 1900 can be executed using one or more mobile platforms; e.g., mobile platform 200, 502, 602, 802, 1202, 1502, 1852, 2002 and/or one or more computing devices; e.g., computing device 2200.

At block 1910, feature-related data can be received at a machine-learning service executing on a mobile platform. The feature-related data can include volume-related data and platform-related data. The volume-related data can include data about one or more volume-related settings for the mobile platform. The platform-related data can be received from the mobile platform. The volume-related data and the platform-related data can differ.

In some embodiments, the one or more volume-related settings can include a mute setting, a vibration setting, and a setting for ringer volume. In other embodiments, the feature-related data can include data related to a location of the mobile platform, a current time, a call-termination time, a calling party, and a calendar event. In still other embodiments, the platform-related data can include data about devices proximate to the mobile platform.

At block 1920, the machine-learning service can determine whether the machine-learning service is trained to perform machine-learning operations related to predicting a change in the one or more volume-related settings for the mobile platform.

At block 1930, in response to determining that the machine-learning service is trained, the machine-learning service can: receive a request for predicting the change in the one or more volume-related settings, determine the predicted change in the one or more volume-related settings by performing a machine-learning operation on the feature-related data, and send the predicted change in the one or more volume-related settings.

In particular embodiments, the machine-learning service can determine the predicted change in the one or more volume-related settings by performing a machine-learning operation on the feature-related data without receiving the request for the predicted outcome of the search for establishing the electronic communication; i.e., the machine-learning service can generate the predicted outcome without being prompted by a request.

In some embodiments, method 1900 can further include determining one or more semantic labels for the platform-related data. In particular of the some embodiments, determining one or more semantic labels for the platform-related data can include determining the one or more semantic labels for the current time, where the semantic labels include an at-home-time label, a work-time label, a sleep-time label, a traveling-time label, and a meal-time label.

In other particular of the some embodiments, determining one or more semantic labels for the platform-related data includes determining the one or more semantic labels for the current location, where the semantic labels include a home-location label, a work-location label, a sleep-location label, a traveling-location label, and a meal-location label.

In still other embodiments, method 1900 can further include: determining whether the predicted change in the one or more volume-related settings can include a prediction that at least one of the one or more volume-related settings change. In response to determining that the predicted change in the one or more volume-related settings includes the prediction that the at least one of the one or more volume-related settings changes, a prompt to change the at least one of the one or more volume-related settings can be generated.

In even other embodiments, method 1900 can further include: determining whether the predicted change in the one or more volume-related settings can include a prediction that at least one of the one or more volume-related settings change. In response to determining that the predicted change in the one or more volume-related settings includes the prediction that the at least one of the one or more volume-related settings changes, the at least one of the one or more volume-related settings can be changed. The volume-related settings can be changed by the mobile platform without additional input, perhaps by a dialer application executing on the mobile platform that receives the at least one of the prediction that the one or more volume-related settings from the machine-learning service and sets the volume-related settings according to the prediction.

Figure 20A:
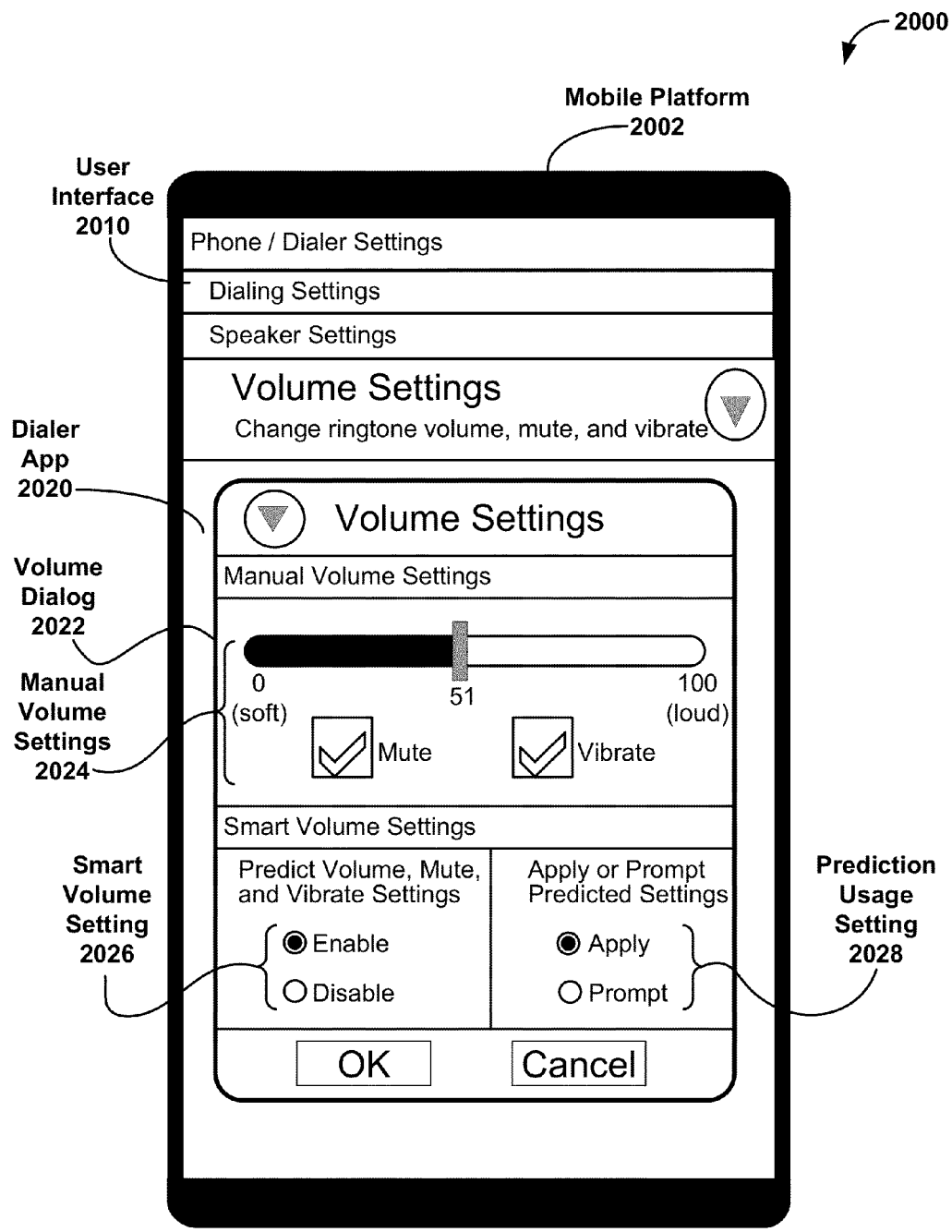
FIG. 20A shows an example user interface used in a seventh scenario, in accordance with an example embodiment.

FIG. 20A shows an example user interface 2010 used in scenario 2000, in accordance with an example embodiment. User interface 2010, executing on mobile platform 2002, includes an interface for dialer application 2020 configured to generate and display volume dialog 2022. Volume dialog 2022 includes manual volume settings 2024, smart volume setting 2026, an OK button to save current settings before exiting volume dialog 2022, and a Cancel button to exit volume dialog 2022 without saving current settings.

Manual volume settings 2024 includes a slider bar that enables a user to set a microphone output setting between a minimum setting of 0, which effectively mutes a ringer that outputs the ringtone, and a maximum setting of 100, which provides the maximum output volume for the ringtone. In scenario 2000 as shown in FIG. 20A, manual ringtone volume setting is set at 51.

Manual volume settings 2024 also includes check boxes for a mute setting and a vibrate setting. The mute setting, when active or checked, inhibits ringer output; a.k.a. mutes the ringer and stops ringtone output. The vibrate setting, when active or checked, allows a haptic output for the ringer; a.k.a. the mobile platform can vibrate or produce other haptic output when the mobile platform is in a ringing state. As shown in FIG. 20A, both the mute and vibrate settings are not active or checked. In scenario 2000, when manual volume settings are allowed, the mute setting is not active and so the slider bar sets the volume for the ringer. Also, no haptic output is generated when the mobile platform is in the ringing state.

As shown in FIG. 20A, smart volume setting 2026 can learn and predict ringer volume, mute, and vibrate settings. When smart volume setting 2026 is disabled, dialer application 2020 can use manual volume settings 2024 to determine output volume for a ringer of mobile platform 2020 and whether or not haptic output will be provided when mobile platform 2002 is in the ringing state.

When smart volume setting 2026 is enabled, dialer application 2020 can use a machine-learning service to perform machine-learning operation(s) to predict volume settings, such as ringtone volume, mute, and vibrate settings. Then, upon receiving predicted volume setting value(s), dialer application 2020 can use the predicted settings values according to predicted usage setting 2028.

In scenario 2000, and as shown in FIG. 20A, smart volume setting 2026 is set to enabled and predicted usage setting 2028 is set to apply. When predicted usage setting 2028 is set to apply, predicted volume setting value(s), such as ringtone volume, mute, and/or vibrate setting values, received by dialer application 2020 are used to set the ringtone volume, mute, and vibrate settings. That is, when predicted usage setting 2028 is set to apply, mobile platform 2002 and/or dialer application 2020, can set the ringtone volume, mute, and/or vibrate settings using the predicted volume setting values(s) without additional input, such as user input. In some embodiments, when predicted usage setting 2028 is set to apply, mobile platform 2002 and/or dialer application 2020 can generate a dialog or other prompt to indicate to a user that the ringtone volume, mute, and/or vibrate settings have been changed to the predicted volume setting values(s).

When predicted usage setting 2028 is set to prompt, predicted volume setting value(s) received by dialer application 2020 are displayed, audibly output, and/or otherwise prompted to a user of mobile platform 2002. Upon being displayed, the user can use volume dialog 2022 to set the ringtone volume, mute, and vibrate settings as desired, perhaps using the prompted predicted volume setting value(s).

Figure 20B:
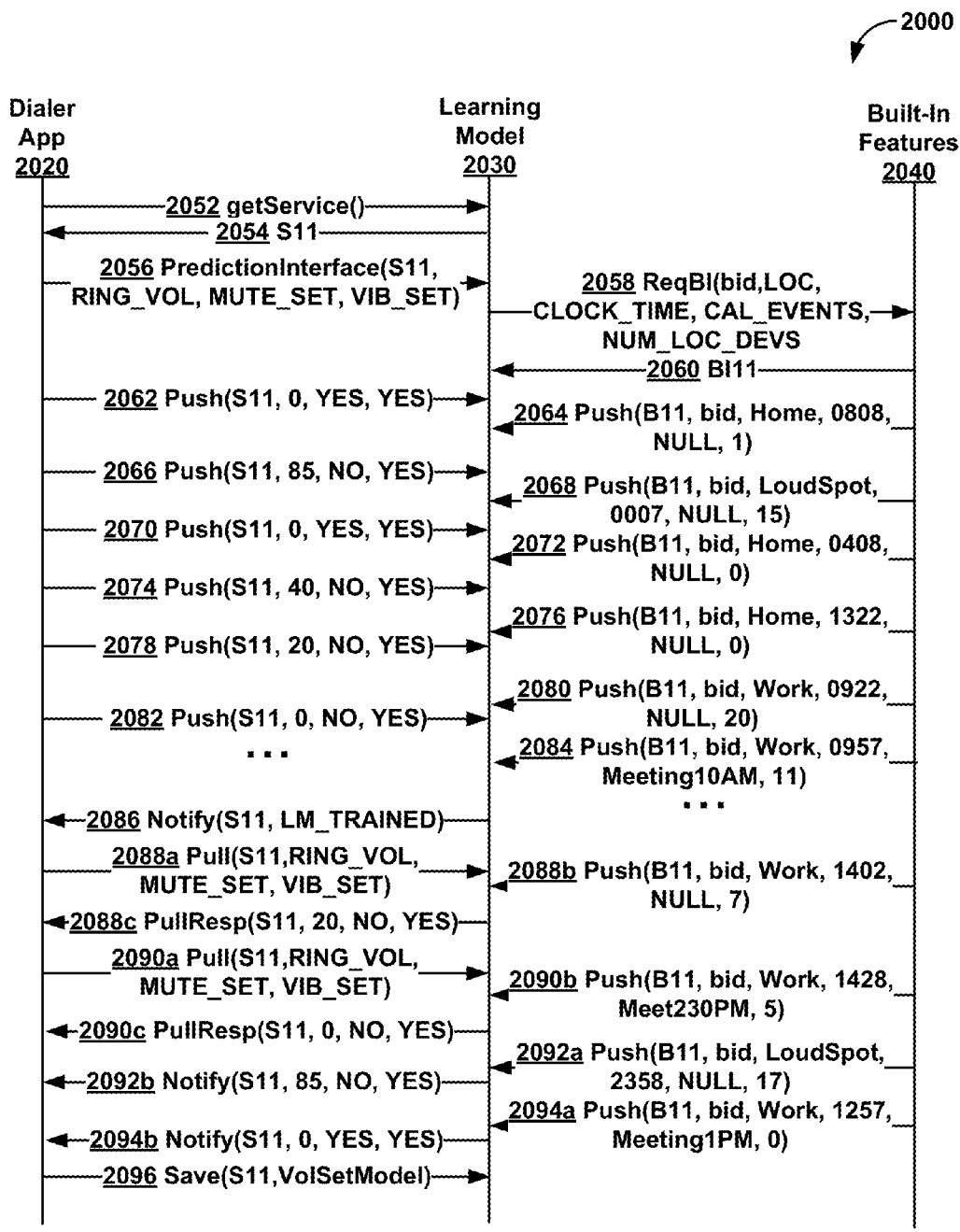
FIG. 20B shows example communications for the seventh scenario, in accordance with an example embodiment.

FIG. 20B shows example communications for the scenario 2000, in accordance with an example embodiment. In FIG. 20B, scenario 2000 continues with dialer application 2020 calling the getService( ) function of learning model 2030 via communication 2052. In response, learning model 2030 provides a session key S11 via communication 2054 to dialer application 2020. Session key S11 is included for subsequent communications between dialer application 2020 and learning model 2030 to permit addressing the subsequent communications to the correct learning model, e.g., learning model 2030 and correct application, e.g., dialer application 2020 for a learning session keyed by S11.

Dialer application 2020 can instruct learning model 2030, via communication 2056, to set up a prediction interface. As shown in FIG. 20B, communication 2058 includes a PredictionInterface( ) call with four parameters: session key S11, and three parameters for requested output predictions: ring tone volume settings, mute settings, and vibration settings, as shown in FIG. 20B, using the respective predefined RING_VOL, MUTE_SET, and VIB_SET values.

In response, learning model 2030 sends communication 2058 to built-in features 2040 with a ReqBI( ) function call requesting built-in features. As shown in FIG. 20B, learning model 2030 uses the ReqBI( ) call to request, using input-source descriptor "bid", current location values, clock times, calendar-related events, and numbers of local (or proximate) devices, by passing the respective predefined LOC, CLOCK_TIME, CAL_EVENTS, and NUM_LOC_DEVS values to built-in features 2040. Built-in features 2040 can include at least the functionality of built-in features 410 discussed above. In response, built-in features 2040 returns a built-in session key BI11 via communication 2060. Built-in session key BI11 is included with subsequent communications between learning model 2030 and built-in features 2040 to permit addressing the subsequent built-in related communications to the correct learning model.

FIG. 20B continues with dialer application 2020 sending communication 2062 to learning model 2030 with a Push( ) function call to inform learning model 2030 that a volume settings have been set with a ring tone volume setting of 0, a mute setting of YES or active, and a vibration setting of YES. Additionally, built-in features 2040 sends communication 2064, with a Push( ) function call to inform learning model 2030 that mobile platform 2002 is at location "Home" at a clock time of 0808 (8:08 AM), no calendar events are active, and that one device is nearby (proximate).

FIG. 20B shows a number of communications 2066-2085 for five subsequent volume setting changes made using dialer application 2020 and built-in feature values provided to learning model 2030 from built-in features with the values listed in Table 5 below.

TABLE 5

| Communications | Volume | Mute | Vibration | Location | Time | Cal Events | Local Devices |
|---|---|---|---|---|---|---|---|
| 2066 and 2068 | 85 | NO | YES | LoudSpot | 00:07 | NULL | 15 |
| 2070 and 2072 | 0 | YES | YES | Home | 04:08 | NULL | 0 |
| 2074 and 2076 | 40 | NO | YES | Home | 13:22 | NULL | 0 |
| 2078 and 2080 | 20 | NO | YES | Work | 09:22 | NULL | 20 |
| 2082 and 2084 | 0 | NO | YES | Work | 09:57 | Meeting 10 AM | 11 |

Scenario 2000 continues with learning model 2030 sending communication 2086 to dialer application 2020 with a Notify( ) function call. In scenario 2000, learning model 2030 is trained after receiving the data from communications 2082 and 2084. FIG. 20B shows that learning model 2030 indicates it is trained by sending communication 2086 to dialer application 2020 with a Notify( ) function call including two parameters: a session key S11, and a predefined value of LM_TRAINED to indicate that learning model 2030 is now trained.

FIG. 20B shows scenario 2000 continuing with dialer application 2020 sending communication 2088a to learning model 2030. Communication 2088a includes the Pull( ) function call to request a prediction of ringer volume, mute, and vibration settings from learning model 2030 using respective pre-defined values of RING_VOL, MUTE_SET, and VIB_SET as parameters in the Pull( ) function call. Communication 2088b includes feature data from built-in functions 2040 with a location of Work, a time of 2:02 PM (1402), a calendar event of NULL or no calendar events active, and a number of local devices of 7. Learning model 2030 can apply machine-learning operations to predict the requested volume settings. Scenario 2000 continues with learning model 2030 sending the prediction to dialer application 2020 using PullResp( ) in communication 2088c. FIG. 20B shows that the prediction of communication 2088c includes a ringtone volume setting of 20, a mute setting of NO or not active, and vibration setting of YES.

Scenario 2000 continues with dialer application 2020 sending communication 2090a to learning model 2030. Communication 2090a includes the Pull( ) function call to request a prediction of ringer volume, mute, and vibration settings from learning model 2030 using respective pre-defined values of RING_VOL, MUTE_SET, and VIB_SET as parameters the Pull( ) function call. Communication 2090b includes feature data from built-in functions 2040 with a location of Work, a time of 2:28 PM (1428), a calendar event of "Meet230PM", and a number of local devices of 5. Learning model 2030 can apply machine-learning operations to predict the requested volume settings. Scenario 2000 continues with learning model 2030 sending the prediction to dialer application 2020 using PullResp( ) in communication 2090c. FIG. 20B shows that the prediction of communication 2090c includes a ringtone volume setting of 0, a mute setting of NO, and vibration setting of YES.

FIG. 20B shows that built-in features 2040 then sends communication 2092a to learning model 2030. Communication 2092a includes a Push( ) function call to inform learning model 2030 that mobile platform 2002 is at "LoudSpot" at 11:58 PM (2358) without any calendar events scheduled and 17 local devices detected. In response to communication 2092a, learning model 2030 can apply machine-learning operations to predict volume settings based on the information provided via communication 2092a. Scenario 2000 continues with learning model 2030 sending a Notify( ) function call in communication 2092b to dialer application 2020, predicting a ringtone volume setting of 85, a mute setting of NO, and vibration setting of YES. Upon reception of communication 2092b, mobile platform 2002 and/or dialer application 2020 can prompt a user of mobile platform 2002 of recently-predicted volume settings and/or apply the recently-predicted volume settings, perhaps based on settings of smart volume setting 2026 and prediction usage setting 2028.

In scenario 2000, built-in features 2040 sends communication 2094a to learning model 2030, where communication 2094a includes a Push( ) function call to inform learning model 2030 that mobile platform 2002 is at "Work" at 12:57 PM (1257), with a calendar event of "Meeting1PM", and no other local mobile platforms present. In response to communication 2094a, learning model 2030 can apply machine-learning operations to predict volume settings based on the information provided via communication 2094a. Scenario 2000 continues with learning model 2030 sending a Notify( ) function call in communication 2094b to dialer application 2020, predicting a ringtone volume setting of 0, a mute setting of YES, and vibration setting of YES. Upon reception of communication 2094b, mobile platform 2002 and/or dialer application 2020 can prompt a user of mobile platform 2002 of recently-predicted volume settings and/or apply the predicted volume settings, perhaps based on settings of smart volume setting 2026 and prediction usage setting 2028.

Scenario 2000 concludes with dialer application 2020 call Save( ) function via communication 2096 to request that learning model 2030 save a context, and perhaps other data, of a learning session thread in a VolSetModel variable. In some scenarios not shown in FIG. 20B, learning model 2030 can provide a response to communication 2096, such as a return value to the Save( ) function and/or a communication providing a status of the Save( ) function; e.g., SaveOK or SaveFail.

Example Data Network

Figure 21:
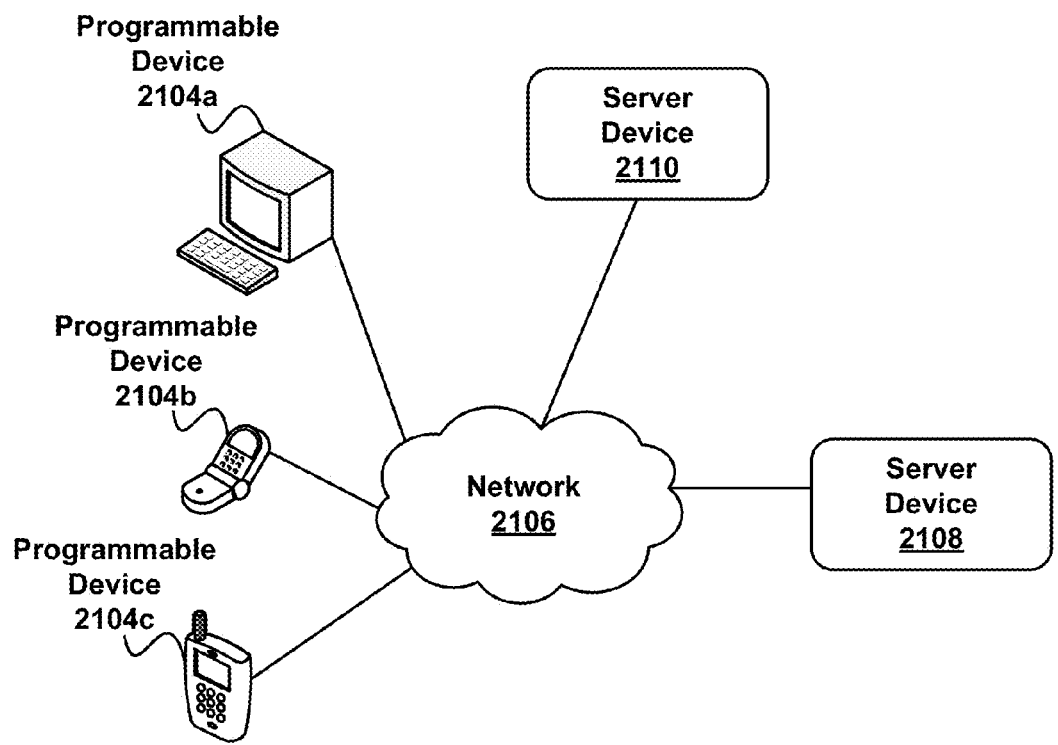
FIG. 21 depicts a distributed computing architecture, in accordance with an example embodiment.

FIG. 21 shows server devices 2108, 2110 configured to communicate, via network 2106, with programmable devices 2104a, 2104b, and 2104c. Network 2106 may correspond to a LAN, a wide area network (WAN), a corporate intranet, the public Internet, or any other type of network configured to provide a communications path between networked computing devices. The network 2106 may also correspond to a combination of one or more LANs, WANs, corporate intranets, and/or the public Internet.

Although FIG. 21 only shows three programmable devices, distributed application architectures may serve tens, hundreds, or thousands of programmable devices. Moreover, programmable devices 2104a, 2104b, and 2104c (or any additional programmable devices) may be any sort of computing device, such as an ordinary laptop computer, desktop computer, network terminal, wireless communication device (e.g., a cell phone or smart phone), and so on. In some embodiments, programmable devices 2104a, 2104b, and 2104c may be dedicated to the design and use of software applications. In other embodiments, programmable devices

2104a, 2104b, and 2104c may be general purpose computers that are configured to perform a number of tasks and need not be dedicated to software development tools.

Server devices 2108, 2110 can be configured to perform one or more services, as requested by programmable devices 2104a, 2104b, and/or 2104c. For example, server device 2108 and/or 2110 can provide content to programmable devices 2104a-2104c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 2108 and/or 2110 can provide programmable devices 2104a-2104c with access to software for database, search, computation, graphical, audio, video, World Wide Web/Internet utilization, and/or other functions. Many other examples of server devices are possible as well.

Computing Device Architecture

Figure 22A:
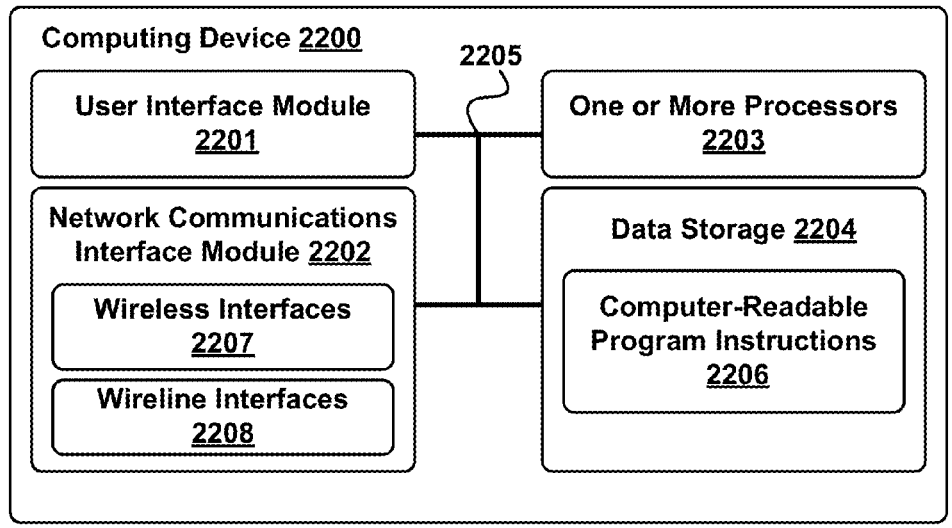
FIG. 22A is a block diagram of a computing device, in accordance with an example embodiment.

FIG. 22A is a block diagram of a computing device (e.g., system) in accordance with an example embodiment. In particular, computing device 2200 shown in FIG. 22A can be configured to perform one or more functions of mobile platforms 200, 502, 602, 902 server devices 2108, 2110, network 2106, and/or one or more of programmable devices 2104a, 2104b, and 2104c. Computing device 2200 may include a user interface module 2201, a network communications interface module 2202, one or more processors 2203, and data storage 2204, all of which may be physically and/or communicatively linked together via a system bus, network, or other connection mechanism 2205.

Generally, user interface module 2201 is configured to send data to and/or receive data from external user input/output devices. For example, user interface module 2201 can be configured to send and/or receive data to and/or from user input devices such as a keyboard, a keypad, a touch screen, a computer mouse, a track ball, a joystick, a camera, a voice recognition module, and/or other similar devices. User interface module 2201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 2201 can also be configured generate audible output(s) through device(s) such as a speaker, speaker jack, audio output port, audio output device, earphones, telephone ringers, and/or other similar devices. In some embodiments, user interface module 2210 can be configured to provide haptic and/or tactile feedback using one or more vibration devices, tactile sensors, actuators including haptic actuators, tactile touchpads, piezo-haptic devices, piezo-haptic drivers, and/or other similar devices.

Network communications interface module 2202 can include one or more wireless interfaces 2207 and/or one or more wireline interfaces 2208 that are configurable to communicate via a network, such as network 2106 shown in FIG. 21. Wireless interfaces 2207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 2208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 2202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 2203 can include one or more general purpose processors and/or one or more special purpose processors (e.g., digital signal processors, application specific integrated circuits, etc.). Processors 2203 can be configured to execute computer-readable program instructions 2206 that are contained in the data storage 2204 and/or other instructions as described herein.

Data storage 2204 can include one or more computer-readable storage media that can be read and/or accessed by at least one of processors 2203. The one or more computer-readable storage media can include volatile and/or non-volatile storage components, such as optical, magnetic, organic or other memory or disc storage, which can be integrated in whole or in part with at least one of processors 2203. In some embodiments, data storage 2204 can be implemented using a single physical device (e.g., one optical, magnetic, organic or other memory or disc storage unit), while in other embodiments, data storage 2204 can be implemented using two or more physical devices.

Data storage 2204 can include computer-readable program instructions 2206 and perhaps additional data. In some embodiments, data storage 2204 can additionally include storage required to perform at least part of the herein-described methods and techniques and/or at least part of the functionality of the herein-described devices and networks.

Cloud-Based Servers

Figure 22B:
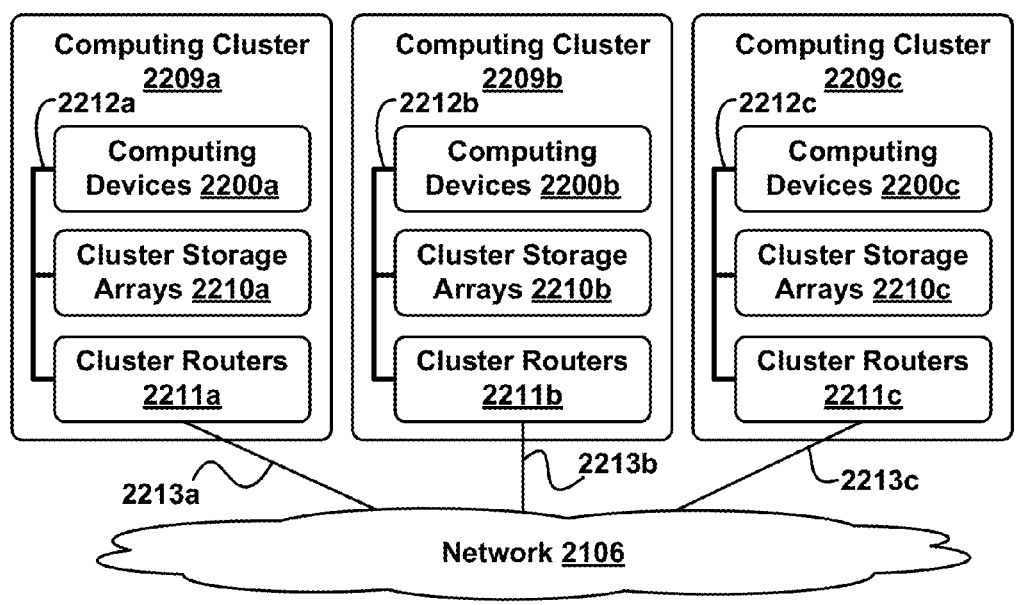
FIG. 22B depicts a cloud-based server system, in accordance with an example embodiment.

FIG. 22B depicts a network 2106 of computing clusters 2209a, 2209b, 2209c arranged as a cloud-based server system in accordance with an example embodiment. Server devices 2108 and/or 2110 of FIG. 21 can be cloud-based devices that store program logic and/or data of cloud-based applications and/or services. In some embodiments, server devices 2108 and/or 2110 can be a single computing device residing in a single computing center. In other embodiments, server device 2108 and/or 2110 can include multiple computing devices in a single computing center, or even multiple computing devices located in multiple computing centers located in diverse geographic locations. For example, FIG. 21 depicts each of server devices 2108 and 2110 residing in different physical locations.

In some embodiments, data and services at server devices 2108 and/or 2110 can be encoded as computer readable information stored in non-transitory, tangible computer readable media (or computer readable storage media) and accessible by programmable devices 2104a, 2104b, and 2104c, and/or other computing devices. In some embodiments, data at server device 2108 and/or 2110 can be stored on a single disk drive or other tangible storage media, or can be implemented on multiple disk drives or other tangible storage media located at one or more diverse geographic locations.

FIG. 22B depicts a cloud-based server system in accordance with an example embodiment. In FIG. 22B, the functions of server device 2108 and/or 2110 can be distributed among three computing clusters 2209a, 2209b, and 2209c. Computing cluster 2209a can include one or more computing devices 2200a, cluster storage arrays 2210a, and cluster routers 2211a connected by a local cluster network 2212a. Similarly, computing cluster 2209b can include one or more computing devices 2200b, cluster storage arrays 2210b, and cluster routers 2211b connected by a local cluster network 2212b. Likewise, computing cluster 2209c can include one or more computing devices 2200c, cluster storage arrays 2210c, and cluster routers 2211c connected by a local cluster network 2212c.

In some embodiments, each of the computing clusters 2209a, 2209b, and 2209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 2209a, for example, computing devices 2200a can be configured to perform various computing tasks of server device 2108. In one embodiment, the various functionalities of server device 2108 can be distributed among one or more of computing devices 2200a, 2200b, and 2200c. Computing devices 2200b and 2200c in computing clusters 2209b and 2209c can be configured similarly to computing devices 2200a in computing cluster 2209a. On the other hand, in some embodiments, computing devices 2200a, 2200b, and 2200c can be configured to perform different functions.

In some embodiments, computing tasks and stored data associated with server devices 2108 and/or 2110 can be distributed across computing devices 2200a, 2200b, and 2200c based at least in part on the processing requirements of server devices 2108 and/or 2110, the processing capabilities of computing devices 2200a, 2200b, and 2200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 2210a, 2210b, and 2210c of the computing clusters 2209a, 2209b, and 2209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 2108 and/or 2110 can be distributed across computing devices 2200a, 2200b, and 2200c of computing clusters 2209a, 2209b, and 2209c, various active portions and/or backup portions of these components can be distributed across cluster storage arrays 2210a, 2210b, and 2210c. For example, some cluster storage arrays can be configured to store the data of server device 2108, while other cluster storage arrays can store data of server device 2110. Additionally, some cluster storage arrays can be configured to store backup versions of data stored in other cluster storage arrays.

The cluster routers 2211a, 2211b, and 2211c in computing clusters 2209a, 2209b, and 2209c can include networking equipment configured to provide internal and external communications for the computing clusters. For example, the cluster routers 2211a in computing cluster 2209a can include one or more internet switching and routing devices configured to provide (i) local area network communications between the computing devices 2200a and the cluster storage arrays 2201a via the local cluster network 2212a, and (ii) wide area network communications between the computing cluster 2209a and the computing clusters 2209b and 2209c via the wide area network connection 2213 to network 2106. Cluster routers 2211b and 2211c can include network equipment similar to the cluster routers 2211a, and cluster routers 2211b and 2211c can perform similar networking functions for computing clusters 2209b and 2209b that cluster routers 2211a perform for computing cluster 2209a.

In some embodiments, the configuration of the cluster routers 2211a, 2211b, and 2211c can be based at least in part on the data communication requirements of the computing devices and cluster storage arrays, the data communications capabilities of the network equipment in the cluster routers 2211a, 2211b, and 2211c, the latency and throughput of local networks 2212a, 2212b, 2212c, the latency, throughput, and cost of wide area network links 2213a, 2213b, and 2213c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving data related to a plurality of features by a machine-learning service executing on a mobile platform, wherein the received data comprises a called party of a telephone call to be originated by the mobile platform;
   determining at least one feature in the plurality of features based on the received data using the machine-learning service;
   generating an output by the machine-learning service performing a machine-learning operation on the at least one feature of the plurality of features, wherein the machine-learning operation is selected from among: an operation of ranking the at least one feature, an operation of classifying the at least one feature, an operation of predicting the at least one feature, and an operation of clustering the at least one feature, wherein the output comprises a prediction of a volume setting and/or a mute setting of the mobile platform; and
   sending the output from the machine-learning service.

2. The method of claim 1, further comprising:
   storing the at least one feature and the output for use by the machine-learning service;
   receiving second data related to a second plurality of features at the machine-learning service;
   determining a second feature in the second plurality of features based on the second data;
   generating a second output by the machine-learning service performing the machine-learning operation on the second feature and the stored at least one feature and the output; and
   sending the second output from the machine-learning service.

3. The method of claim 1, wherein generating the output by the machine-learning service comprises selecting a machine-learning algorithm to perform the machine-learning operation.

4. The method of claim 3, wherein selecting the machine-learning algorithm to perform the machine-learning operation comprises the machine-learning service selecting the machine-learning algorithm.

5. The method of claim 3, wherein selecting the machine-learning algorithm to perform the machine-learning operation comprises receiving a selection related to the machine-learning algorithm from an application executing on the mobile platform, and wherein the application differs from the machine-learning service.

6. The method of claim 5, wherein receiving a selection related to the machine-learning algorithm from the application comprises receiving a selection related to the machine-learning algorithm from the application via an Application Programming Interface (API) of the machine-learning service.

7. The method of claim 1, wherein the received data comprises data related to communication signals and locations, wherein the mobile platform is located at a first location, and wherein the output comprises an indication of whether to search for the communications signal at the first location.

8. The method of claim 1, wherein the received data comprises data related to durations of communication sessions, and wherein the output comprises a prediction of a duration of a new communication session.

9. The method of claim 1, wherein the received data further comprises data related to features of telephone calls originated by the mobile platform, and wherein the output further comprises the called party of the telephone call to be originated by the mobile platform.

10. The method of claim 1, wherein the received data further comprises data related to volume and mute settings of the mobile platform.

11. The method of claim 1, wherein the received data comprises data related to one or more images, and wherein the output comprises a name related to at least one image of the one or more images.

12. The method of claim 1, wherein the received data comprises data aggregated from a plurality of mobile platforms.

13. A method, comprising:
   receiving feature-related data by a machine-learning service executing on a mobile platform, wherein the feature-related data comprises data related to a called party of a telephone call to be originated by the mobile platform and data related to a second plurality of features received from the mobile platform, and wherein the called party of the telephone call to be originated by the mobile platform and the second plurality of features differ;
   determining, using the machine-learning service, at least one feature from among the called party of the telephone call to be originated by the mobile platform and the second plurality of features based on the feature-related data;
   generating an output by the machine-learning service performing a machine-learning operation on the at least one feature, wherein the output comprises a prediction of a volume setting and/or a mute setting of the mobile platform; and sending the output from the machine-learning service to the application.

14. The method of claim 13, wherein the first plurality of features comprises a feature selected from among a time, a location, a duration, a signal strength, a power level, a party of a telephone call, an e-mail address, a contact, and a calendar entry.

15. The method of claim 13, wherein the second plurality of features comprises a feature selected from among an image-related feature and a speech-related feature.

16. An article of manufacture including a non-transitory computer-readable storage medium having instructions stored thereon that, when executed by a processor, cause the processor to perform functions comprising:
   receiving data related to a plurality of features, wherein the received data comprises data related to called parties of telephone calls originated by the mobile platform;
   determining at least one feature in the plurality of features based on the received data;
   generating an output by performing a machine-learning operation on the at least one feature of the plurality of features, wherein the machine-learning operation is selected from among: an operation of ranking the at least one feature, an operation of classifying the at least one feature, an operation of predicting the at least one feature, and an operation of clustering the at least one feature, wherein the output comprises a prediction of a volume setting and/or a mute setting of the mobile platform; and
   sending the output.

17. The article of manufacture of claim 16, further comprising:
   storing the at least one feature and the output;
   receiving second data related to a second plurality of features;
   determining at least a second feature in the second plurality of features based on the second data;
   generating a second output by performing the machine-learning operation on the at least the second feature and the stored at least one feature and the output; and
   sending the second output.

18. The article of manufacture of claim 16, wherein the received data comprises data related to communication signals and locations, wherein the mobile platform is located at a first location, and wherein the output comprises an indication of whether to search for the communications signal at the first location.

19. The article of manufacture of claim 16, wherein the received data comprises data related to durations of communication sessions, and wherein the output comprises a prediction of a duration of a new communication session.

20. The article of manufacture of claim 16, wherein the output further comprises a called party of a telephone call to be originated by the mobile platform.

21. The article of manufacture of claim 16, wherein the received data further comprises data related to volume and mute settings of the mobile platform.

22. The article of manufacture of claim 16, wherein the received data comprises data related to one or more images, and wherein the output comprises a name related to at least one image of the one or more images.

23. A mobile platform, comprising:
   a processor; and
   a non-transitory computer-readable storage medium configured to store instructions that, when executed by the processor, cause the mobile platform to perform functions comprising:
      receiving data related to a plurality of features wherein the received data comprises data related to called parties of telephone calls originated by the mobile platform,
      determining at least one feature in the plurality of features based on the received data;
      generating an output by performing a machine-learning operation on the at least one feature of the plurality of features, wherein the machine-learning operation is selected from among: an operation of ranking the at least one feature, an operation of classifying the at least one feature, an operation of predicting the at least one feature, and an operation of clustering the at least one feature, wherein the output comprises a prediction of a volume setting and/or a mute setting of the mobile platform; and
      sending the output.

24. The mobile platform of claim 23, wherein the functions further comprise:
   storing the at least one feature and the output in the non-transitory computer-readable storage medium;
   receiving second data related to a second plurality of features;
   determining at least a second feature in the second plurality of features based on the second data;
   generating a second output by the machine-learning service performing the machine-learning operation on the at least the second feature and the stored at least one feature and the output; and
   sending the second output.

25. The mobile platform of claim 23, wherein generating the output by the machine-learning service comprises selecting a machine-learning algorithm to perform the machine-learning operation.

26. The mobile platform of claim 23, wherein the received data comprises data related to communication signals and locations, wherein the mobile platform is located at a first location, and wherein the output comprises an indication of whether to search for the communications signal at the first location.

27. The mobile platform of claim 23, wherein the received data comprises data related to durations of communication sessions, and wherein the output comprises a prediction of a duration of a new communication session.

28. The mobile platform of claim 23, wherein the output further comprises the called party of the telephone call to be originated by the mobile platform.

29. The mobile platform of claim 23, wherein the received data comprises data related to one or more images, and wherein the output comprises a name related to at least one image of the one or more images.

30. The mobile platform of claim 23, further comprising a network communications interface module, wherein receiving the data related to the plurality of features comprises receiving the data related to the plurality of features via the network communications interface module.

* * * * *